US005638346A

United States Patent [19]

Aramaki

[11] Patent Number: 5,638,346

[45] Date of Patent: Jun. 10, 1997

[54] MAGNETO-OPTICAL REPRODUCING APPARATUS HAVING A JOG DIAL TRACK NUMBER SELECTOR

[75] Inventor: Junichi Aramaki, Chiba, Japan

[73] Assignee: Sony Corporation, Tokyo, Japan

[21] Appl. No.: 294,326

[22] Filed: Aug. 23, 1994

[30] Foreign Application Priority Data

Aug. 24, 1993 [JP] Japan .................................... 5-229584

[51] Int. Cl.$^{6}$ ...................................................... G11B 17/22

[52] U.S. Cl. ............................... 369/32; 360/78.04; 386/1

[58] Field of Search .................................. 369/32, 13, 59, 369/124, 275.3, 47, 48, 58, 83, 30; 360/114, 10.1, 78.04, 14.1, 35.1, 13, 33.1

[56] References Cited

U.S. PATENT DOCUMENTS 4,356,509 10/1982 Skerlos et al. ............................ 358/85
4,381,522 4/1983 Lambert .................................... 358/86
4,456,925 6/1984 Skerlos et al. ............................ 358/85
4,521,806 6/1985 Abraham .................................. 358/86
4,769,721 9/1988 Kajiura .................................. 360/10.1
4,866,542 9/1989 Shimada et al. ....................... 360/10.3
5,109,369 4/1992 Maeda et al. ............................ 369/50
5,153,861 10/1992 Maeda et al. ............................ 369/32
5,179,480 1/1993 Takahashi ........................... 360/78.04
5,325,347 6/1994 Sako ........................................... 369/48
5,388,093 2/1995 Yoshida et al. ......................... 369/124
5,491,591 2/1996 Lemelson .............................. 360/35.1

*Primary Examiner*—Ali Neyzari
*Attorney, Agent, or Firm*—Limbach & Limbach L.L.P.

[57] ABSTRACT

An optical disc reproducing apparatus having a jog dial control selector for selecting different programs recorded on the optical disc and a display for displaying an identification of the selected programs.

27 Claims, 40 Drawing Sheets

FIG. 6

P-TOC SECTOR 0

| Area | | 16 bit: MSB – LSB | 16 bit: MSB – LSB | 16 bit: MSB – LSB | 16 bit: MSB – LSB | |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | Cluster H | Cluster L | 00000000 | 00000010 | 3 |
| | | 00000000 | 00000000 | 00000000 | 00000000 | 4 |
| | | 00000000 | 00000000 | 00000000 | 00000000 | 5 |
| | | "M" | "I" | "N" | "I" | 6 |
| | | Disc type | Rec power | First TNO | Last TNO | 7 |
| | | LEAD-OUT START ADDRESS (ROA) | | | Used Sectors | 8 |
| | | POWER CALIBRATION AREA START ADDRESS (PCA) | | | 00000000 | 9 |
| | | U-TOC START ADDRESS (USTA) | | | 00000000 | 10 |
| | | RECORDABLE USER AREA START ADDRESS (RSTA) | | | 00000000 | 11 |
| CORRESPONDING TABLE DESIGNATING DATA AREA | | | P-TNO1 | P-TNO2 | P-TNO3 | 12 |
| CORRESPONDING TABLE DESIGNATING DATA AREA | | P-TNO4 | P-TNO5 | P-TNO6 | P-TNO7 | 13 |
| | | | | | | |
| CORRESPONDING TABLE DESIGNATING DATA AREA | | P-TNO248 | P-TNO249 | P-TNO250 | P-TNO251 | 74 |
| CORRESPONDING TABLE DESIGNATING DATA AREA | | P-TNO252 | P-TNO253 | P-TNO254 | P-TNO255 | 75 |
| | | 00000000 | 00000000 | 00000000 | 00000000 | 76 |
| | | 00000000 | 00000000 | 00000000 | 00000000 | 77 |
| MANAGEMENT TABLE AREA (255 PART TABLES) | (01h) | START ADDRESS | | | TRACK MODE | 78 |
| | | END ADDRESS | | | 00000000 | 79 |
| | (02h) | START ADDRESS | | | TRACK MODE | 80 |
| | | END ADDRESS | | | 00000000 | 81 |
| | (03h) | START ADDRESS | | | TRACK MODE | 82 |
| | | END ADDRESS | | | 00000000 | 83 |
| | | | | | | |
| | (FCh) | START ADDRESS | | | TRACK MODE | 580 |
| | | END ADDRESS | | | 00000000 | 581 |
| | (FDh) | START ADDRESS | | | TRACK MODE | 582 |
| | | END ADDRESS | | | 00000000 | 583 |
| | (FEh) | START ADDRESS | | | TRACK MODE | 584 |
| | | END ADDRESS | | | 00000000 | 585 |
| | (FFh) | START ADDRESS | | | TRACK MODE | 586 |
| | | END ADDRESS | | | 00000000 | 587 |

FIG. 7

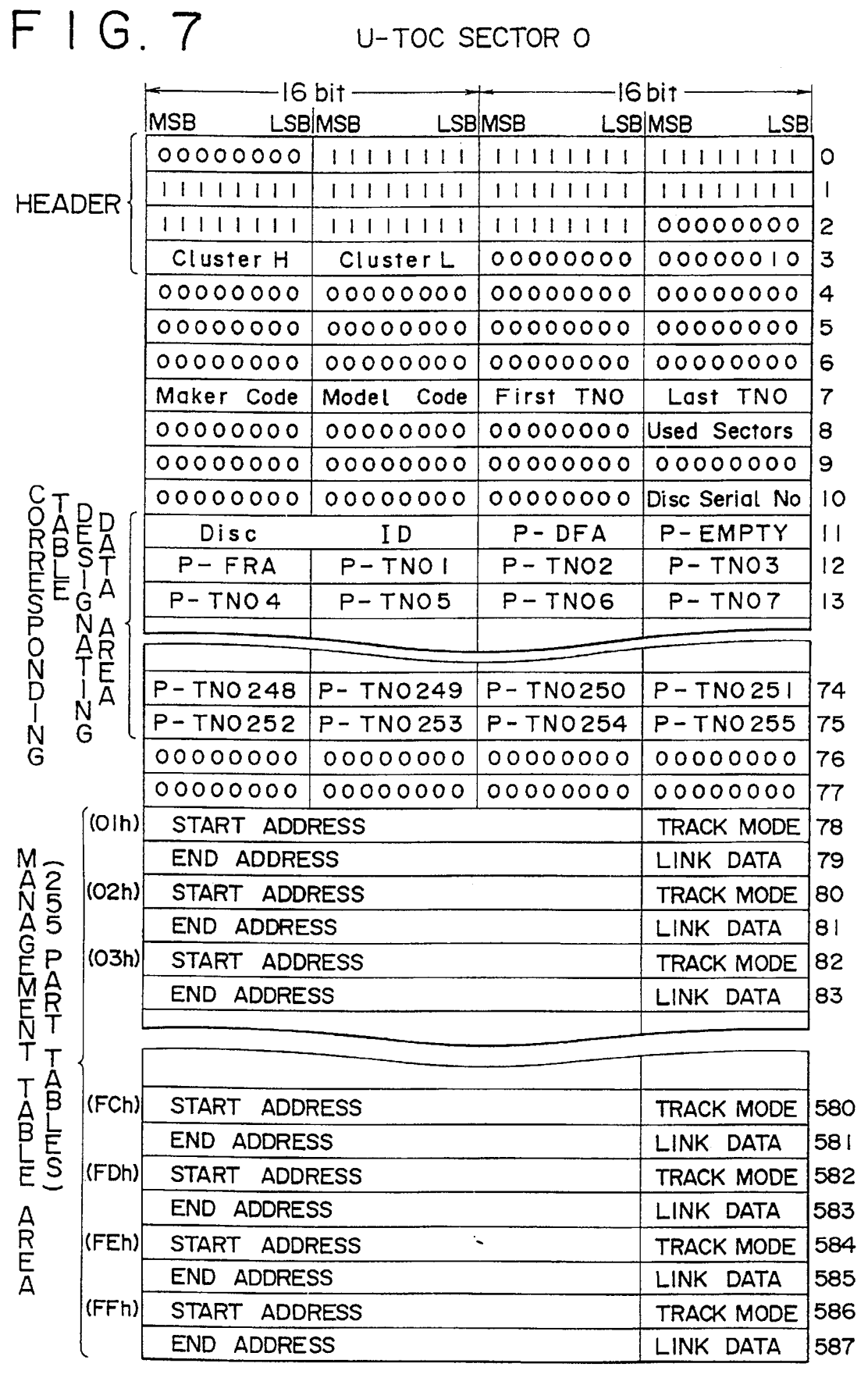

U-TOC SECTOR 0

| Area | | 16 bit MSB–LSB | 16 bit MSB–LSB | 16 bit MSB–LSB | 16 bit MSB–LSB | |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | Cluster H | Cluster L | 00000000 | 00000010 | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | Maker Code | Model Code | First TNO | Last TNO | 7 |
| | | 00000000 | 00000000 | 00000000 | Used Sectors | 8 |
| | | 00000000 | 00000000 | 00000000 | 00000000 | 9 |
| | | 00000000 | 00000000 | 00000000 | Disc Serial No | 10 |
| CORRESPONDING TABLE DESIGNATING DATA AREA | | Disc | ID | P-DFA | P-EMPTY | 11 |
| | | P-FRA | P-TNO1 | P-TNO2 | P-TNO3 | 12 |
| | | P-TNO4 | P-TNO5 | P-TNO6 | P-TNO7 | 13 |
| | | P-TNO248 | P-TNO249 | P-TNO250 | P-TNO251 | 74 |
| | | P-TNO252 | P-TNO253 | P-TNO254 | P-TNO255 | 75 |
| | | 00000000 | 00000000 | 00000000 | 00000000 | 76 |
| | | 00000000 | 00000000 | 00000000 | 00000000 | 77 |
| MANAGEMENT TABLE AREA (255 PART TABLES) | (01h) | START ADDRESS | | | TRACK MODE | 78 |
| | | END ADDRESS | | | LINK DATA | 79 |
| | (02h) | START ADDRESS | | | TRACK MODE | 80 |
| | | END ADDRESS | | | LINK DATA | 81 |
| | (03h) | START ADDRESS | | | TRACK MODE | 82 |
| | | END ADDRESS | | | LINK DATA | 83 |
| | (FCh) | START ADDRESS | | | TRACK MODE | 580 |
| | | END ADDRESS | | | LINK DATA | 581 |
| | (FDh) | START ADDRESS | | | TRACK MODE | 582 |
| | | END ADDRESS | | | LINK DATA | 583 |
| | (FEh) | START ADDRESS | | | TRACK MODE | 584 |
| | | END ADDRESS | | | LINK DATA | 585 |
| | (FFh) | START ADDRESS | | | TRACK MODE | 586 |
| | | END ADDRESS | | | LINK DATA | 587 |

FIG. 9

U-TOC SECTOR 1

| | | 16 bit | | 16 bit | | |
|---|---|---|---|---|---|---|
| | | MSB LSB | MSB LSB | MSB LSB | MSB LSB | |
| HEADER | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| | | Cluster H | Cluster L | 00000001 | 00000010 | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | 00000000 | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | 00000000 | 10 |
| CORRESPONDING TABLE DESIGNATING DATA AREA | | 00000000 | 00000000 | 00000000 | P-EMPTY | 11 |
| | | 00000000 | P-TNA1 | P-TNA2 | P-TNA3 | 12 |
| | | P-TNA4 | P-TNA5 | P-TNA6 | P-TNA7 | 13 |
| | | | | | | |
| | | | | | | |
| | | P-TNA248 | P-TNA249 | P-TNA250 | P-TNA251 | 74 |
| | | P-TNA252 | P-TNA253 | P-TNA254 | P-TNA255 | 75 |
| CHARACTER TABLE AREA | | DISC NAME | | | | 76 |
| | | DISC NAME | | | LINK DATA | 77 |
| | (01h) | DISC NAME / TRACK NAME | | | | 78 |
| | | DISC NAME / TRACK NAME | | | LINK DATA | 79 |
| | (02h) | DISC NAME / TRACK NAME | | | | 80 |
| | | DISC NAME / TRACK NAME | | | LINK DATA | 81 |
| | (03h) | DISC NAME / TRACK NAME | | | | 82 |
| | | DISC NAME / TRACK NAME | | | LINK DATA | 83 |
| | | | | | | |
| | | | | | | |
| | | DISC NAME / TRACK NAME | | | | 584 |
| | (FEh) | DISC NAME / TRACK NAME | | | LINK DATA | 585 |
| | | DISC NAME / TRACK NAME | | | | 586 |
| | (FFh) | DISC NAME / TRACK NAME | | | LINK DATA | 587 |

FIG. 10

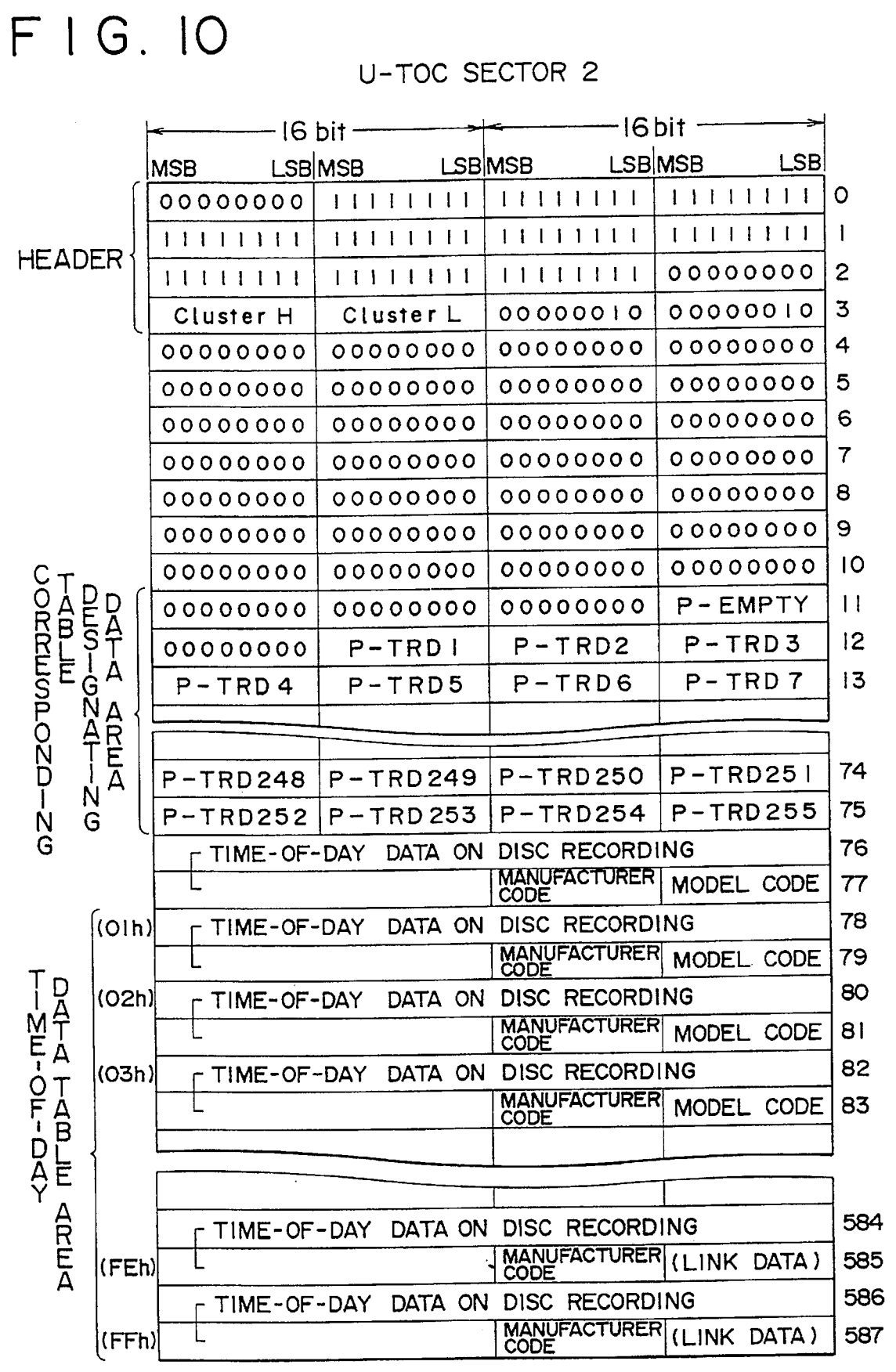

U-TOC SECTOR 2

| Area | Slot | 16 bit: MSB … LSB | MSB … LSB | 16 bit: MSB … LSB | MSB … LSB | |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | Cluster H | Cluster L | 00000010 | 00000010 | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | 00000000 | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | 00000000 | 10 |
| CORRESPONDING TABLE DESIGNATING DATA AREA | | 00000000 | 00000000 | 00000000 | P-EMPTY | 11 |
| CORRESPONDING TABLE DESIGNATING DATA AREA | | 00000000 | P-TRD1 | P-TRD2 | P-TRD3 | 12 |
| CORRESPONDING TABLE DESIGNATING DATA AREA | | P-TRD4 | P-TRD5 | P-TRD6 | P-TRD7 | 13 |
| CORRESPONDING TABLE DESIGNATING DATA AREA | | … | … | … | … | |
| CORRESPONDING TABLE DESIGNATING DATA AREA | | P-TRD248 | P-TRD249 | P-TRD250 | P-TRD251 | 74 |
| CORRESPONDING TABLE DESIGNATING DATA AREA | | P-TRD252 | P-TRD253 | P-TRD254 | P-TRD255 | 75 |
| | | TIME-OF-DAY DATA ON DISC RECORDING | | | | 76 |
| | | | | MANUFACTURER CODE | MODEL CODE | 77 |
| TIME-OF-DAY DATA TABLE AREA | (01h) | TIME-OF-DAY DATA ON DISC RECORDING | | | | 78 |
| TIME-OF-DAY DATA TABLE AREA | | | | MANUFACTURER CODE | MODEL CODE | 79 |
| TIME-OF-DAY DATA TABLE AREA | (02h) | TIME-OF-DAY DATA ON DISC RECORDING | | | | 80 |
| TIME-OF-DAY DATA TABLE AREA | | | | MANUFACTURER CODE | MODEL CODE | 81 |
| TIME-OF-DAY DATA TABLE AREA | (03h) | TIME-OF-DAY DATA ON DISC RECORDING | | | | 82 |
| TIME-OF-DAY DATA TABLE AREA | | | | MANUFACTURER CODE | MODEL CODE | 83 |
| TIME-OF-DAY DATA TABLE AREA | | … | … | … | … | |
| TIME-OF-DAY DATA TABLE AREA | (FEh) | TIME-OF-DAY DATA ON DISC RECORDING | | | | 584 |
| TIME-OF-DAY DATA TABLE AREA | | | | MANUFACTURER CODE | (LINK DATA) | 585 |
| TIME-OF-DAY DATA TABLE AREA | (FFh) | TIME-OF-DAY DATA ON DISC RECORDING | | | | 586 |
| TIME-OF-DAY DATA TABLE AREA | | | | MANUFACTURER CODE | (LINK DATA) | 587 |

FIG. 14(a)
FIG. 14
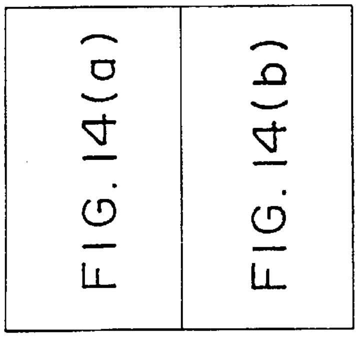
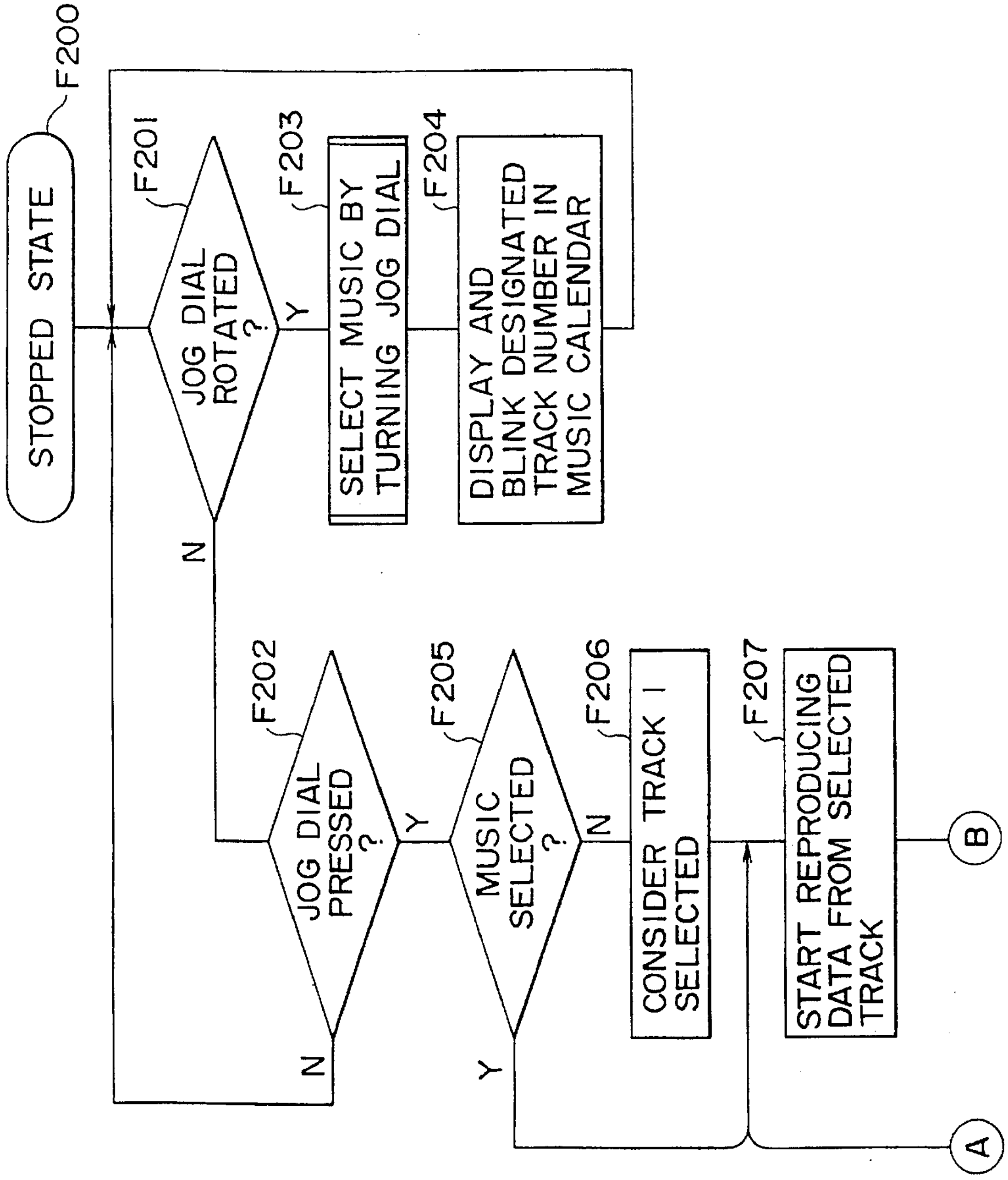

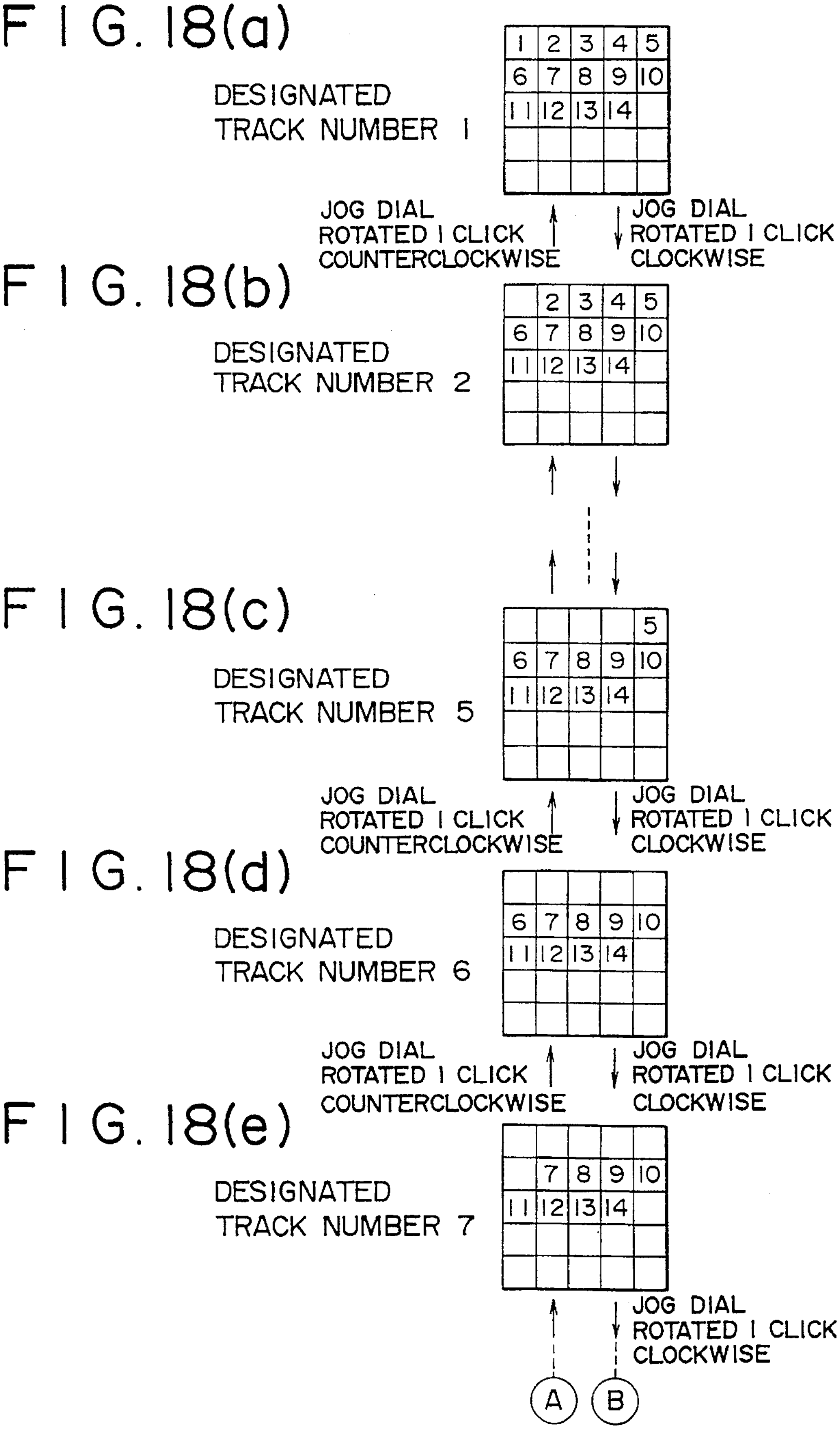

DESIGNATED TRACK NUMBER 1

| 1 | 2 | 3 | 4 | 5 |
|---|---|---|---|---|
| 6 | 7 | 8 | 9 | 10 |
| 11 | 12 | 13 | 14 | |
| | | | | |
| | | | | |

↑ JOG DIAL ROTATED 1 CLICK COUNTERCLOCKWISE    ↓ JOG DIAL ROTATED 1 CLICK CLOCKWISE

DESIGNATED TRACK NUMBER 2

| | 2 | 3 | 4 | 5 |
|---|---|---|---|---|
| 6 | 7 | 8 | 9 | 10 |
| 11 | 12 | 13 | 14 | |
| | | | | |
| | | | | |

↑ ↓

DESIGNATED TRACK NUMBER 5

| | | | | 5 |
|---|---|---|---|---|
| 6 | 7 | 8 | 9 | 10 |
| 11 | 12 | 13 | 14 | |
| | | | | |
| | | | | |

↑ JOG DIAL ROTATED 1 CLICK COUNTERCLOCKWISE    ↓ JOG DIAL ROTATED 1 CLICK CLOCKWISE

DESIGNATED TRACK NUMBER 6

| | | | | |
|---|---|---|---|---|
| 6 | 7 | 8 | 9 | 10 |
| 11 | 12 | 13 | 14 | |
| | | | | |
| | | | | |

↑ JOG DIAL ROTATED 1 CLICK COUNTERCLOCKWISE    ↓ JOG DIAL ROTATED 1 CLICK CLOCKWISE

DESIGNATED TRACK NUMBER 7

| | | | | |
|---|---|---|---|---|
| | 7 | 8 | 9 | 10 |
| 11 | 12 | 13 | 14 | |
| | | | | |
| | | | | |

↑    ↓ JOG DIAL ROTATED 1 CLICK CLOCKWISE (A) (B)

DESIGNATED TRACK NUMBER 8

DESIGNATED TRACK NUMBER 9

DESIGNATED TRACK NUMBER 10

DESIGNATED TRACK NUMBER 14

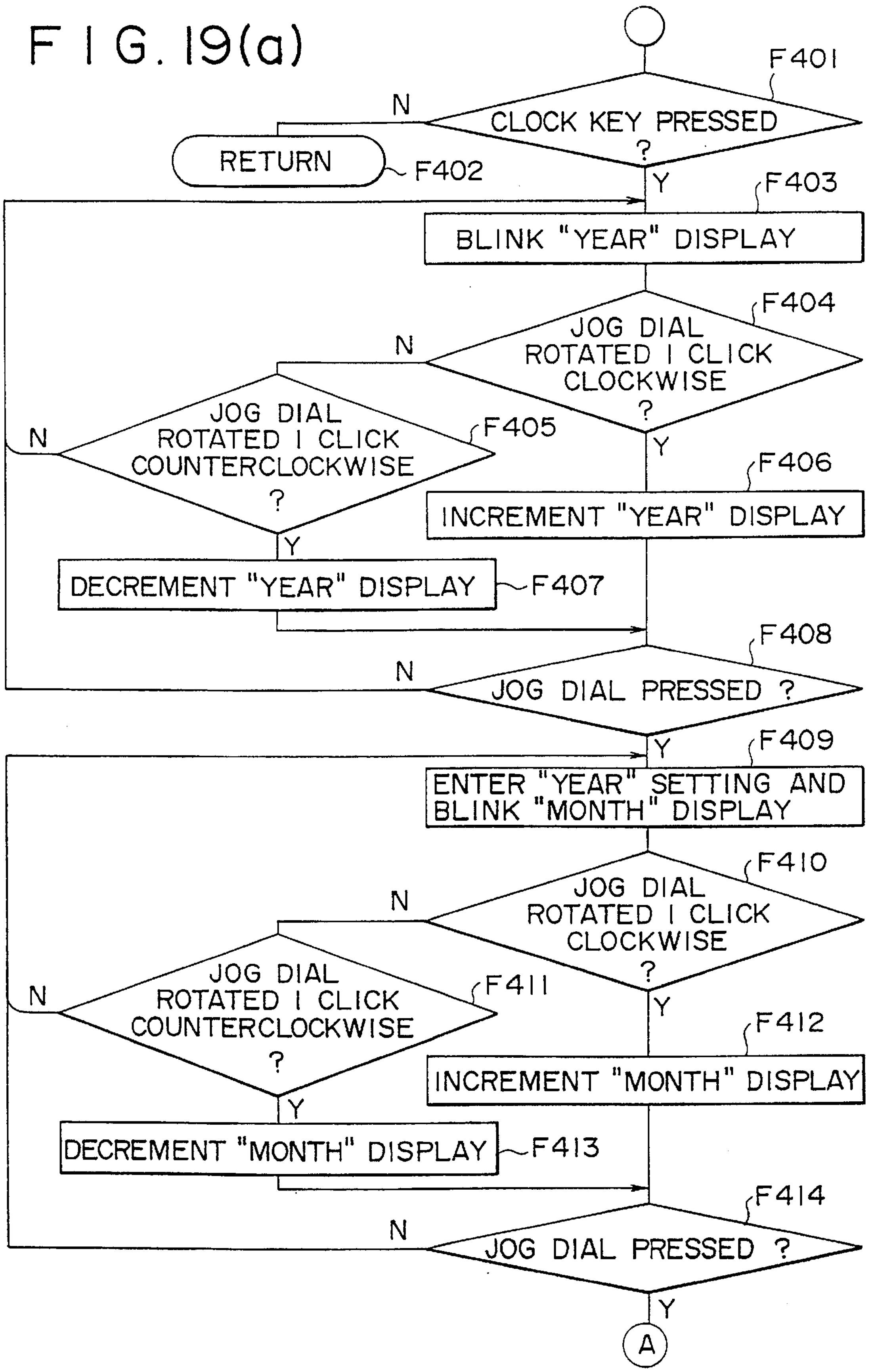
F I G. 19(a)
CLOCK KEY PRESSED ?
F401
N
RETURN
F402
Y
BLINK "YEAR" DISPLAY
F403
JOG DIAL ROTATED 1 CLICK CLOCKWISE ?
F404
N
JOG DIAL ROTATED 1 CLICK COUNTERCLOCKWISE ?
F405
N
Y
INCREMENT "YEAR" DISPLAY
F406
Y
DECREMENT "YEAR" DISPLAY
F407
JOG DIAL PRESSED ?
F408
N
Y
ENTER "YEAR" SETTING AND BLINK "MONTH" DISPLAY
F409
JOG DIAL ROTATED 1 CLICK CLOCKWISE ?
F410
N
JOG DIAL ROTATED 1 CLICK COUNTERCLOCKWISE ?
F411
N
Y
INCREMENT "MONTH" DISPLAY
F412
Y
DECREMENT "MONTH" DISPLAY
F413
JOG DIAL PRESSED ?
F414
N
Y
A F I G. 21(a)
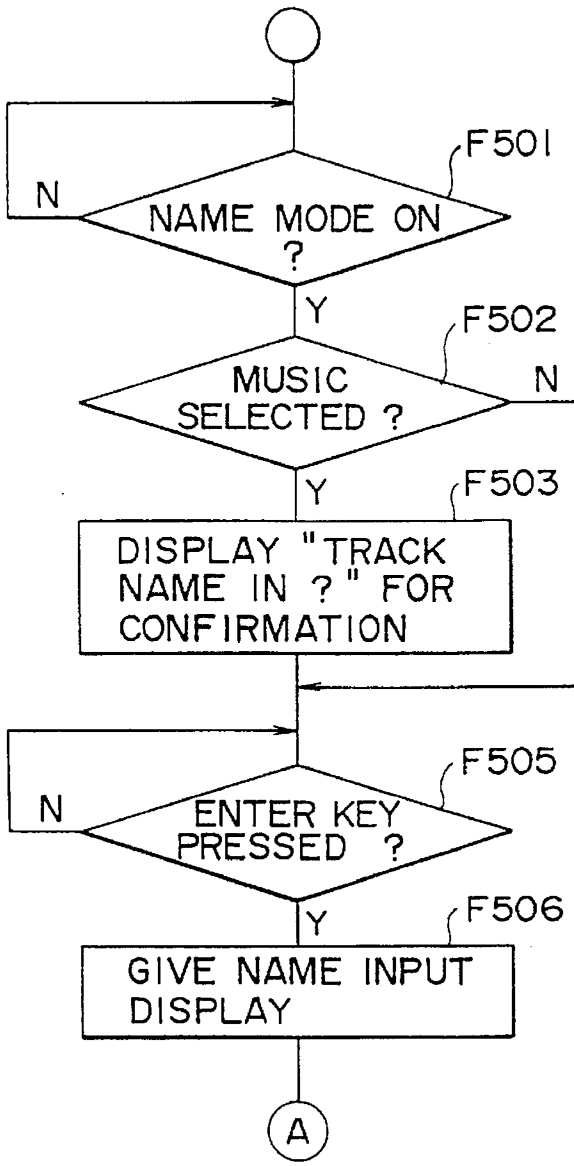
F I G. 21
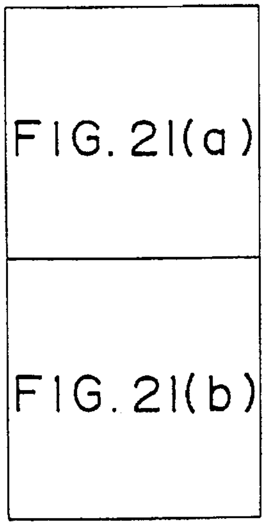

F I G. 25(a)
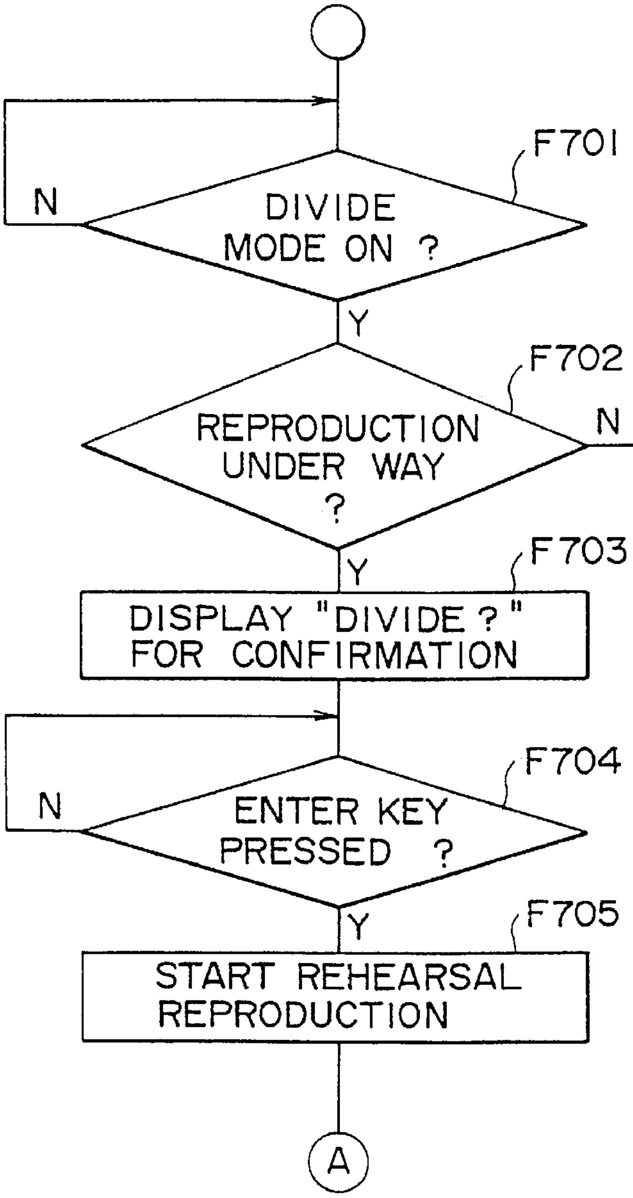

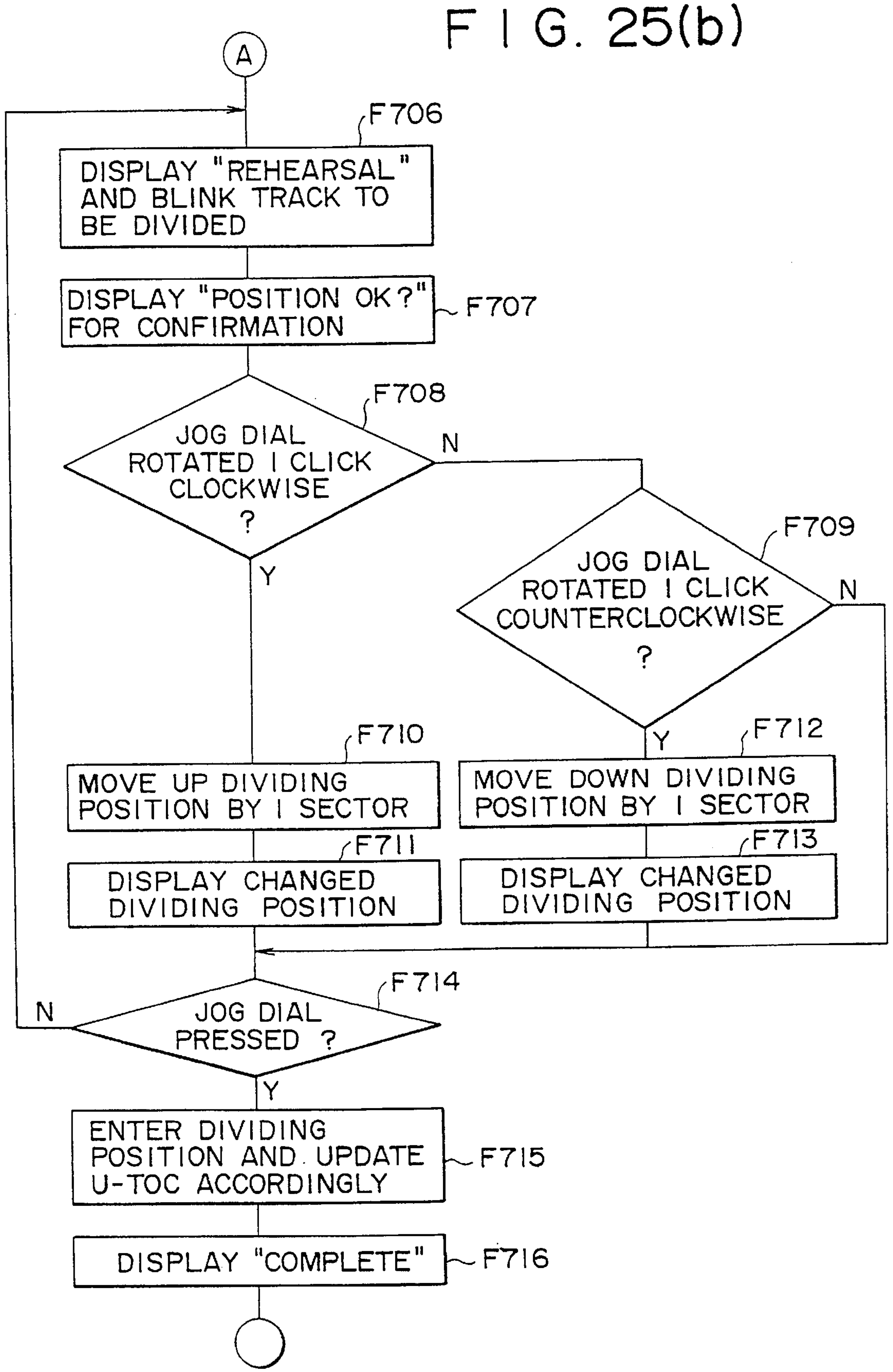
F I G. 25(b)

MAGNETO-OPTICAL REPRODUCING APPARATUS HAVING A JOG DIAL TRACK NUMBER SELECTOR

BACKGROUND OF THE INVENTION

The present invention relates to an apparatus and a method for reproduction from a recording medium. More particularly, the invention relates to an apparatus and a method for reproduction from a recording medium comprising a plurality of data tracks and having data track numbers recorded in conjunction therewith.

There exist rewritable disc-shaped recording media allowing users to record music and other data thereon. Such recording media each comprise two kinds of areas, one storing data representing pieces of music and other items, the other being a control data area (called a user's table of contents (TOC), or simply the U-TOC hereinafter) used to control unrecorded (i.e., free) disc areas. The control data in the U-TOC is updated every time a recording, edit or erase operation has been carried out.

Illustratively, when a piece of music is to be recorded on such a disc-shaped recording medium by a recording apparatus, the apparatus searches for and finds a free area on the disc by resorting to the U-TOC. The audio data is then recorded to the free area thus found. When a piece of music is to be reproduced from the disc, a reproducing apparatus identifies the disc area holding the target piece of music (represented by a specific data track) in accordance with the U-TOC. The area so identified is accessed for data reproduction therefrom.

Such disc-shaped media as magneto-optical discs are much easier to access randomly than tape-shaped recording media such as DAT's (digital audio tapes) and compact cassette tapes. On the disc-shaped medium, there is no need for data to be recorded in an orderly manner from inner to outer tracks (i.e., from the first to the n-th track). That is, even if a plurality of pieces of music are recorded in physically discontinuous locations on the disc, these pieces of music will be reproduced in a desired order as long as their addresses are properly controlled.

Furthermore, a single data track need not necessarily be composed of contiguous segments (physically continuous portions storing data); the track can be constituted by a plurality of discrete segments scattered over the disc.

This feature is applied advantageously to systems that read data from a magneto-optical disc, place temporarily the data so read into a buffer memory at a high transfer rate, and read data from the buffer memory at a low transfer rate as audio reproduction signals to be demodulated. Access to the target data ranging from one discrete segment to another may sometimes lead to a temporary discontinuation of the data being read from the magneto-optical disc, but the reproduced audio signals will be output uninterrupted.

Access to each segment for recording or reproduction may be repeated by taking advantage of the time difference between the high-speed writing of data to the buffer memory and the low-speed reading of data therefrom. That is, a new segment can be accessed before the remaining accumulated data in the buffer memory is read therefrom and exhausted for recording or reproduction. The process of recording or reproducing, say, a piece of music is carried out uninterrupted even where that piece of music is divided into a plurality of physically discontinuous segments.

It is possible, as shown illustratively in FIG. 1, that the first and the second piece of music are recorded contiguously in segments $M_1$ and $M_2$ and that the fourth piece of music is divided and recorded in segments $M_{4(1)}$ through $M_{4(4)}$ and the fifth in segments $M_{5(1)}$ and $M_{5(2)}$. It should be noted that what is shown in FIG. 1 is merely a schematic view. In practice, one segment can often range from several to several hundred tracks or more.

Where pieces of music are to be recorded to or erased from the magneto-optical disc, free areas can occur conventionally on tracks due to the different playing times of these pieces of music. But the discrete recording as outlined above makes it possible optimally to utilize the free areas on the disc in recording, say, a piece of music in place of a longer one that has been erased. There no longer occur unrecorded data recording areas left unused as a result of repeated recording and erasing operations on the disc. The magneto-optical disc can store not only pieces of music but also any other audio signals. In this specification, however, it is assumed for the sake of description that one data track is to record one piece of music.

On such discs, each piece of music must be recorded continuously by accessing segments constituting a plurality of free areas; to reproduce a piece of music from the disc requires gaining access to the appropriate segments in the correct order. The data used to connect the segments composing one piece of music (e.g., $M_{4(1)}$–$M_{4(4)}$) and the data indicating free areas are retained in the U-TOC. As mentioned, the U-TOC data are updated every time a recording or erase operation is carried out on the disc. The recording/reproducing apparatus controls the recording or reproducing process in accordance with the U-TOC data read out for head access operations on the disc.

As depicted in FIG. 2, data is recorded on the disc in units of clusters CL each comprising a total of 36 sectors, 4 sectors making up a subdata area and 32 sectors constituting a main data area, each sector being composed of 2,352 bytes. One cluster, corresponding to a few tracks, is the unit in which to record data. Each sector is assigned its unique address. The four-sector subdata area is used not only as a subdata area but also as a linking area. TOC data, audio data and other data are recorded in the 32-sector main data area.

Each sector is divided into sound groups. Specifically, two sectors constitute 11 sound groups. One sound group has 512 sampled items of data recorded therein separately for the left and right channels. The data in one sound group amounts to audio data of 11.6 msec.

Of the tracks accommodating data on the disc, the one desired for reproduction is accessed by the user selecting the appropriate track number through music selection procedures. Reproducing apparatuses usually have two keys for music selection: one for selecting the immediately following piece of music (UP key), the other for selecting the preceding piece of music (DOWN key). These keys are used to increment or decrement the track number, one at a time, until the number of the track storing the desired piece of music is reached.

In selecting a piece of music, however, the user often finds it troublesome to press the relevant key repeatedly, especially when the desired data track has a number that is considerably higher or lower than the currently selected track number. For example, if it is desired to select the 20th piece of music on the disc starting from track 0, it is necessary to press the UP key as many as 20 times. To play back the data track so selected further requires pressing a key that finalizes and enters the selection, which makes the manual operation even more tiresome.

Some reproducing apparatuses have numeric keys from 1 to about 25 so that the 20th piece of music, for example, may be selected by simply pressing the key "25." One disadvantage of this arrangement is an extensive space required over the control panel to accommodate the many numeric keys. The requirement runs counter to the recent trend of apparatuses getting smaller in size. In that sense, the many-key approach is not quite appropriate to all reproducing apparatuses. Even with a large number of numeric keys provided, the manual operation still remains troublesome if the keys fail to cover all track numbers of the disc. For example, if a disc contains 255 pieces of music and the numeric keys ranges from 1 to 25, any of the 26th through the 255th piece of music cannot be selected directly by a single numeric key operation; to select any of the pieces of music identified by the track numbers 26 and higher still requires operating the selection-related keys a number of times.

Some reproducing apparatuses may have an optional function permitting the entry of a character string representing the name of a piece of music or of a disc. In addition, the apparatus may incorporate a clock capability for displaying the time of day. A further optional function is one which allows the user to program desired pieces of music for playback in a desired sequence. Other optional functions include one that permits division of a data track in a desired position thereof (in what is called divide mode), and another allowing the track number to be moved up or down (in what is called move mode). The trouble is that executing any of these functions involves complicated manual key operations by the user.

That is, the user is required to press the relevant keys repeatedly when, illustratively, selecting the character string to be entered and then finalizing the selection. The same applies to setting the time of day with the clock function. More key operations are needed if it is necessary to carry out such steps as programming desired pieces of music to be played back in a desired order, setting the dividing position in divide mode, and selecting a different piece of music by moving up or down the track number in move mode.

SUMMARY OF THE INVENTION

It is therefore an object of the present invention to provide a reproducing apparatus which uses a recording medium and which resolves the above-mentioned problem.

It is another object of the present invention to provide a reproducing method which uses a recording medium and which resolves the above-mentioned problem.

In carrying out the invention and according to one aspect thereof, there is provided a reproducing apparatus for reproducing data at least in units of tracks from a recording medium. The reproducing apparatus comprises an input unit, a display unit and a control unit. The input unit permits rotating and pressing operations. The display unit displays at least any one of the track numbers which are recorded on said recording medium and which identify these tracks. The control unit receives output signals from the input unit and supplies control signals to the display unit. In reproduction mode, the control unit allows the input unit to select through a rotating operation any one of a plurality of track numbers recorded on the recording medium and to control the status of reproducing data from the selected track through a pressing operation. In a mode other than reproduction mode, the control unit allows the input unit to perform track number selection through a rotating operation and to finalize and enter the selection through a pressing operation.

According to another aspect of the invention, there is provided a reproducing apparatus for reproducing data from a recording medium accommodating a plurality of data tracks and storing the track numbers identifying these data tracks. The reproducing apparatus comprises a reproducing unit, an input unit, a display unit and a control unit. The reproducing unit reproduces data from the recording medium. The input unit permits rotating and pressing operations. The display unit displays at least any one of the track numbers identifying the data tracks on the recording medium. The control unit receives output signals from the input unit and supplies control signals to the display unit. In a stopped state during reproduction, the control unit causes the display unit to display the track number selected by a rotating operation of the input unit, the selected track number being displayed in a manner distinct from other track numbers also displayed. The control unit also causes the reproducing unit to start reproducing data from the beginning of the track identified by the track number selected by the input unit. While reproduction is under way, the control unit allows the display unit to display selectively a track number which either precedes or follows the track number of the track currently under reproduction, the displayed track number being selected by a rotating operation in a specific direction of the input unit. The control unit further causes the reproducing unit to start reproducing data from the beginning of the selected track upon completion of the selecting operation by the input unit.

According to a further aspect of the invention, there is provided a reproducing method for use with a recording medium accommodating a plurality of data tracks and storing table-of-contents information including data about the track numbers identifying these data tracks. The reproducing method comprises the steps of: reading the table-of-contents information from the loaded recording medium for display onto a display unit; causing, in a stopped state during reproduction, the display unit to display the track number selected by a rotating operation of an input unit, the selected track number being displayed in a manner distinct from other track numbers also displayed; causing a reproducing unit to start reproducing data from the beginning of the track identified by the track number selected by the input unit; allowing, while reproduction is under way, the display unit to display selectively a track number which either precedes or follows the track number of the track currently under reproduction, the displayed track number being selected by a rotating operation in a specific direction of the input unit; and causing the reproducing unit to start reproducing data from the beginning of the selected track upon completion of the selecting operation by the input unit.

The input unit of the invention, designed to be rotatable and pressable, permits an easy entry of data proportionate to the amount of its rotation. For example, simply rotating the input unit provides easy access to a track number considerably higher or lower than the number of the track currently under reproduction, or to a character appreciably detached alphabetically from the currently displayed character. Then pressing the same input unit finalizes and enters the currently displayed number or character; no other key needs to be pushed. Upon access to a track number on the recording medium, an inadvertent operation of the wrong numeric key or the like is avoided thanks to the fact that the desired number is reached by rotating the input unit. It is much easier for the user to operate the apparatus because any desired number is selected and entered by simply rotating the input unit and then pressing the same unit.

These and other objects, features and advantages of the invention will become more apparent upon a reading of the following description and appended drawings.

BRIEF DESCRIPTION OF THE DRAWINGS

FIG. 6 is a schematic view of P-TOC (pre-mastered table of contents) sector 0 on the disc;

FIG. 7 is a schematic view of U-TOC (use's table of contents) sector 0 on the disc;

FIG. 9 is a schematic view of U-TOC sector 1 on the disc;

FIG. 10 is a schematic view of U-TOC sector 2 on the disc;

DESCRIPTION OF THE PREFERRED EMBODIMENT

Figure 1:
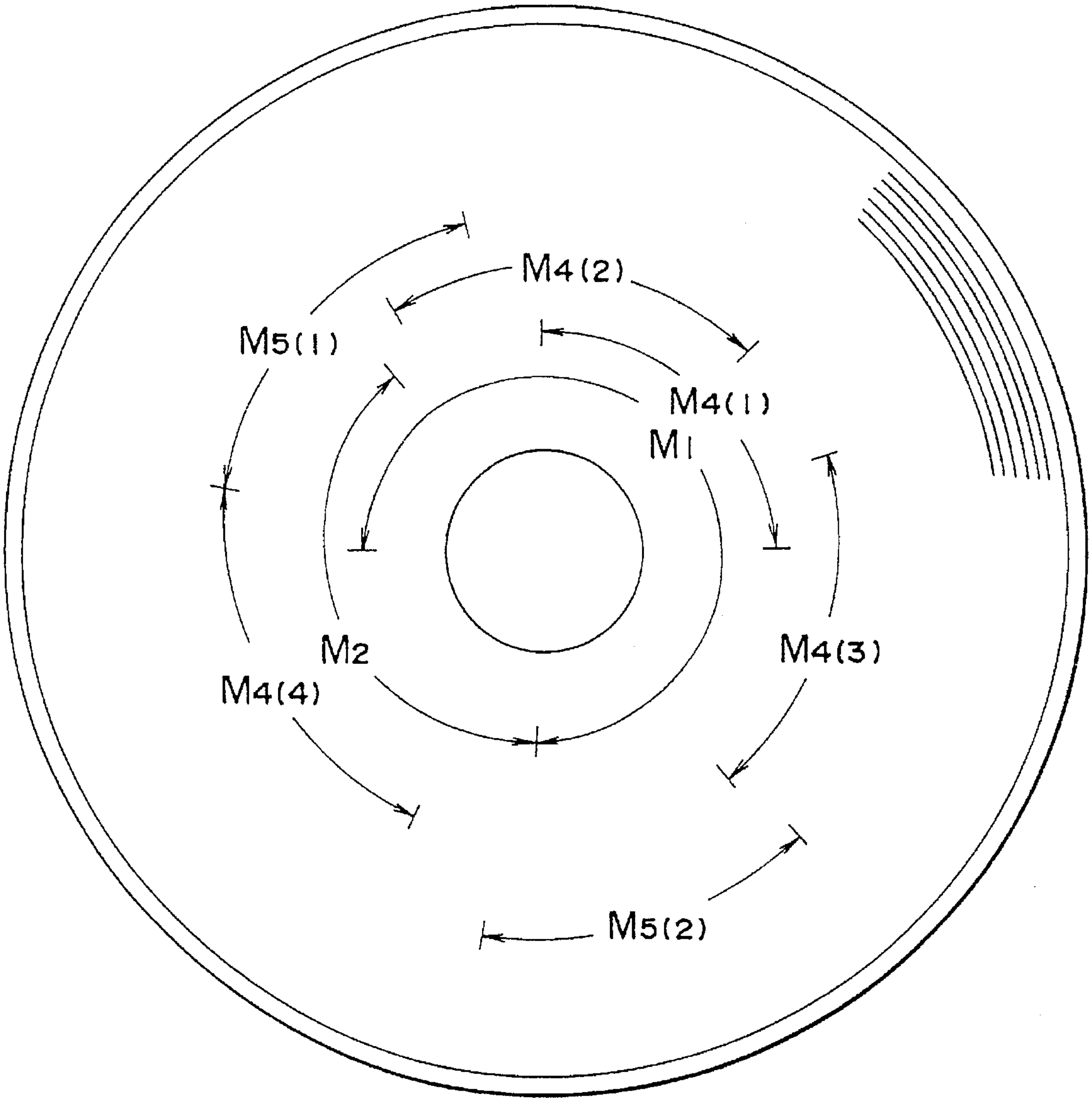
FIG. 1 is a schematic view of typical recording tracks on a disc.
Figure 2:
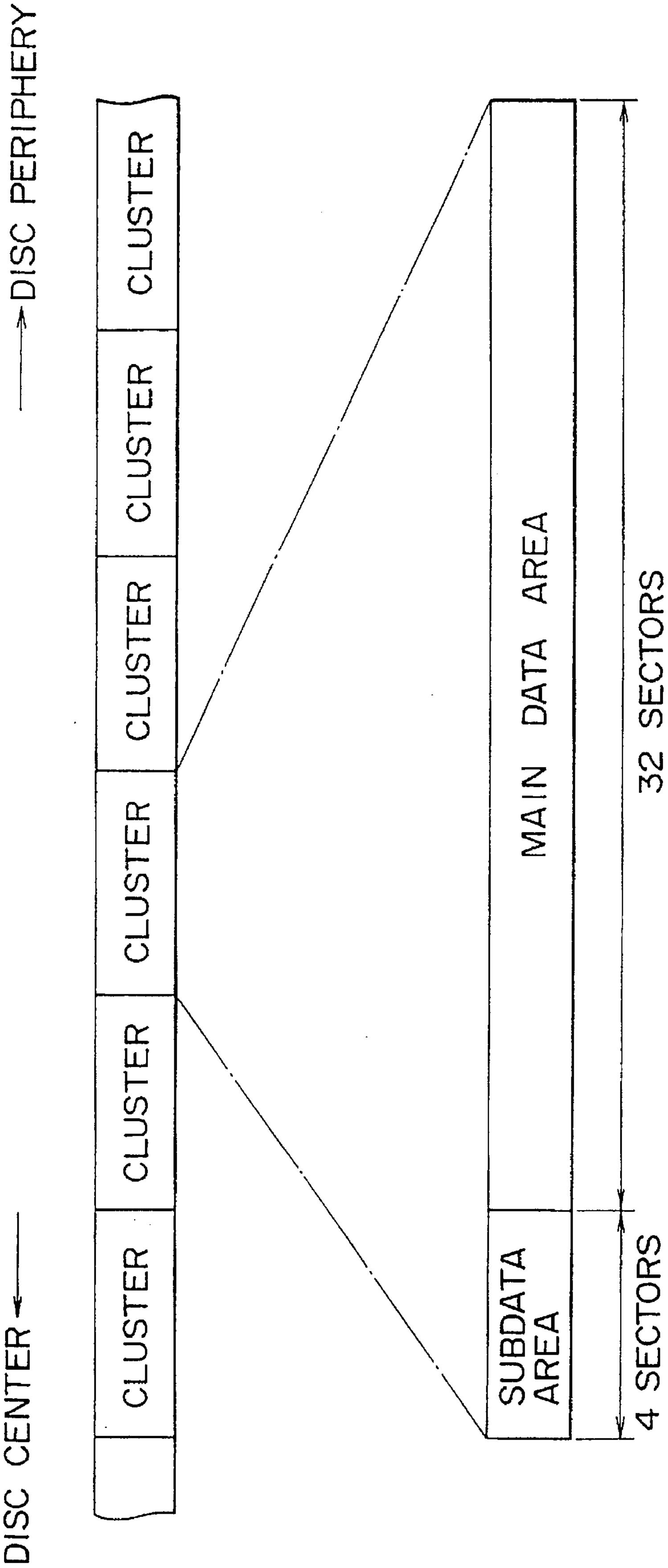
FIG. 2 is a schematic view of a typical sector arrangement of recording tracks on the disc.

Described below with reference to FIGS. 3 through 29 is the recording and reproducing apparatus embodying the invention. The embodiment, using the magneto-optical disc as its recording medium, will be described under the following headings in their listed order:

1. Constitution of the embodiment
2. P-TOC
3. U-TOC
   - — U-TOC sector 0
   - — U-TOC sector 1
   - — U-TOC sector 2
4. Area structure of the disc
5. Divide mode
6. Move mode
7. Input steps performed with jog dial
8. Music selection performed with jog dial
9. Clock setting performed with jog dial
10. Character input effected with jog dial
11. Programmed input effected with jog dial
12. Divide mode steps performed with jog dial
13. Move mode steps performed with jog dial

1. CONSTITUTION OF THE EMBODIMENT

Figure 3A:
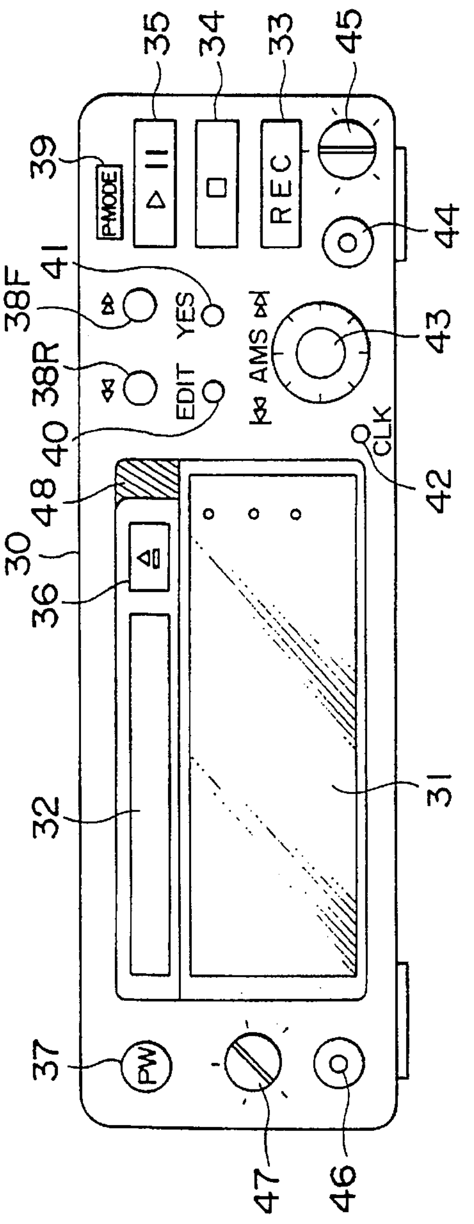
FIGS. 3 (*a*) and 3 (*b*) are outside views of a recording and reproducing apparatus embodying the invention, FIG. 3 (*a*) giving a front view of the embodiment, FIG. 3 (*b*) showing a display unit of the embodiment.
Figure 3B:
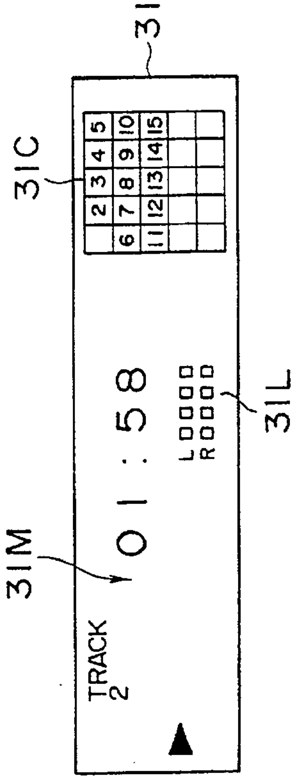

FIG. 3 (*a*) is a front view of the recording and reproducing apparatus embodying the invention. In FIG. 3 (*a*), reference numeral 30 represents the body of the embodiment, and 31 is a display unit such as an LCD. As shown in FIG. 3 (*b*), the display unit 31 includes an operation state display part 31M, a level display part 31L and a music calendar display part 31C. Depending on the ongoing operation or the mode currently in effect, the operation state display part 31M displays a track number, a playing time, the elapsed time of ongoing recording/reproduction, title characters, operation mode, and operation state.

The level display part 31L displays the recording or reproduction levels in a bar chart format. The music calendar display part 31C displays the track numbers identifying the tracks recorded on the disc that has been loaded. FIG. 3 (*b*) shows a typical operation state in which, of 15 pieces of music recorded on the disc, the second is being reproduced illustratively. The operation state display part 31M indicates a track number, the elapsed time of ongoing reproduction, and a symbol denoting the reproducing operation. In the music calendar, the first track number "1" is seen erased and track numbers "2" through "15" are left displayed. The display-related operations will be described later in more detail. Reference numeral 32 stands for a disc loading port through which a magneto-optical disc housed in a cartridge is loaded into the recording-reproducing system inside.

The body 30 of the embodiment includes various operating means constituting an operation unit. In FIG. 3 (*a*), reference numeral 33 is a recording key, 34 is a stop key, and 35 is a play key that doubles as a pause key. Reference numeral 36 is an eject key used to eject the loaded disc from inside the body, and 37 is a power key.

Referring further to FIG. 3 (*a*), reference numeral 38R is a fast-rewind play key, 38F is a fast-forward play key, 39 is a play mode key, 40 is an edit key, 41 is an enter key, and 42 is a clock key. The play mode key 39 is used to select: programmed reproduction mode in which the user-designated pieces of music are reproduced in the order designated by the user; random reproduction mode in which a plurality of pieces of music are reproduced in a random order; or repeated reproduction mode in which the designated piece or pieces of music are reproduced repeatedly.

The edit key 40 is used to select various edit modes. Pressing the enter key 41 executes the operation relevant to the currently selected mode. The edit modes include: erase mode in which the designated piece of music (i.e., track) is erased; all-erase mode in which all recorded pieces of music are erased; divide mode in which a piece of music is divided in the designated position; combine mode in which two designated pieces of music are combined into one; move mode in which the order of recorded pieces of music (i.e., track numbers) is changed; name input mode in which the designated piece of music is given a name or the currently loaded disc is given a disc title, the name or the disc title being stored; and name erase mode in which the name of a piece of music or a disc title is erased. Divide mode and move mode will be described later in more detail.

In a stopped state during reproduction, the display unit 31 displays in turn the indication of all-erase mode, name erase mode or name input mode every time the edit key 40 is pressed (for confirmation of mode transition). When the enter key 41 is pressed, the mode whose indication is currently selected and shown on the display unit 31 is entered.

Also in a stopped state during reproduction where a certain track number is selected, the display unit 31 displays in turn the indication of erase mode, combine mode, move mode or name input mode every time the edit key 40 is pressed (for confirmation of mode transition). When the enter key 41 is pressed, the mode whose indication is currently selected and shown on the display unit 31 is entered.

During reproduction, the display unit 31 displays in turn the indication of erase mode, divide mode, combine mode, move mode or name input mode every time the edit key 40 is pressed. When the enter key 41 is pressed, the mode whose indication is currently selected and shown on the display unit 31 is entered.

The clock key 42 is used to set the internal clock of the recording and reproducing apparatus 30. Pressing the clock key 42 causes the clock mode to be selected. In the clock mode, the user can set the current date and the time of day down to the seconds.

Reference numeral 43 in FIG. 3 (*a*) indicates a jog dial that functions as a selective input unit in the stopped state or during reproduction (i.e., music selection unit). One complete turn of the jog dial 43 corresponds to about 30 clicks. That is, giving the jog dial 43 a single turn allows the user to reach a 30th piece of music following or preceding the currently selected piece of music. While the magneto-optical disc for use with the embodiment is capable of storing up to 255 pieces of music, operating the jog dial 43 makes it easy for the user to select a piece of music far away from the currently selected one in the sequence of their track numbers.

The jog dial 43 is designated to be both rotatable and pressable. Pressing the jog dial 43 starts the reproducing operation. After a desired piece of music is selected by turning the jog dial 43, pressing the dial 43 starts reproducing that piece of music. When rotated clockwise, the jog dial 43 allows the user to reach pieces of music following the currently selected one; when rotated counterclockwise, the jog dial 43 provides access to pieces of music preceding the currently selected one.

The jog dial 43 is also used selectively to input values such as time-of-day settings in clock mode; the user-designated order of pieces of music to be reproduced in programmed reproduction mode; the dividing position from which to divide a desired track in divide mode; the selected desired piece of music from which to start reproduction in move mode; and characters (alphabetic and symbolic) constituting a name or title in name input mode.

Pressing the jog dial 43 can set the entry of: shifting of the input digits in clock mode (i.e., a digit shift order is issued); the programmed sequence of the pieces of music to be reproduced (a music reproduction sequence input completion order); the dividing position in divide mode (an execution order); the desired piece of music in move mode (an execution order); and the designated characters in name input mode (digit shift order). The operations performed by use of the jog dial 43 will be described later in more detail.

Reference numeral 44 in FIG. 3 (*a*) is a microphone terminal to which a microphone is connected for audio input; 45 is a recording level rheostat used to adjust the level of the input from the microphone; 46 is a headphone terminal to which headphones are connected for audio output; and 47 is a headphone level rheostat used to adjust the level of the output to the headphones.

In the rear of the apparatus housing are other terminals, not shown, such as line input and output terminals for the input and output of analog audio signals, and optical input and output terminals to which to connect an optical audio cable for the input and output of digital audio signals.

Figure 5:
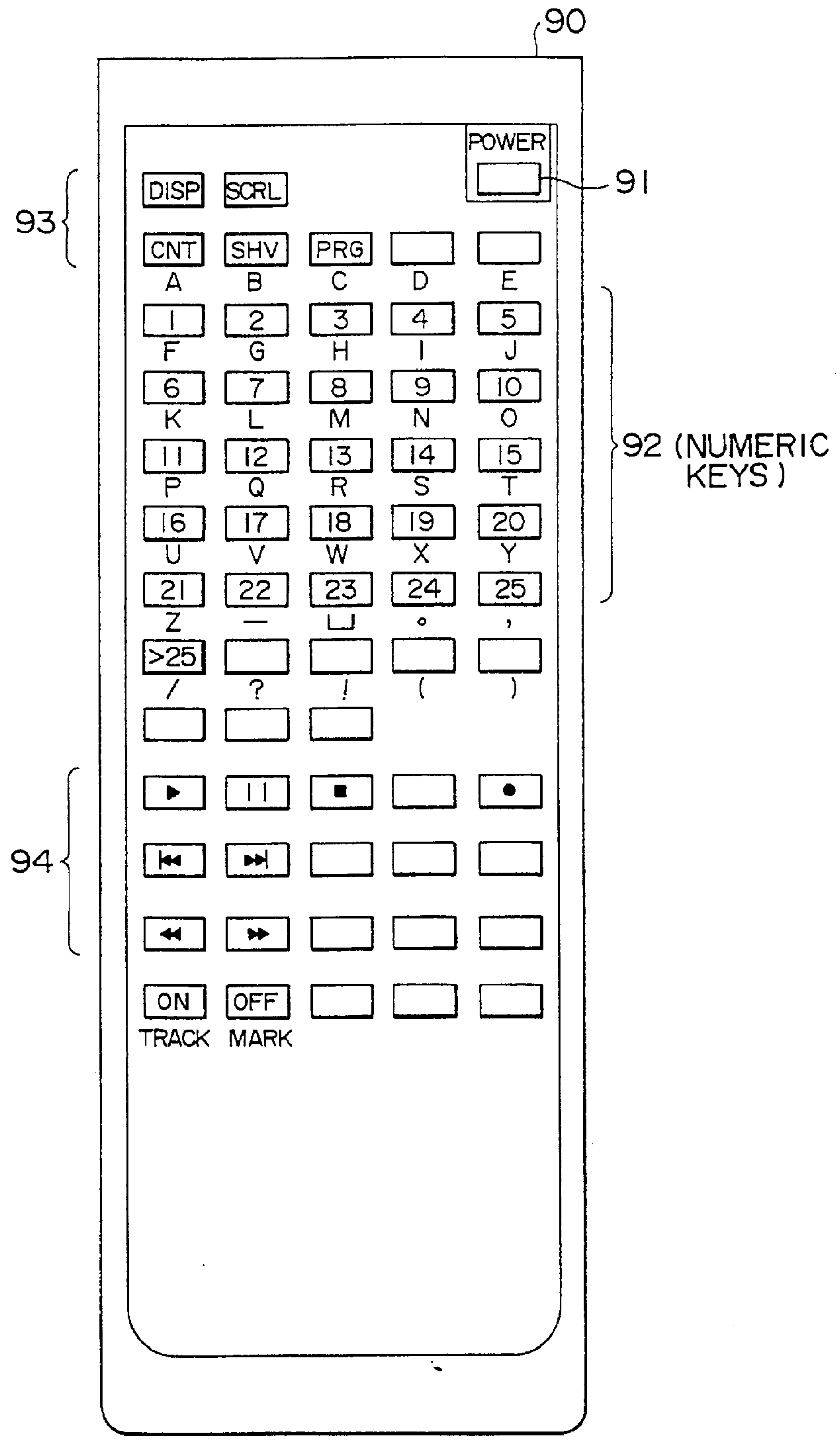
FIG. 5 is a plan view of a remote commander for use with the embodiment.

The body 30 of the embodiment includes an infrared ray receiving unit 48 that receives command signals on infrared rays coming from a remote commander 90 shown in FIG. 5.

The remote commander 90 illustratively comprises a power key 91, numeric keys 92, mode keys 93, and recording and reproduction keys 94. When any one of these keys is pressed, the command signal corresponding to the pressed key is read from an internal memory composed of a ROM or RAM. The command signal so read is modulated in infrared intensity before being output. The transmitted command signal is captured by the infrared ray receiving unit 48. On the remote commander 90, some of the keys represent alphabetic characters and symbols. These keys are used to input desired characters in name input mode.

Figure 4:
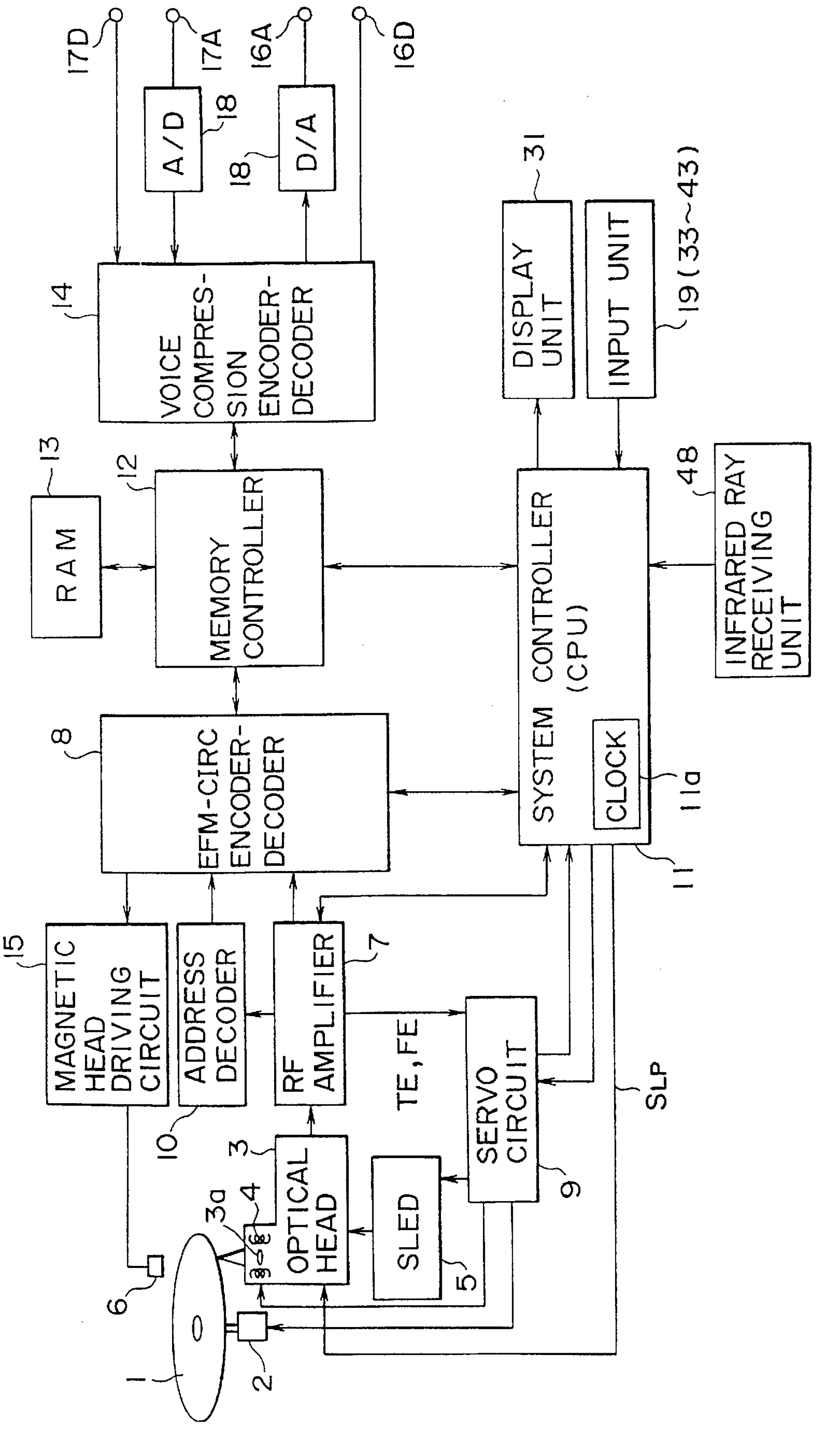
FIG. 4 is a schematic block diagram of the embodiment.

FIG. 4 is a schematic block diagram of the recording and reproducing apparatus 30 in FIGS. 3(*a*) and 3(*b*). In FIG. 4, reference numeral 1 is a magneto-optical disc which illustratively stores audio data and which is loaded through the disc loading port 32. Digital data illustratively representing pieces of music is recorded on the disc 1 after being prepared as follows: audio signals are first sampled at 44.1 kHz and subjected to the 16-bit quantization process. The resulting digital data is compressed to about one fifth of the original quantity through modified DCT (discrete cosine transform), the compressed data being subjected to EFM and CIRC encoding for storage on the disc.

The magneto-optical disc 1 is rotated by a spindle motor 2. An optical head 3 emits a light beam to the magneto-optical disc 1 for recording or reproduction. For recording, the optical head 3 emits a light beam whose level is high enough to heat the target recording track up to the Curie temperature; for reproduction, the optical head 3 emits a light beam whose level is relatively low but sufficient to detect data from the reflected light through the magnetic Kerr effect.

These functions are accomplished by the optical head 3 equipped with a laser diode used as a light source, with a polarization beam splitter and an objective lens 3*a* constituting an optical system, and with a detector that detects the reflected light from the disc 1. The objective lens 3*a* is supported relocatably by an actuator 4 so that the lens will move over the disc 1 in the radial direction thereof and in close proximity thereto.

A magnetic head 6 applies to the magneto-optical disc 1 a vertical magnetic field modulated by data. The magnetic head 6 is positioned opposite to the optical head 3 with the magneto-optical disc 1 interposed therebetween. The entire optical head 3 and the magnetic head 6 are supported by a sled mechanism 5 in a manner relocatable in the radial direction of the disc.

During reproduction, the optical head 3 detects data from the magneto-optical disc 1 and supplies an RF amplifier 7 therewith. Operating on the data thus supplied, the RF amplifier 7 extracts therefrom a reproduced RF signal, a tracking error signal, a focus error signal, absolute position data (recorded as pre-grooves (wobbling pre-grooves) on the magneto-optical disc 1), address data and a focus monitor signal. The reproduced RF signal so extracted is fed to an encoder-decoder 8. The tracking error signal and focus error signal are supplied to a servo circuit 9. The address data is sent to an address decoder 10, while the absolute position data and focus monitor signal are fed to a system controller 11 composed illustratively of a microcomputer.

The servo circuit 9 receives not only the tracking error signal and focus error signal, but also a track jump command and a seek command from the system controller 11 as well as revolving speed data from the spindle motor 2. In turn, the servo circuit 9 generates various servo driving signals with which to operate the actuator 4 and sled mechanism 5 for focusing and tracking control. The servo circuit 9 also controls the spindle motor 2 at a constant angular velocity (CAV) or a constant linear velocity (CLV).

The reproduced RF signal is subjected to EFM and CIRC decoding before being written by a memory controller 12 to a buffer memory 13 for temporary storage. Data is read from the magneto-optical disc 1 by the optical head 3 and transferred from the optical head 3 to the buffer memory 13 intermittently and at a rate of 1.41 megabits per second. The buffer memory 13 is a RAM of a one- to four-megabit capacity.

The data written to the buffer memory 13 is read therefrom at a transfer rate of 0.3 megabits per second and supplied to an encoder-decoder 14. The data compressed by the modified DCT process is decoded by the encoder-decoder 14 back to quantized 16-bit output digital signals.

The output digital signals are converted to analog signals by a D/A converter 18 before reaching a terminal 16A. From the terminal 16A, the analog signals pass through relevant circuit portions to reach the headphone terminal 46 and line output terminal. Alternatively, the output digital signals from the encoder-decoder 14 are not converted to analog format and are fed directly via a terminal 16D to the optical output terminal.

Data is written to and read from the buffer memory 13 through addressing by the memory controller 12 effecting write and read pointer control. The write pointer (to the write address) is incremented at the rate of 1.41 megabits per second, and the read pointer (to the read address) is incremented at the rate of 0.3 megabits per second, as mentioned above. The difference in bit rate between writing and reading causes data to accumulate in the buffer memory 13. When the buffer memory 13 is filled with data, the incrementing of the write pointer is stopped and the read operation from the magneto-optical disc 1 by the optical head 3 is also halted. But the reproduced audio output continues because the read pointer is kept incremented.

Thereafter, only the read operation from the buffer memory 13 is allowed to continue until the amount of data accumulated in the buffer memory 13 drops below a predetermined level. At that point, the optical head 3 resumes reading of data from the disc and the incrementing of the write pointer is resumed. Then data is again getting accumulated in the buffer memory 13.

As long as reproduced audio signals are output via the buffer memory 13, the reproduced audio output will not be interrupted even if tracking is disturbed by an external factor. The reproducing operation is allowed to continue with no adverse effect on the reproduced output because the correct tracking position can be resumed for access to data before the accumulated data in the buffer memory is exhausted. This significantly enhances the resistance of the apparatus in operation to impact and vibration.

Referring to FIG. 4, the encoder-decoder 8 receives address data from the address decoder 10 and sub-code data for control purposes and passes them on to the system controller 11 so that various control operations are carried out by the latter. The system controller 11 is also fed with a lock detection signal from a PLL circuit generating a bit clock signal for recording and reproducing operations, and with monitor signals indicating any missing frame sync signal in the reproduced data (on left and right channels).

The system controller 11 outputs a laser control signal SLP for controlling the operation of the laser diode in the optical head 3. Specifically, the system controller 11 turns on and off the laser diode output as required. With the laser diode turned on, the system controller 11 switches between the laser diode output for reproduction and that for recording. The output for reproduction involves a relatively low light beam output level, whereas the output for recording necessitates a relatively high light beam output level.

For recording of data to the magneto-optical disc 1, an analog audio signal input from the microphone terminal 44 or line input terminal is first supplied to a terminal 17A. The audio signal is converted by an A/D converter 18 to digital data sampled at 44.1 kHz and quantized in 16 bits. Thereafter, the digital data is sent to the encoder-decoder 14. Alternatively, a digital audio signal input from the optical input terminal is supplied directly via a terminal 17D to the encoder-decoder 14.

The encoder-decoder 14 subjects the input digital audio signal to voice compression encoding based on the modified DCT process. The recording data so compressed by the encoder-decoder 14 is written temporarily to the buffer memory 13 and then read therefrom at an appropriate timing for output to the encoder-decoder 8. The encoder-decoder 8 subjects the received data to such encoding processes as CIRC and EFM. The encoded data is fed to a magnetic head driving circuit 15.

The magnetic head driving circuit 15 supplies the magnetic head 6 with magnetic head driving signals representing the recording data that has been encoded. Specifically, the magnetic head driving circuit 15 causes the magnetic head 6 to apply an N- or S-polarized vertical magnetic field to the magneto-optical disc 1. Concurrently, the system controller 11 supplies control signals to the optical head 3 so as to output a recording-level light beam.

Reference numeral 19 is an input unit comprising keys to be operated by the user (i.e., keys 33 through 43 and the jog dial). Upon receipt of an infrared ray command signal from the remote commander 90, the infrared ray receiving unit 48 converts the received signal into an electrical signal composed of command pulses. The electrical signal is sent to the system controller 11. Given the signal, the system controller 11 carries out various operations accordingly. In this manner, the apparatus is operated remotely by use of the remote commander 90.

The system controller 11 includes an internal clock mechanism 11*a* that provides current chronological information (time of day down to the seconds, date, month, year). Illustratively, the clock mechanism 11*a* causes the display unit 31 to display the time of day and the current date. Upon recording, the clock mechanism 11*a* allows the date and the time of day of recording to be recorded to the disc 1. When setting the clock, the user presses the clock key 42 to select clock mode and operates the jog dial to set the correct time.

When data is to be written to or read from the disc 1, the system controller 11 reads control data from the P-TOC (pre-mastered TOC) and/or U-TOC thereby to identify the addresses of the segments to or from which to write or read the target data. The control data thus read is held in the buffer memory 13. The buffer memory 13 includes, apart from the buffer area for keeping the control data, a recording data/reproduced data buffer area for accommodating the data to be recorded or reproduced.

When the disc 1 is loaded into the apparatus, the system controller 11 moves the optical head 3 to the innermost tracks of the disc 1 to read the control data therefrom. The control data so read is held in the buffer memory 13 and referenced subsequently for writing or reading of data to or from the disc 1.

The U-TOC is updated every time data is written or erased to or from the disc 1. That is, the system controller 11 edits the U-TOC data in the buffer memory 13 every time the disc 1 is accessed for recording or erasure. The U-TOC area on the disc 1 is also updated concurrently and at an appropriate timing.

2. P-TOC

What follows is a description of the P-TOC sectors of the disc 1 accommodating the control data used to manage audio data sectors where data is recorded in a sector data format; the control data so accommodated is also used to manage the recording and reproducing operation of audio data to and from these sectors. Unlike the U-TOC sectors to be described later, the P-TOC sectors cannot be updated. The P-TOC data allows the user to designate recordable areas (called recordable user areas) and to manage the U-TOC areas. If the disc 1 is a read-only type optical disc, the P-TOC data is used to manage the pieces of music recorded in a ROM format on the disc 1.

The representative P-TOC format is shown in FIG. 6. FIG. 6 is a schematic view of P-TOC sector 0 located illustratively on the innermost side of the disc, the sector accommodating control data recorded repeatedly. The P-TOC format is optional from sector 1 and on.

The data area of a P-TOC sector (4 bytes×588=2,352 bytes) is identified as a P-TOC area by a header. This header comprises a one-byte data synchronization pattern (consisting of all 0's or 1's) at the beginning followed by four bytes of cluster- and sector-indicating addresses.

The header is followed by ASCII identification codes representing characters "MINI" at appropriate addresses. These characters are in turn followed by the disc type, recording level, the track number of the first piece of music recorded on the disc (First TNO), the track number of the last piece of music recorded on the disc (Last TNO), a lead-out start address $RO_A$, a power calibration area start address $PC_A$ to which to test-write data for adjusting the output level of the light beam, a U-TOC start address $UST_A$ (identifying the data area of U-TOC sector 0 of FIG. 7, to be described later), and a recordable user area start address $RST_A$.

The recordable user area start address is followed by a corresponding table designating data area having table pointers (P-TNO1 through P-TNO255) that key the recorded pieces of music or other items on the disc to part tables in a management table area, to be described later.

The corresponding table designating data area is followed by the management table area comprising 255 part tables (01h–FFh) corresponding to the table pointers (P-TNO1–P-TNO255) in the designating data area. In this specification, values suffixed with a character h stand for hexadecimal numbers. Each of the part tables accommodates a start address and an end address for identifying a segment, as well as what is known as mode information about that segment or track.

The mode information regarding a track and held in a given part table indicates illustratively whether the segment corresponding to that track is protected against overwrite or data copy operations, whether the data in the segment is audio data or something else, and whether the data is stereo or monaural data.

The part tables 01h to FFh in the management table area indicate the contents of the segments pointed to by the table pointers P-TNO1 through P-TNO255 in the corresponding table designating data area. Illustratively, the first piece of music is identified by the table pointer P-TNO1 pointing to a certain part table (e.g., part table 01h). In practice, the table pointer has a value which points to a specific part table identified by a byte position in P-TOC sector 0 determined through appropriate calculations. In this case, the start address of the part table (01h) constitutes the start address of the first piece of music recorded on the disc; likewise, the end address of the part table (01h) serves as the end address of the first piece of music. The track mode information involved is associated with the first piece of music.

As with the first piece of music, the second piece of music has its start and end addresses as well as its track mode information recorded in the part table (e.g., part table 02h) pointed to by the table pointer P-TNO2. Since there may be provided table pointers up to P-TNO255, up to 255 pieces of music can be managed by use of the P-TOC. Where P-TOC sector 0 is formed as described above, it is possible to access and reproduced any desired piece of music from the disc.

The rewritable magneto-optical disc has no area having physical bumps and recesses (i.e., pits) formed therein beforehand. Therefore the above-described corresponding table designating data area and management table area are not used with the rewritable magneto-optical disc. All data recorded on the disc is managed by use of the U-TOC, to be described later. All bytes are thus given as 00h.

Apart from the rewritable magneto-optical disc, there exist read-only type discs on which all pieces of music are written in pits, and hybrid type discs having both ROM areas (where pieces of music are recorded in pit form) and magneto-optical areas. These types of discs utilize the corresponding table designating data area and the management table area for managing pieces of music stored in their ROM area.

3. U-TOC

The U-TOC will now be described. U-TOC sectors 0 through 2 will in turn be described in detail.

U-TOC Sector 0

FIG. 7 shows the representative format of U-TOC sector 0 on the disc. U-TOC sector 0 serves as a data area that stores control data about user-recorded pieces of music and about unrecorded areas (i.e., free areas) in which new pieces of music may be recorded by the user. The U-TOC format is optional from sector 1 and on.

When a new piece of music is to be recorded to the disc 1, the system controller 11 first refers to the U-TOC to find free areas. The target data is then recorded to any of the free areas so found. At the time of reproduction, the system controller 11 checks the U-TOC to find the area containing the piece of music to be reproduced. The area thus found is then accessed for reproduction.

As with the P-TOC, U-TOC sector 0 of FIG. 7 is headed by a header, followed at appropriate addresses by such data as the manufacturer code, model code, the track number of the first piece of music (first TNO) recorded on the disc, the track number of the last piece of music (last TNO) recorded on the disc, sector utilization status, disc serial number, and disc ID. U-TOC sector 0 also includes a corresponding table designating data area storing various table pointers (P-DFA, P-EMPTY, P-FRA, P-TNO1–P-TNO255) for keying user-recorded data areas and free areas to a management table area, to be described later.

The corresponding table designating data area is followed by the management table area comprising 255 part tables (01h–FFh) corresponding to the table pointers (P-TNO1–P-TNO255) in the designating data area. As with P-TOC sector 0 of FIG. 6, each of the part tables accommodates a start address and an end address for identifying a segment, as well as mode information about that segment. Specific to U-TOC sector 0 is the presence of link data which applies to cases where the segment indicated by the part table in question is to be linked to another segment. Specifically, the link data indicates the part table that contains the start and end addresses for identifying the destination segment to be linked.

The recording and reproducing apparatus according to the invention has no trouble continuously reproducing data constituting a whole piece of music from one physically discontinuous disc portion to another, i.e., through access to a plurality of discrete segments storing the relevant data. Conversely, a user-recorded piece of music may be divided into a plurality of segments so as to maximize the efficiency of recordable area utilization. This is there the link data is used advantageously. Illustratively, any of the numbers 01h through FFh assigned to the part tables (actually values representing the byte positions in U-TOC sector 0 determined through appropriate calculations) are used to designate the part tables to be linked. With the read-only type optical disc, the pieces of music recorded in pit form are generally not divided into segments. In such a case, all link data in P-TOC sector 0 is 00h, as shown in FIG. 6.

In the management table area of U-TOC sector 0, one part table represents one segment. With a piece of music formed by linking three segments, for example, the segment positions are managed using three part tables linked by the relevant link data.

The part tables 01h through FFh in the management table area of U-TOC sector 0 indicate the contents of the segments pointed to by the table pointers (P-DFA, P-EMPTY, P-FRA, P-TNO1–P-TNO255) in the corresponding table designating data area. The contents of the segments are indicated as follows:

The table pointer P-DFA points to a defective area on the magneto-optical disc 1. Specifically, the table pointer P-DFA designates the single part table or the first of a plurality of part tables representing a damaged or otherwise defective track (=segment) on the disc 1. That is, where a defective segment exists, the table pointer P-DFA contains any one of the values 01h through FFh, and the part table(s) corresponding to that pointer indicates the defective segment by use of its start and end addresses. If another defective segment is present, the link data in the current part table points to another part table which indicates the additional defective segment. If no other defective segment exists, the link data in the current part table is illustratively 00h denoting no further segment to be linked.

The table pointer P-EMPTY points to the single empty part table or the first of a plurality of empty part tables in the management table area. Where there is a single empty part table, that table is identified by the table pointer P-EMPTY being any one of the pointers 01h through FFh. If a plurality of empty part tables exist, these tables are linked successively by use of the relevant link data and designated starting from the one identified by the table pointer P-EMPTY. Thus all empty part tables are linked in the management table area.

The table pointer P-FRA points to a free area (writable area or erased area) on the magneto-optical disc 1. Specifically, the table pointer P-FRA designates the single free part table or the first of a plurality of free part tables identifying a track portion (i.e., segment) constituting the free area. Where a free area exists, the table pointer P-FRA contains any one of the values 01h through FFh, and the part table corresponding to that pointer indicates the start and end addresses of the segment that is the free area. Where a plurality of such segments exist (i.e., where there exist a plurality of part tables indicating free areas), the relevant link data links the part tables successively up to the one having link data "00h."

Figure 8:
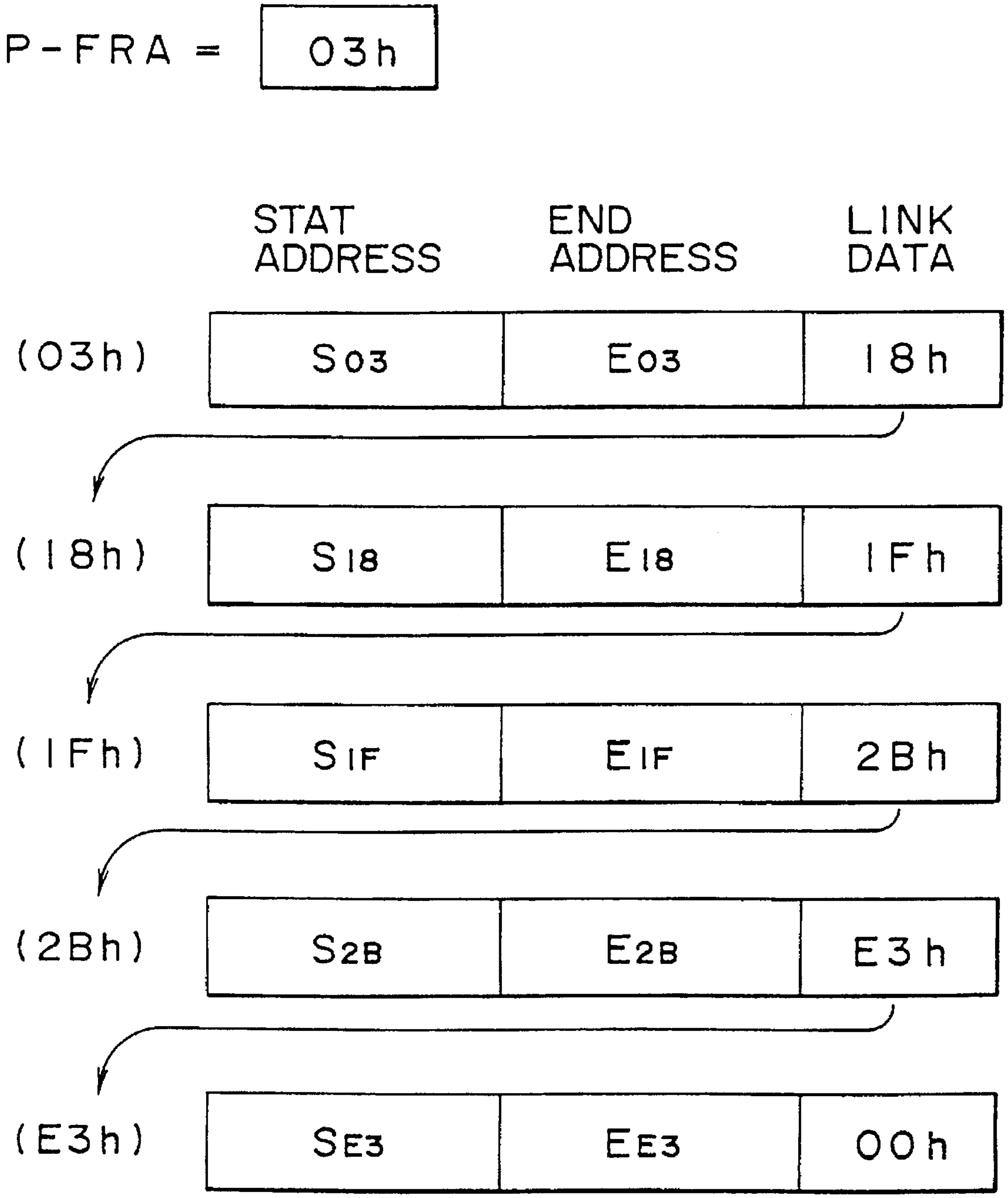
FIG. 8 is a schematic view of a U-TOC sector linking structure on the disc.

FIG. 8 shows schematically how segments serving as free areas are managed by use of part tables. This is an example in which the segments 03h, 18h, 1Fh, 2Bh and E3h serving as free areas are linked respectively by the part tables 03h, 18h, 1Fh, 2Bh and E3h following the corresponding table designating data P-FRA. The above-described defective area and empty part tables are also managed in like manner.

If the magneto-optical disc has no audio data recorded thereon and includes no defective area, the table pointer P-FRA designates the part table 01h. This indicates that the entire recordable user area on the disc constitutes a free area. Because the remaining part tables 02h through FFh are not used, the table pointer P-EMPTY designates the part table 02h, the link data in the part table 02h designates the part table 03h, the link data in the part table 03h in turn designates the part table 04h, and so on, until the part table FFh is reached. The link data in the part table FFh is 00h denoting no further table to be linked. In this case, the part table 01h stores therein the start address of the recordable user area as its start address, and the address preceding the lead-out start address as its end address.

The table pointers P-TNO1 through P-TNO255 are used to point to pieces of music that may be recorded by the user on the magneto-optical disc 1. For example, the table pointer P-TNO1 designates the part table pointing to the single segment or the chronological first of a plurality of segments accommodating the first piece of music.

Suppose that the first piece of music in its entirety is recorded undivided, i.e., recorded in a single segment on the disc. In that case, the recording area of that piece of music is identified by the start and end addresses contained in the part table pointed to by the table pointer P-TNO1.

If the second piece of music is recorded in a plurality of discrete segments on the disc, these segments are designated in the chronologically correct order to provide the recorded positions of that piece of music. That is, as in the case of FIG. 8, the part table pointed to by the table pointer P-TNO2 is linked by link data to another part table that is immediately downstream chronologically; the latter part table is in turn linked chronologically to another part table, and so on until the part table with link data "00h" is reached. The second piece of music is thus constituted by chronologically linking all necessary segments containing the relevant data. In this manner, when the data in U-TOC sector 0 is used to reproduce the second piece of music or to overwrite data on the disc region containing the second piece of music, the optical head 3 and magnetic head 6 are operated suitably to reproduce continuously the music data from the relevant discrete segments on the disc or to write the target data thereon through an efficient use of writable areas.

U-TOC Sector 1

FIG. 9 depicts the representative format of U-TOC sector 1. This sector is allocated as a data area in which to store character data entered primarily when the user names a recorded piece of music or gives a title to the disc.

U-TOC sector 1 has a character table designating data area including table pointers P-TNA1 through P-TNA255 which correspond to recorded pieces of music. U-TOC sector 1 also has a character table area comprising 255 part tables 01h through FFh of 8 bytes each, pointed to by the table pointers P-TNA1 through P-TNA255. These arrangements of U-TOC sector 1 for character data management are basically the same as those of the above-described U-TOC sector 0.

The part tables 01h through FFh store in ASCII codes the character data representing a disc title (also called a disc name) and the names of pieces of music. An eight-byte portion preceding the part table 01h is an area dedicated to the storage of a disc name.

Illustratively, the part table pointed to by the table pointer P-TNA1 stores the characters entered by the user as the name of the first piece of music. The characters entered by the user are not limited to those constituting a track name. Since part tables can be linked by use of link data where necessary, more than seven bytes (i.e., more than 7 characters) may be used to name a single piece of music. In U-TOC sector 1 as in the case of U-TOC sector 0, the table pointer P-EMPTY is used to manage empty part tables.

The user inputs characters illustratively to form the name of a piece of music as follows: in recording, reproduction or in a stopped state, the user first designates a desired piece of music and then presses the edit key 40 to select name input mode. In name input mode, the user turns the jog dial 43 and then presses it to select each character. When all characters have been selected, the user presses the enter key 41 to enter the characters. Alternatively, the remote commander 90 may be used to select and enter necessary characters. With the characters entered, the system controller 11 updates the U-TOC area on the disc 1 when appropriate by referring to the U-TOC data in the buffer memory 13.

U-TOC Sector 2

FIG. 10 shows the representative format of U-TOC sector 2. This sector is allocated as a data area in which to record the time of day and the date in effect when the user records any piece of music.

U-TOC sector 2 has a time-of-day data table designating data area including table pointers P-TRD1 through P-TRD255 which correspond to recorded pieces of music. U-TOC sector 2 also has a time-of-day data table area comprising 255 part tables 01h through FFh of 8 bytes each, pointed to by the table pointers P-TRD1 through P-TRD255. These arrangements of U-TOC sector 2 for character data management are basically the same as those of the above-described U-TOC sector 0.

The part tables 01h through FFh each store the time-of-day data including the date about a given piece of music (i.e., track) in six bytes. Of the six bytes, one byte stands for the numeric entry of the year, another for the month, another for the day, another for the hours, another for the minutes and another for the seconds. Of the remaining two bytes, one represents a manufacturer code and the other a model code. The manufacturer code is code data identifying the manufacturer of the recording apparatus having recorded the piece of music in question. The model code is code data indicating the model of the recording apparatus that performed the recording. An eight-byte portion preceding the part table 01h is an area dedicated to the storage of the time-of-day data including the date regarding the disc.

Illustratively, when a first piece of music is recorded on the disc, the part table pointed to by the table pointer P-TRD1 stores the time of day and the date of the recording, the manufacturer code identifying the recording apparatus involved, and the model code indicating the model of the apparatus. The time-of-day data including the date is recorded automatically by referencing the internal clock of the recording apparatus.

In U-TOC sector 2 as in the case of U-TOC sector 0, the table pointer P-EMPTY is used to manage empty part tables. The empty part tables accommodate link data in place of model codes. That is, the empty part tables headed by the table pointer P-EMPTY are linked and managed by use of the link data.

Where the magneto-optical disc storing the above-described TOC data is loaded, the recording and reproducing apparatus of the invention manages the recording areas on the disc by placing the TOC data into its buffer memory 13 for recording and reproduction control. Numerals and characters read out as TOC data may be displayed on the display unit 31 as the name of a piece of music and the time of day and the date of recording.

4. AREA STRUCTURE OF THE DISC

Figure 11A:
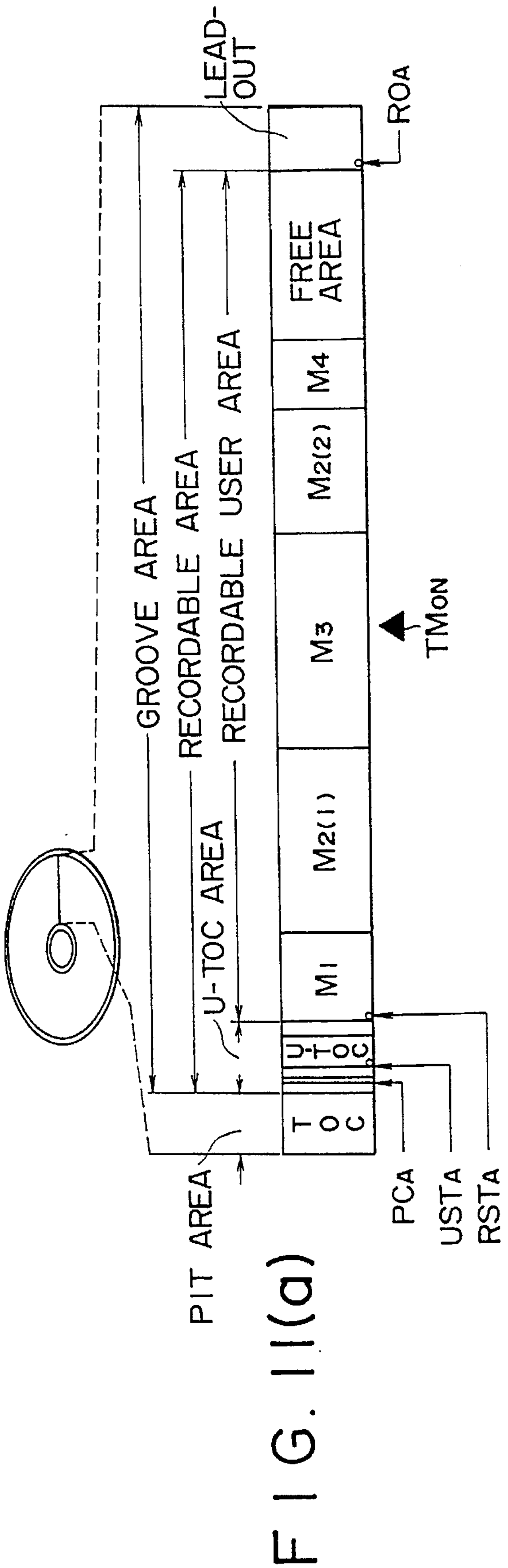
FIGS. 11 (*a*) to 11 (*c*) are schematic views showing typical area structures on the disc and explaining how divide and move modes are effected illustratively from an area structure point of view.
Figure 11B:
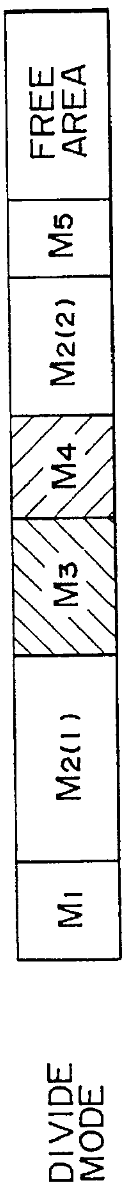
Figure 11C:
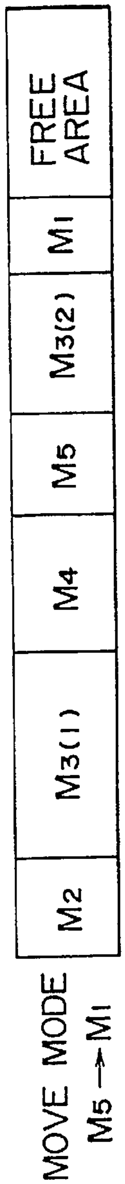

FIGS. 11 (*a*) to 11 (*c*) are schematic views showing typical area structures on the disc 1 on which data is written by the recording and reproducing apparatus 30. FIG. 11 (*a*) depicts schematically the area structure in its radial direction. The magneto-optical disc has two broad categories of area: a ROM area shown as a pit area in FIG. 11 (*a*) where data is prerecorded in embossed pits, and a groove area where data may be recorded by the user.

The pit area has P-TOC data recorded repeatedly therein. As described above, the P-TOC comprises such addresses as a U-TOC start address $UST_A$, a lead-out start address $RO_A$, a recordable user area start address RSTA, and a power calibration area start address $PC_A$ to which to test-write data for adjusting the output level of the light beam.

Next to the pit area located on the innermost track side of the disc is the groove area. In the groove area, the portion immediately following the pit area and leading up to the lead-out start address $RO_A$ is a recordable area; the rest of the groove area constitutes the lead-out area.

In the groove area, the recordable user area where music data tracks are actually recorded ranges from the recordable user area start address $RST_A$ to the location immediately preceding the lead-out start address $RO_A$.

Within the groove area, the area preceding the recordable user area start address $RST_A$ is a management area that accommodates the above-mentioned U-TOC and other data for managing recording and reproducing operations. One cluster following the power calibration area start address $PC_A$ is allocated as the power calibration area in which to test-write data for adjusting the output level of the light beam. The U-TOC data is recorded continuously in three clusters starting from the location designated by the U-TOC start address $UST_A$ inside the area for managing recording and reproducing operations.

5. DIVIDE MODE

The recording and reproducing apparatus of this invention records data in the manner described to the recordable user area. The recorded pieces of music (i.e., tracks) are managed by use of the U-TOC as described. It is according to the U-TOC data that pieces of music are recorded or reproduced. Simply updating the U-TOC data permits such edit operations as the dividing of a track, the combining of tracks, and the moving of track numbers. The combining of tracks is not directly relevant to the scope of this invention and will not be discussed further.

Suppose that the recordable user area has four pieces of music $M_1$ through $M_4$ recorded therein, as shown in FIG. 11 (*a*). In that case, the piece of music $M_2$ is recorded in two portions, the first half marked as $M_{2(1)}$ and the second half as $M_{2(2)}$. The area on the outer disc track side of the segment accommodating the piece of music $M_4$ is a free area that has yet to record any piece of music.

The recorded portions outlined above are identified and managed by their start and end addresses in the part tables pointed to by the table pointers P-TNO1 through P-TNO4 as well as P-FRA within the U-TOC.

The remote commander 30 for operating the recording and reproducing apparatus 30 has two track mark keys, a mark-on key 95 and a mark-off key 96. Illustratively, operating the mark-on key 95 while reproduction is under way divides the currently playing piece of music. Alternatively, it is possible to select divide mode and operate the jog dial, as will be described later, in order to designate a dividing position and execute the divide operation with respect to that position.

For example, suppose that the user designates a position identified as $TM_{ON}$ in FIG. 11 (*a*), i.e., a halfway position within the piece of music $M_3$ to be divided, and carries out the divide operation. In that case, the system controller 11 updates the U-TOC data as per the divide operation and divides the piece of music $M_3$ into two pieces of music, $M_3$ and $M_4$, as depicted in FIG. 11 (*b*). Here, the initial piece of music $M_4$ has its track number moved up by the divide operation and is now managed as the new piece of music $M_5$.

For example, within the U-TOC data, the end address in the part table pointed to by the table pointer P-TNO3 is updated so that the piece of music $M_3$ will end at the dividing position. The table pointer P-TNO4 designates a new part table. The start and end addresses in the part table pointed to by the new value of the table pointer P-TNO4 are rewritten to represent the newly created piece of music $M_4$ following the divide operation. The old value of the table pointer P-TNO4 is written to the table pointer T-TNO5 so that the initial piece of music $M_4$ is now managed as the new piece of music $M_5$.

Effecting the divide operation in the above manner allows a desired dividing position to represent the start address of a desired piece of music. That piece of music is then search for and accessed with ease by a music selecting operation.

6. MOVE MODE

Move mode in connection with the invention will now be described. Suppose that the state of FIG. 11 (*b*) is desired to be changed so that the piece of music $M_5$ may become the first piece of music. In that case, the user designates the piece of music $M_5$, enters move mode, and selects track number 1 as the destination track number. This causes the piece of music $M_5$ to be handled as the new piece of music $M_1$ and moves up by 1 the track numbers of the initial pieces of music $M_1$ through $M_4$. As a result, these four pieces of music are now handled as pieces of music $M_2$ through $M_5$, as shown in FIG. 11 (*c*).

For example, within the U-TOC data, the value of the table pointer P-TNO1 is replaced by that of the table pointer P-TNO5; the value of the table pointer P-TNO2 is replaced by that of the table pointer P-TNO1; the value of the table pointer P-TNO3 is replaced by that of the table pointer P-TNO2; the value of the table pointer P-TNO4 is replaced by that of the table pointer P-TNO3; and the value of the table pointer P-TNO5 is replaced by that of the table pointer P-TNO4. This process completes the move operation of the above example. Thereafter, the pieces of music are reproduced in the newly arranged order.

7. INPUT STEPS PERFORMED WITH JOG DIAL

Figures 12A, 12B:
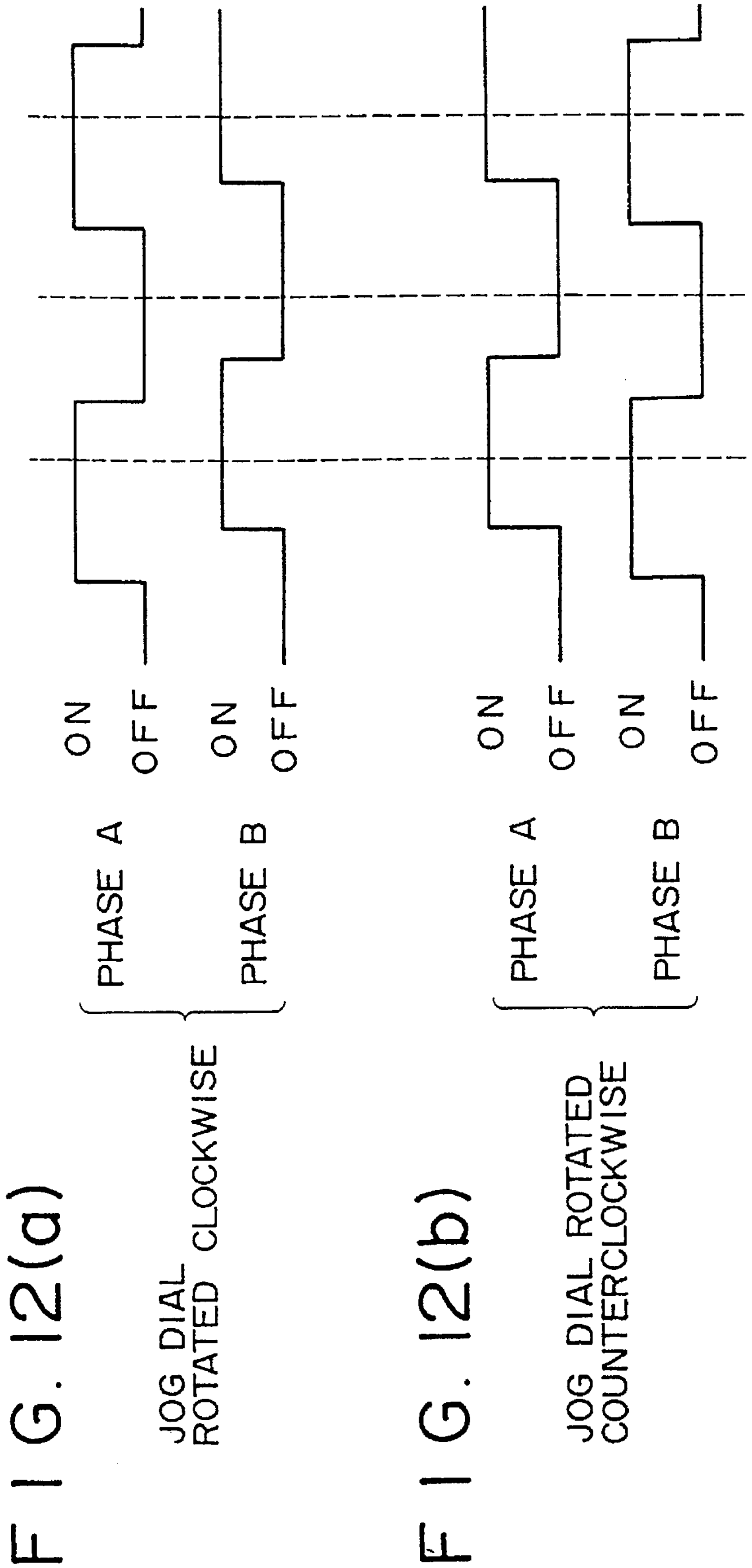
FIGS. 12 (*a*) and 12 (*b*) are views depicting input signals generated by use of a jog dial of the embodiment.

The recording and reproducing apparatus of this invention allows the user to carry out various operations with the jog dial 43. When rotated, the jog dial 43 generates pulses as illustrated in FIGS. 12 (*a*) and 12 (*b*). Given the pulses, the system controller 11 detects the revolutions made on the jog dial 43 and determines what they represent.

The jog dial 43 has three terminals, A, B and C, and is designed to generate a phase A output between terminals A and B and a phase B output between terminals B and C. Depending on which direction the jog dial 43 is turned in, a phase difference pulse output is generated in phase A or B. When the jog dial 43 is rotated clockwise, the outputs in phases A and B occur as shown in FIG. 12 (*a*); when the jog dial 43 is rotated counterclockwise, the outputs in phases A and B occur as illustrated in FIG. 12 (*b*). Broken lines across the figures indicate some click positions in effect when the jog dial 43 is turned. For example, a single complete turn of the jog dial 43 corresponds to about 30 clicks.

Figure 13:
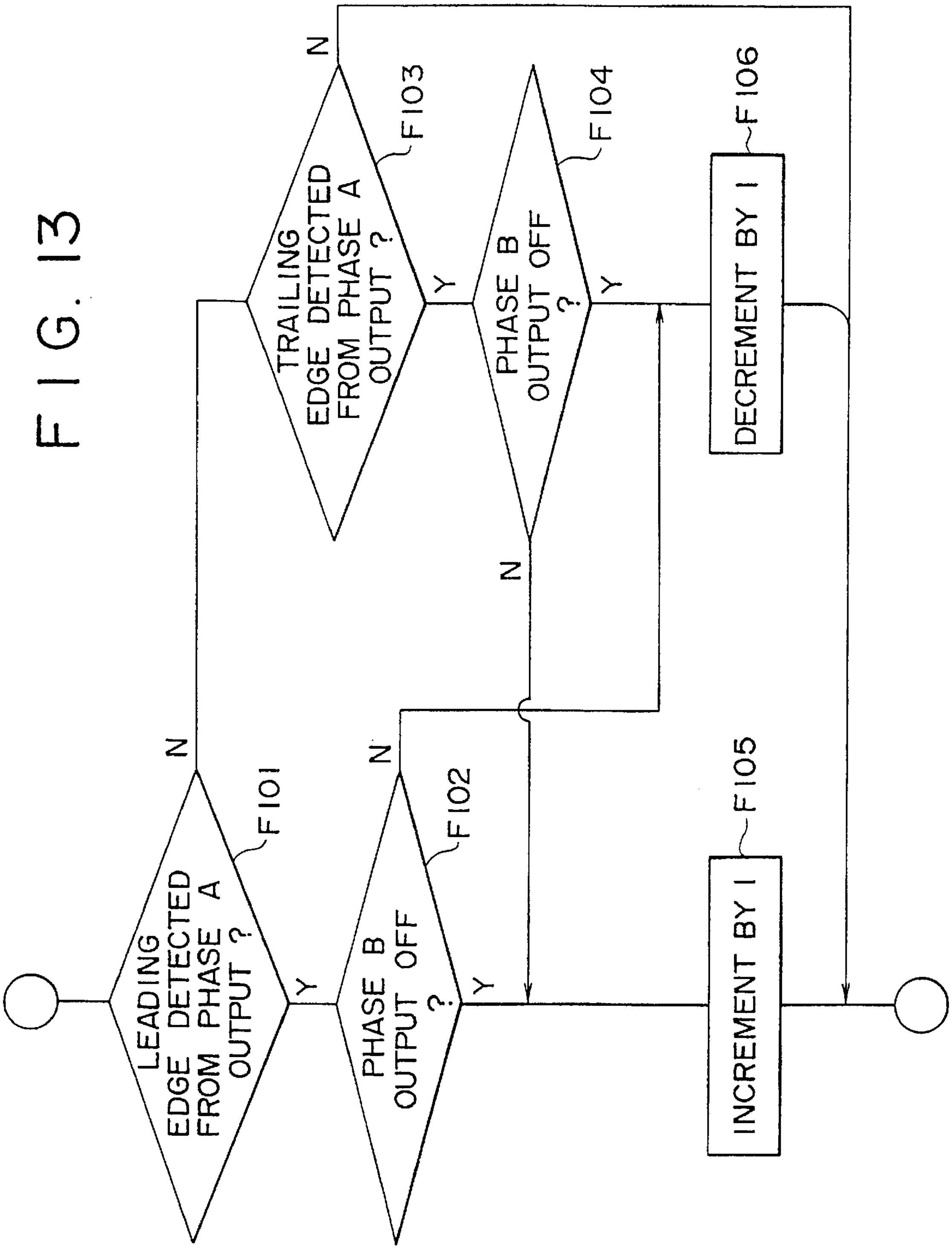
FIG. 13 is a flowchart of input steps carried out when the jog dial of the embodiment is operated.

Given the phase difference pulse output, the system controller 11 determines how the jog dial 43 is operated by following the steps in FIG. 13. On detecting a leading edge from the phase A output, the system controller 11 checks to see if the phase B output is turned off (i.e., at Low level; steps F101 and F102). If a trailing edge is detected from the phase A output, the system controller 11 also checks to see if the phase B output is turned off (i.e., at Low level; steps F103 and F104).

With the jog dial 43 rotated clockwise, the phase B output is off at a leading edge of the phase A output, or on at a trailing edge of the phase A output, as shown in FIG. 12 (*a*). Thus if the result of the check in step F102 is affirmative or if the result of the check in step F104 is negative, the jog dial 43 is considered to be turned clockwise. The system controller 11 then goes to step F105. In step F105, the system controller 11 recognizes an increment of 1 to the dial-set variable.

When the jog dial 43 is found to be rotated counterclockwise, the phase B output is on at a leading edge of the phase A output, or off at a trailing edge of the phase A output, as shown in FIG. 12 (*b*). Thus if the result of the check in step F102 is negative or if the result of the check in step F104 is affirmative, the jog dial 43 is considered to be turned counterclockwise. The system controller 11 then goes to step F106. In step F106, the system controller 11 recognizes a decrement of 1 from the dial-set variable.

When the jog dial 43 is pressed, the system controller 11 considers the manipulation to be an enter operation or other relevant action applicable to the operation mode currently selected.

8. MUSIC SELECTION PERFORMED WITH JOG DIAL

The jog dial is provided basically for the user to carry out music selection procedures. How pieces of music are selected using the jog dial 43 will now be described by referring to FIGS. 14 through 18 (*i*).

Figure 14B:
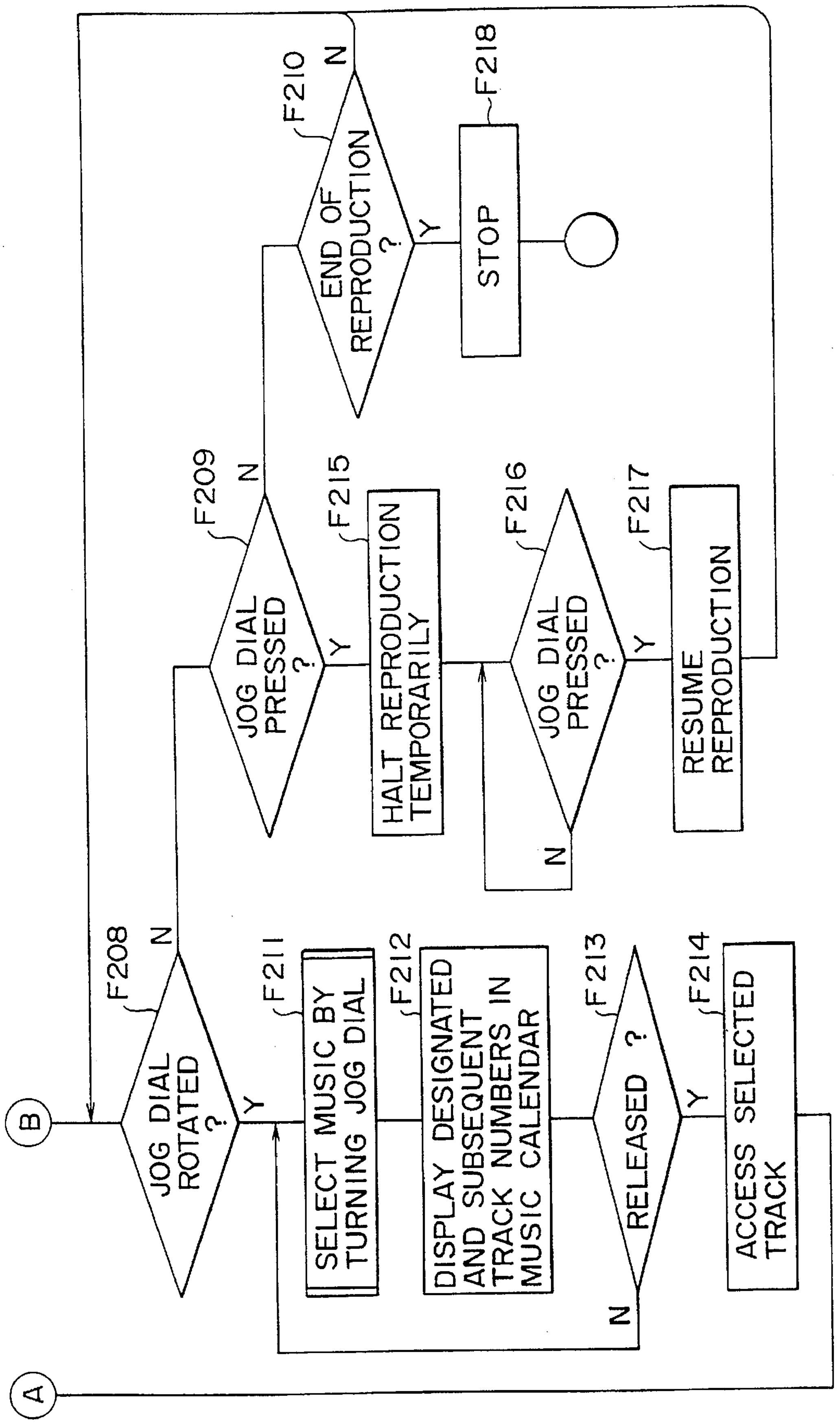
FIGS. 14(*a*) and 14(*b*) comprise a flowchart of music selection steps carried out when the jog dial of the embodiment is operated.

Music selection is performed in a stopped state or during reproduction (including pause state). The selected track numbers are displayed on the display unit 31. FIG. 14 is a flowchart of steps performed by the system controller 11 when the jog dial 43 is operated for music selection. Starting from the stopped state, the system controller 11 checks continuously to see if the jog dial 43 is rotated or pressed in steps F201 and F202.

Figure 16A:
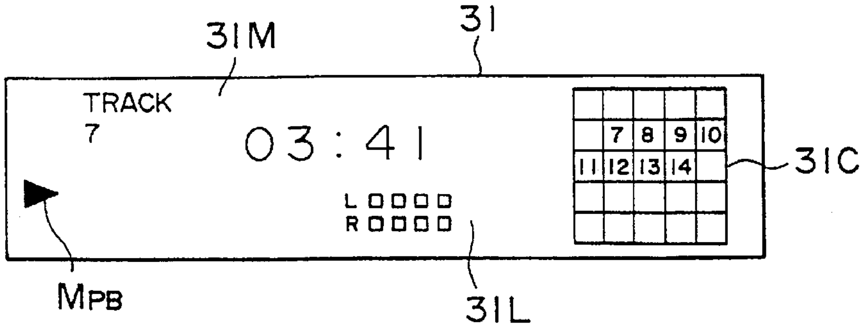
FIGS. 16 (*a*) to 16 (*c*) are views explaining how music selection is performed by use of the jog dial of the embodiment.
Figure 16B:
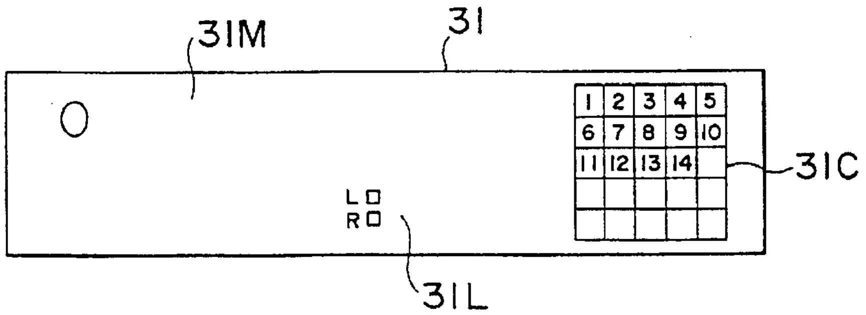
Figure 16C:
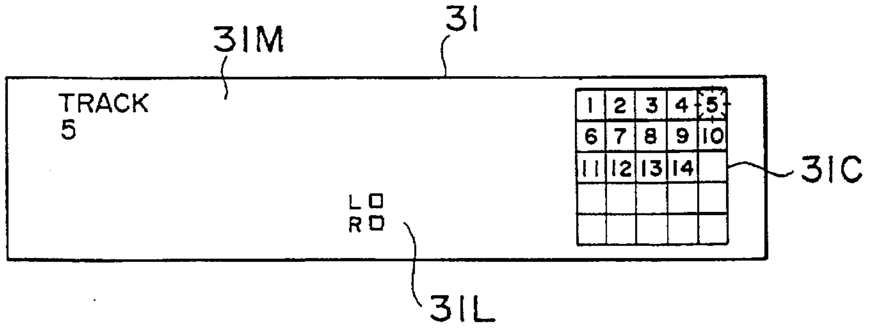
Figures 17A, 17B, 17C, 17D:
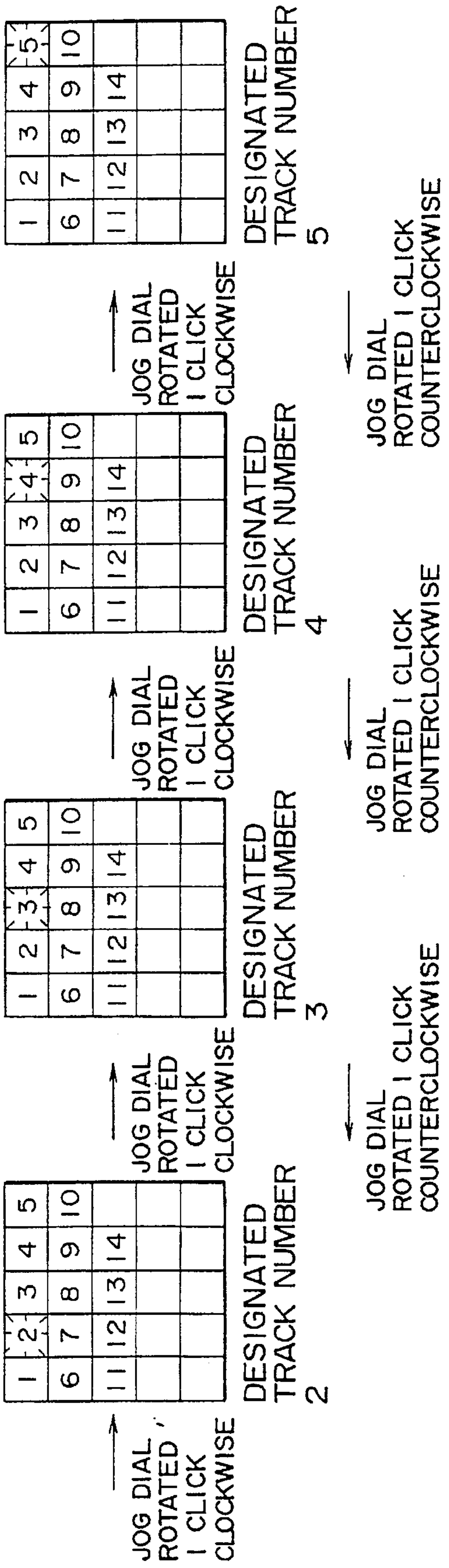
FIGS. 17 (*a*) to 17 (*d*) are views showing how a music calendar display works during music selection performed by use of the jog dial of the embodiment while reproduction is being stopped.
Figure 18F:
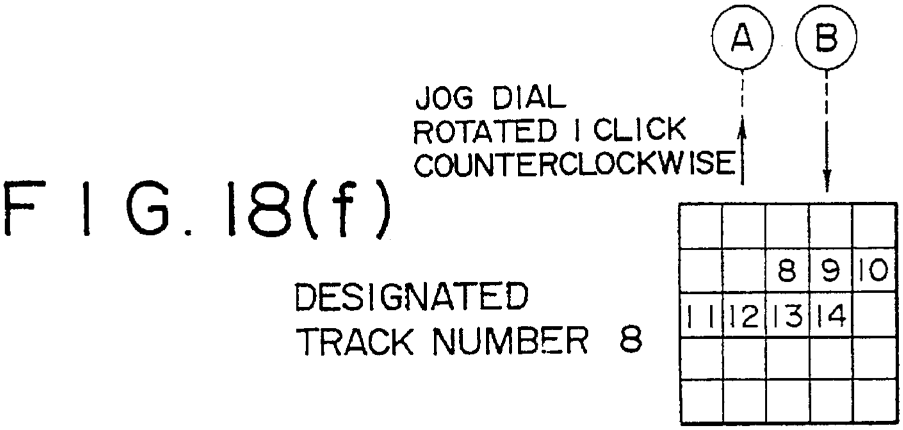
FIGS. 18 (*a*) through 18 (*i*) are views depicting how the music calendar display works during music selection performed by use of the jog dial of the embodiment while reproduction is under way.
Figure 18G:
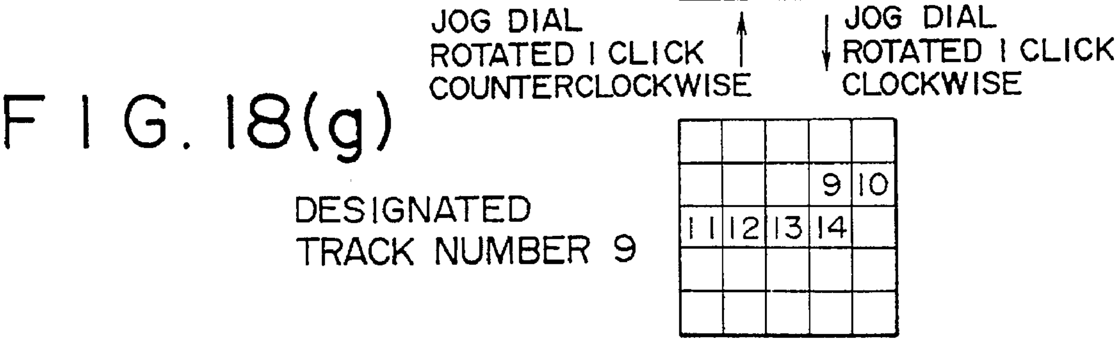
Figure 18H:
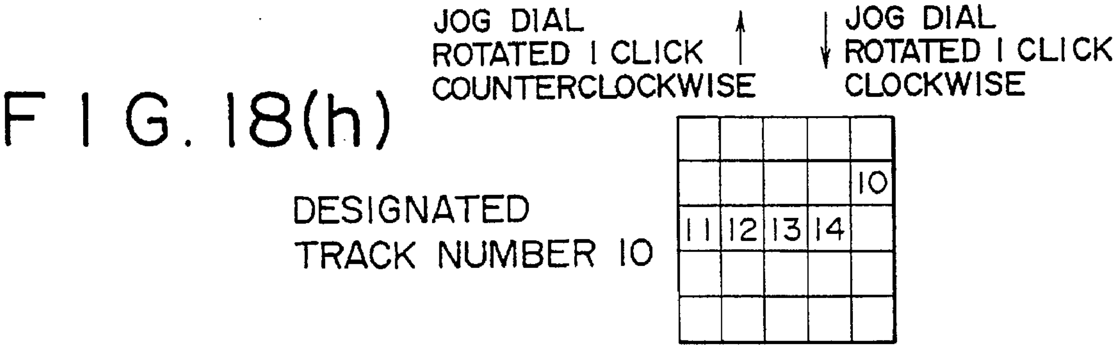
Figure 18I:
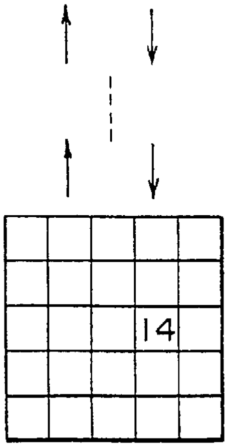

Suppose that the currently loaded disc has 14 pieces of music recorded thereon. In that case, the display unit 31 gives a display such as is shown in FIG. 16 (*b*) when track numbers have yet to be selected in the stopped state. That is, the music calendar display part 31C displays all track numbers 1 through 14. The operation state display part 31M displays the time of day, disc name and other data depending on the display mode currently selected.

When the jog dial 43 is found to be rotated in the stopped state, the system controller 11 goes to step F203 where the jog dial 43 is operated for music selection. The process of step F203 is shown in more detail in FIG. 15.

If the jog dial 43 is rotated 1 click clockwise (the process of step F105 in FIG. 13), i.e., if the dial-set variable for track number designation is to be incremented by 1 (step F301), the system controller 11 checks to see if the currently designated track number is the last track (F303). Where the disc contains 14 pieces of music as described, the last track number is 14. If the currently designated track number is not the last track number, the current track number is incremented by 1 (step F304). If the currently designated track number is the last track number, the track number remains unchanged. That is, no track number higher than 14 can be selected no matter how many clockwise turns the jog dial 43 is given.

If the jog dial 43 is rotated 1 click counterclockwise (the process of step F106 in FIG. 13), i.e., if the dial-set variable for track number designation is to be decremented by 1 (step F302), the system controller 11 checks to see if the currently designated track number is the first track (F305). That is, a check is made to see if the currently selected track number is 1. If the currently selected track number is not 1, the current track number is decremented by 1 (step F306). If the currently selected track number is 1, the track number remains unchanged. That is, the track number remains 1 no matter how many counterclockwise turns the jog dial 43 is given.

Figure 15:
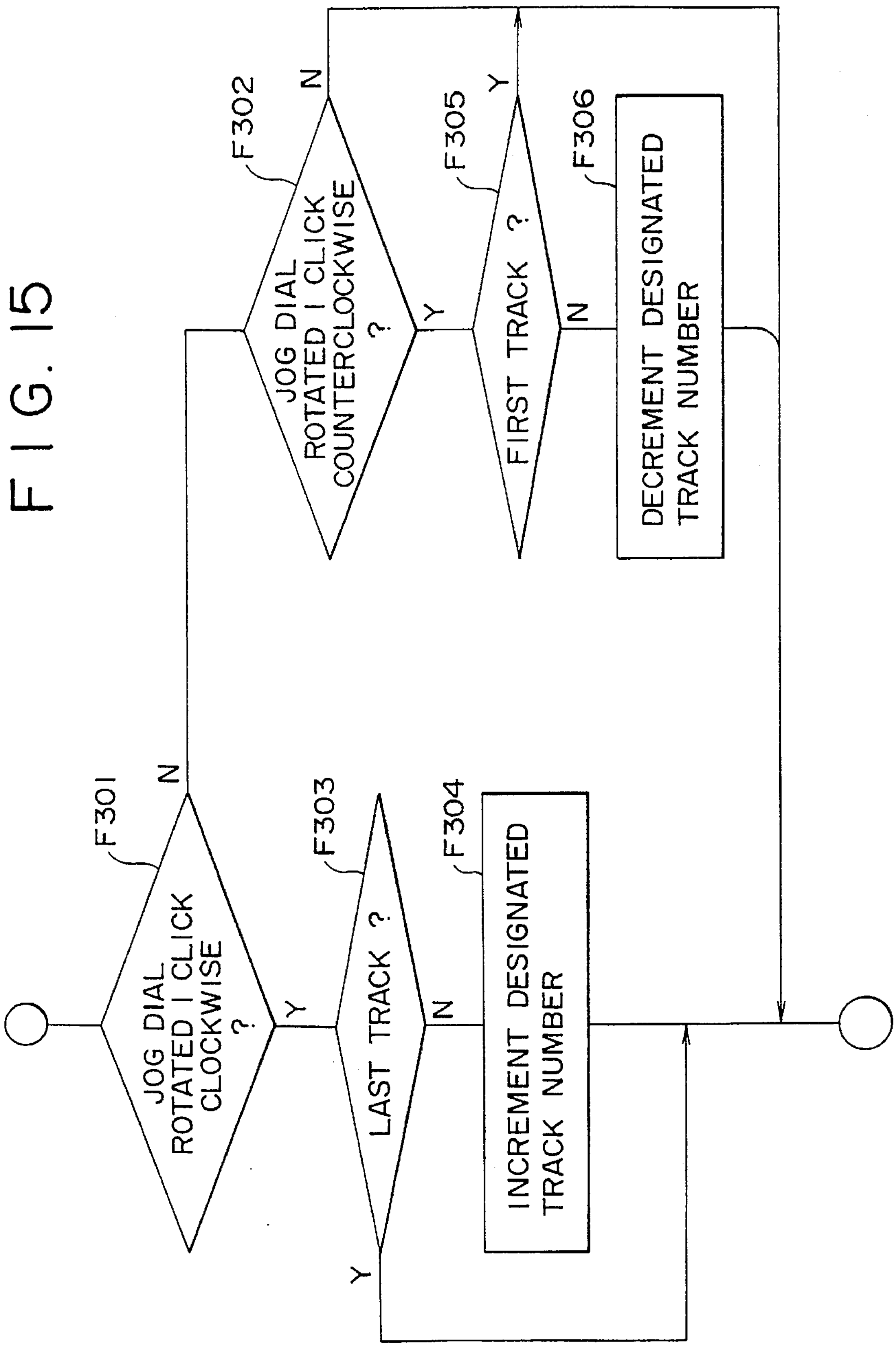
FIG. 15 is another flowchart of music selection steps carried out when the jog dial of the embodiment is operated.

The steps in FIG. 15 cause the track number to be incremented or decremented by 1 every time the jog dial is rotated by 1 click. The track number thus incremented or decremented is displayed by the display unit 31 in step F204. Specifically, the track number selected in step F203 is displayed in step F204, and the track number under selection is allowed to blink in the music calendar. For example, if the track number 5 is being selected, the display unit 31 gives the display of FIG. 16 (*c*); "TRACK 5" is on display while the numeral "5" blinks in the music calendar display part.

Because steps F203 and F204 are performed every time the jog dial 43 is rotated by 1 click, the target track number is incremented or decremented quickly. The displayed state on the display unit 31 varies rapidly in keeping with the jog dial operation.

Suppose that the jog dial 43 is given a one-sixth turn corresponding to 5 clicks. In that case, step F203 is carried out five times so that the track number being selected is incremented from 1 to 5, i.e., an increment of 1 per click. As step F204 is performed repeatedly, the music calendar appearing on the display unit 31 first gives the display of FIG. 17 (*a*) followed by those of FIGS. 17 (*b*), 17 (*c*) and 17 (*d*), in that order. If the jog dial 43 is rotated counterclockwise starting from the track number 5, the music calendar first gives the display of FIG. 17 (*d*) followed by those of FIGS. 17 (*c*), 17 (*b*) and 17 (*a*), in that order. The track number indication on the operation state display part 31M also changes every time the jog dial 43 is turned by 1 click.

The track number being selected is displayed in the above manner on the display unit 31 as the jog dial 43 is rotated. From the user's point of view, what is currently displayed on the display unit 31 allows him to give the jog dial 43 a suitable number of turns in the appropriate direction until the desired track number is reached and selected.

If the jog dial 43 is pressed in the stopped state, the system controller 11 goes to step F205. In step F205, a check is made to see if a piece of music is already selected. If a certain track is found to have been selected by operation of the jog dial 43 as described, step F207 is reached. In step F207, the system controller 11 causes the optical head 3 to access the start position of the selected track and to start reproduction therefrom. If any piece of music has yet to be selected, i.e., if the jog dial 43 is found to be pressed without being rotated in step F205, the system controller 11 considers the first piece of music to be selected (step F206). The system controller 11 then starts reproducing data from track 1 (step F207). In this case, the jog dial 43 acts as the play key.

During reproduction, the system controller 11 keeps checking to see if the jog dial 43 is rotated or pressed (steps F208 and F209). While reproduction is under way, the display unit 31 gives a display such as is shown in FIG. 16 (*a*). This is the typical display in effect when the reproducing operation is 3 minutes 41 seconds into the seventh piece of music. The music calendar display part 31C shows track numbers ranging from 7, which is the track number of the currently reproduced track, to 14, which is the last track number. The operation state display part 31M displays "TRACK 7" (track number of the currently reproduced track), "03:41" (elapsed time of the currently reproduced piece of music), and a mark identified by $M_{PB}$ (indicating ongoing reproduction). The elapsed time may be replace by some other indication such as the name of a piece of music or a total playing time in the operation state display part 31M depending on the currently selected display mode.

If the jog dial 43 is found to be rotated in step F208 during reproduction, step F211 is reached. In step F211, as in step F203, the music selection procedure of FIG. 15 is carried out. In step F212, the selected track number that has been incremented or decremented following the music selection is displayed.

For example, suppose that the jog dial 43 is rotated clockwise while the seventh piece of music is being reproduced. In that case, the track number is incremented by 1 in step F211 every time the jog dial 43 is rotated 1 click clockwise. Because the currently loaded disc has 14 pieces of music stored thereon, the track number may be incremented up to 14. In step F212, the music calendar first gives the display of FIG. 18 (*e*) followed by those of FIGS. 18 (*f*), 18 (*g*), 18 (*h*) and 18 (*i*), in that order, every time the jog dial 43 is turned by 1 click clockwise.

Suppose that the jog dial 43 is rotated counterclockwise while the seventh piece of music is being reproduced. In that case, the track number is decremented by 1 in step F211 every time the jog dial 43 is rotated 1 click counterclockwise. In step F212, the music calendar first gives the display of FIG. 18 (*e*) followed by those of FIGS. 18 (*d*), 18 (*c*), 18 (*b*) and 18 (*a*), in that order, every time the jog dial 43 is turned by 1 click counterclockwise.

The track number display "TRACK 7" (FIG. 16 (*a*)) in the operation state display part 31M may be changed every time the jog dial 43 is rotated by 1 click. However, the track number of the currently reproduced track may remain unchanged when the currently selected piece of music is allowed to be reproduced during access to the selected track (step F214) or during rotation of the jog dial 43.

The music calendar displays during reproduction the track numbers of the currently reproduced (or designated) track and the subsequent tracks. Generally, each track number is erased every time the reproduction of the corresponding piece of music has come to an end. As the jog dial 43 is being rotated during reproduction, the music calendar quickly gives the display of FIG. 18 (*a*) followed by those of FIGS. 18 (*b*) through 18 (*i*), in that order. That is, a differently designated track number and subsequent track numbers are displayed every time the jog dial 43 is rotated by 1 click. Watching the display part 31, the user may rotate the jog dial 43 in the appropriate direction until the desire track number is reached and selected.

After the user has finished rotating the jog dial 43 in step F213 to select the desired track number, step F214 is reached. In step F214, the system controller 11 causes the optical head 3 to access the start position of the selected track and to start reproduction therefrom. The jog dial 43 may be judged to be released in step F213 when the dial is left unrotated for a predetermined period of time. If the jog dial 43 is pressed within the predetermined period of time after completion of its rotation, the pressing action may be interpreted as an order to execute reproduction of the selected track. In either case, step F214 is reached for access to the selected track.

In selecting a desired track number, the user need only rotate the jog dial 43 while watching the display part 31 until the target track number is reached, as described. The steps involved are much easier to perform than the conventional procedure of having to press the selection key many times until the desired track number is reached.

If the jog dial 43 is pressed during reproduction, step F215 is reached where the ongoing reproduction is halted temporarily (pause state). This action is the same as that of pressing the play key 35 that doubles as the pause key. When the jog dial 43 is again pressed in the pause state, reproduction is resumed (steps F216 and F217). When the end of reproduction is verified in step F210, step F218 is reached in which a stop-related process is performed by the system controller 11. If the jog dial 43 is again operated in the stopped state, steps F201 through F206 are again carried out.

Although not shown in the flowchart of FIG. 14 for space reasons, the reproduction state (or pause state) entered by operation of the play 35 also involves the same process resulting from the operation of the jog dial 43.

In the pause state, rotating the jog dial 43 also permits music selection (i.e. the same process involving steps F211, F212, F213, F214 and F207). In that case, after a desired piece of music is selected by rotation of the jog dial 43, the system controller 11 causes the optical head 3 to access the start position of the selected track and enters a pause state following the access. Then pressing the jog dial 43 causes the system controller 11 to leave the pause state and to start reproducing the selected track.

9. CLOCK SETTING PERFORMED WITH JOG DIAL

Figure 19B:
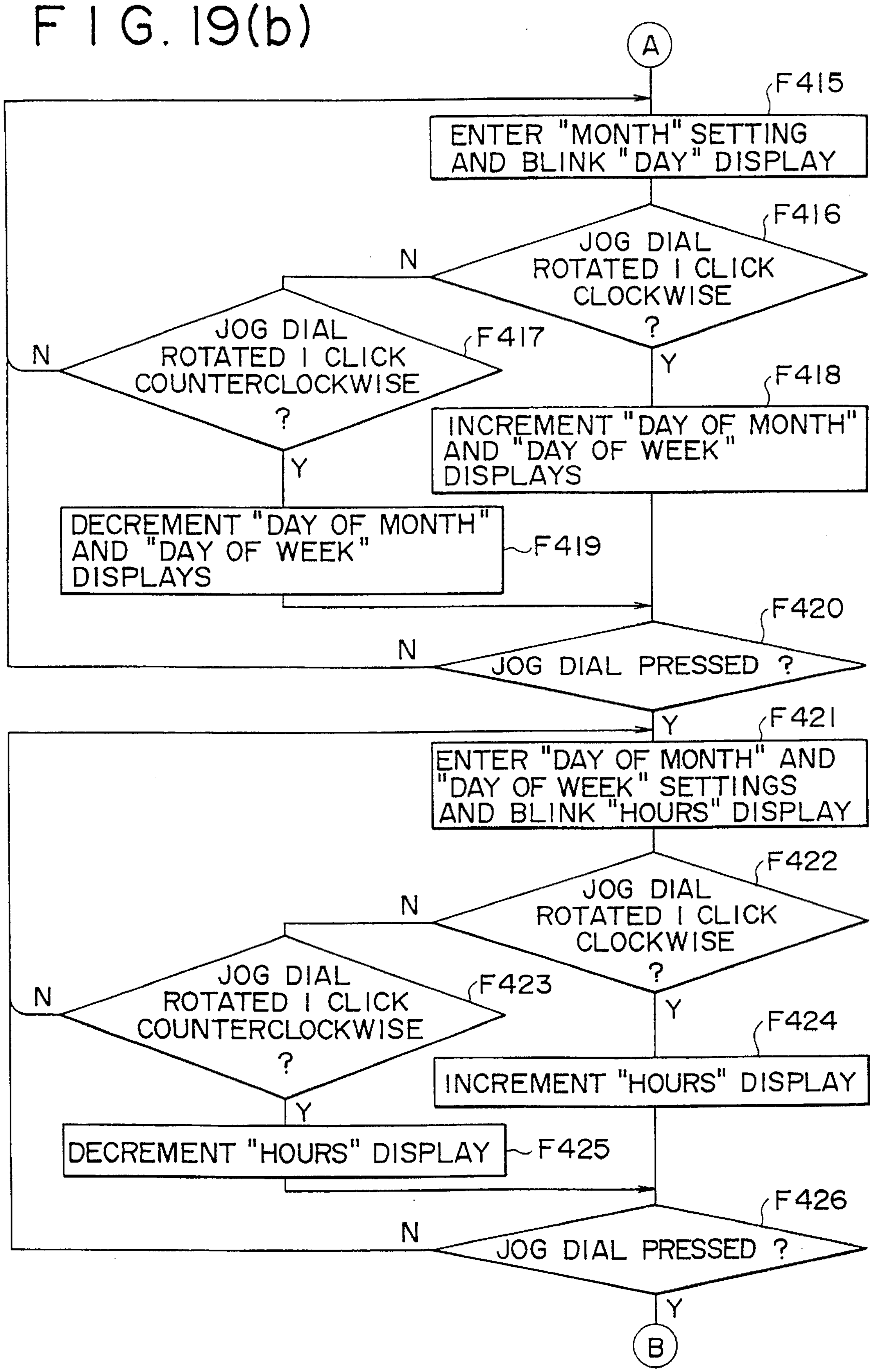
FIGS. 19(*a*) through 19(*c*) comprise a flowchart of clock setting steps carried out when the jog dial of the embodiment is operated.
Figure 19C:
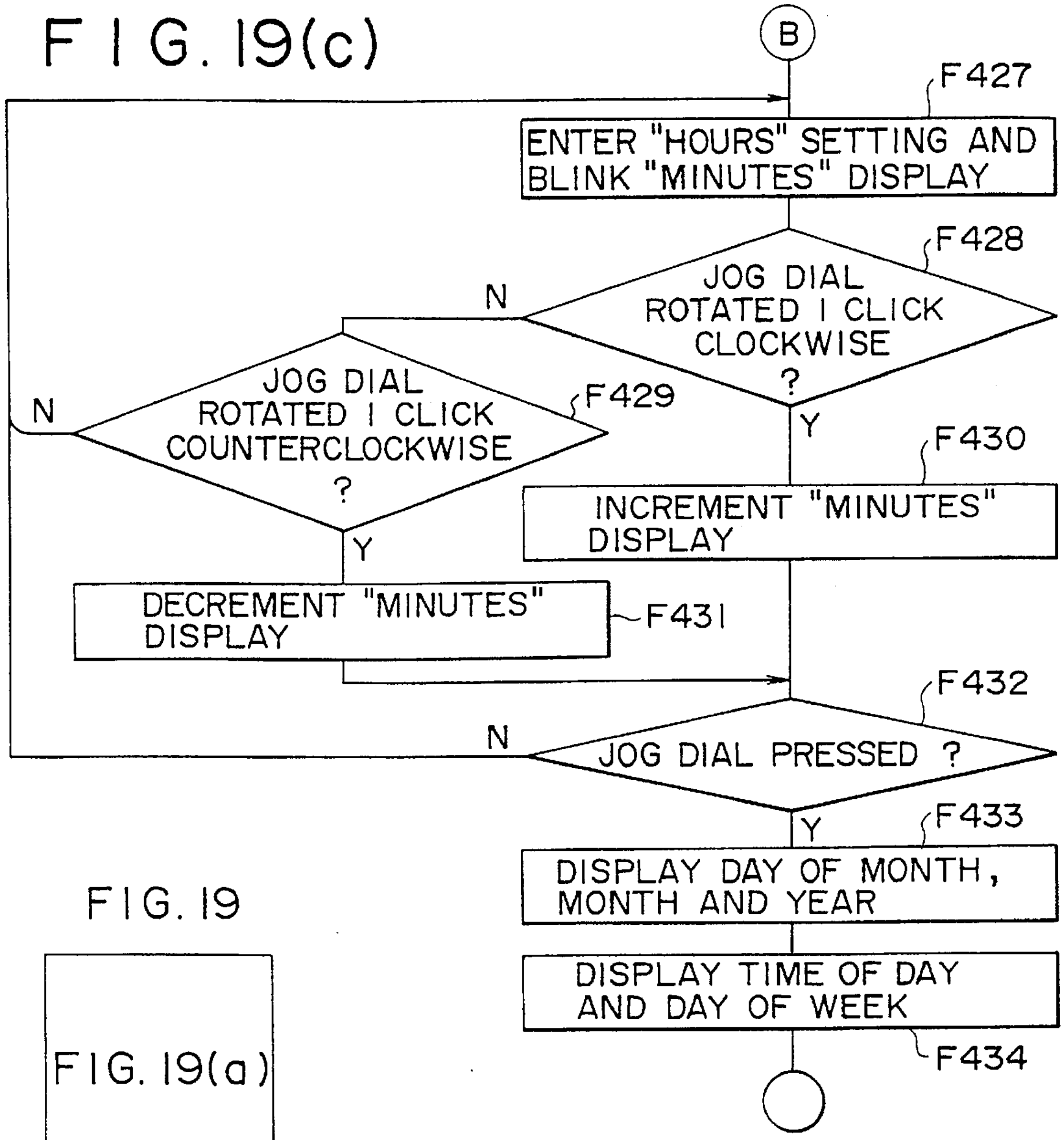
Figure 19:
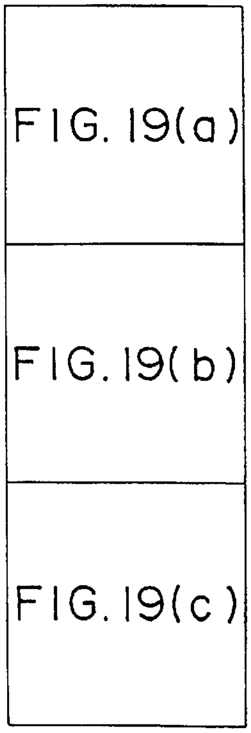
Figure 20A:
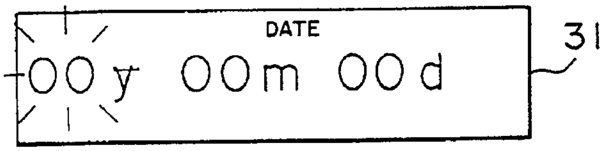
FIGS. 20 (*a*) through 20 (*h*) are views illustrating typical indications displayed during the clock setting steps carried out by use of the jog dial of the embodiment.
Figure 20B:
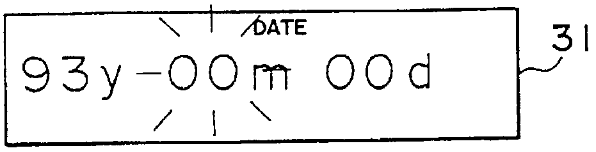
Figure 20C:
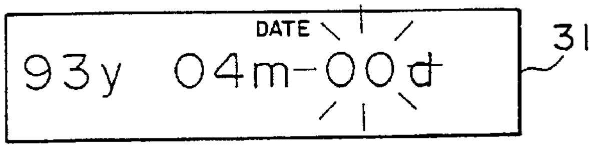
Figure 20D:
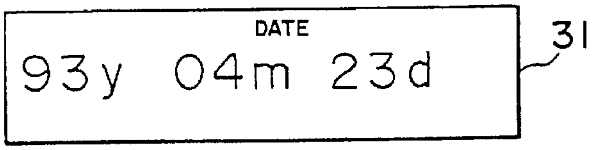
Figure 20E:
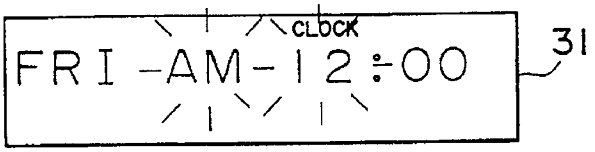
Figure 20F:
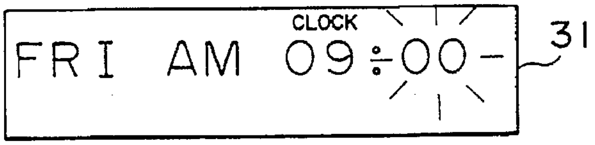
Figure 20G:
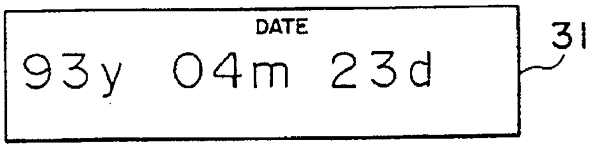
Figure 20H:
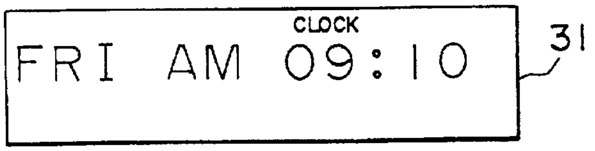

How the user sets the internal clock using the jog dial 43 will now be described with reference to FIG. 19 and FIGS. 20 (*a*) to 20 (*h*). FIG. 19 is a flowchart of clock setting steps carried out by the system controller 11 when the jog dial 43 is operated. FIGS. 20 (*a*) to 20 (*h*) are views illustrating typical indications displayed during the clock setting steps.

In order to set the internal clock mechanism 11*a* (as clock setting procedure), the user first presses the clock key 42 shown in FIG. 3 to select clock setting mode. Then the jog dial 43 is operated. Specifically, pressing the clock key 42 substitutes a clock setting routine for a loop of steps F401 and F402 in FIG. 19 (i.e., step F401 followed by step F403). The system controller 11 causes the display unit 31 first to blink the "year" display, prompting the user to input a number representing the appropriate year. The current number in the "year" display is either the initial value "00" or the currently set value of the clock mechanism 11*a*.

The system controller 11 checks to see if the jog dial 43 is turned clockwise or counterclockwise (steps F404 and F405). The displayed "year" number is incremented or decremented by 1 every time the jog dial 43 is rotated 1 click clockwise or counterclockwise, respectively (step F406 or F407). The user sets the "year" display while watching the display unit 31. For example, "93" is set for 1993. When the desired number is displayed through dial manipulation, the user presses the jog dial 43 to finalize the setting. This causes the displayed "year" number to be entered, and step F408 is followed by step F409. In step F409, the display part 31 stops blinking the finalized "year" display and starts blinking the "month" display, as shown in FIG. 20 (*b*).

The system controller 11 again checks to see if the jog dial 43 is rotated clockwise or counterclockwise (steps F410 and F411). The displayed "month" number is incremented or decremented by 1 every time the jog dial 43 is rotated 1 click clockwise or counterclockwise, respectively (step F412 or F413). The user sets the "month" display while watching the display unit 31. Illustratively, "04" is set if the current month is April. The user then presses the jog dial 43 to finalize and enter the month setting (step F414). In step F415, the display part 31 stops blinking the finalized "month" display and starts blinking the "day of the month" display, as shown in FIG. 20 (*c*).

The system controller 11 again checks to see if the jog dial 43 is rotated clockwise or counterclockwise (steps F416 and F417). The displayed "day of the month" number is incremented or decremented by 1 every time the jog dial 43 is rotated 1 click clockwise or counterclockwise, respectively (step F418 or F419). Because the year and the month have already been set, the day of the week is determined automatically when with the day of the month is set. That is, the "day of the week" display is incremented or decremented in keeping with the "day of the month" display being incremented or decremented, respectively. For example, if the current date is April 23, the user sets "23" and presses the jog dial 43 to enter the day setting (step F420).

Step F420 is followed by step F421 in which the display unit 31, after giving the display of FIG. 20 (*d*), shifts from the "year, month, day of the month" display to a "day of the week, hours, minutes, seconds" display. That is, the display unit 31 indicates the determined day of the week and blinks the "hours" display, as shown in FIG. 20 (*e*), to prompt the user to input the appropriate "hours" number. The displayed "hours" number is incremented or decremented when the user rotates the jog dial 43 (steps F422, F423, F424 and F425). If, say, nine o'clock in the morning is the desired hour, "AM 9" is entered by pressing the jog dial 43 in step F426. Step F426 is followed by step F427 in which the display unit 31 stops blinking the "hours" display and starts blinking the "minutes" display, as depicted in FIG. 20 (*f*).

In response, the user rotates the jog dial 43 to increment or decrement the "minutes" display (steps F428, F429, F430 and F431). If, say, 9:10 a.m. is desired to be set, the user displays "10" on the display unit 31 and presses the jog dial 43 to enter the setting at the exact voice time signal of 9:10 provided illustratively by the local telephone company. This completes the time setting procedure by the user. The clock display set as shown in FIG. 20 (*g*) appears for a predetermined period of time (step F432), followed by the "day of the week, time of day" display of FIG. 20 (*h*). The "seconds" display may also be given if desired.

As described, the user need only operate the jog dial 43 when setting the clock in clock setting mode. The final entry (i.e., enter operation in step F432) may alternatively be effected by use of the clock key 42.

10. CHARACTER INPUT EFFECTED WITH JOG DIAL

Figure 21B:
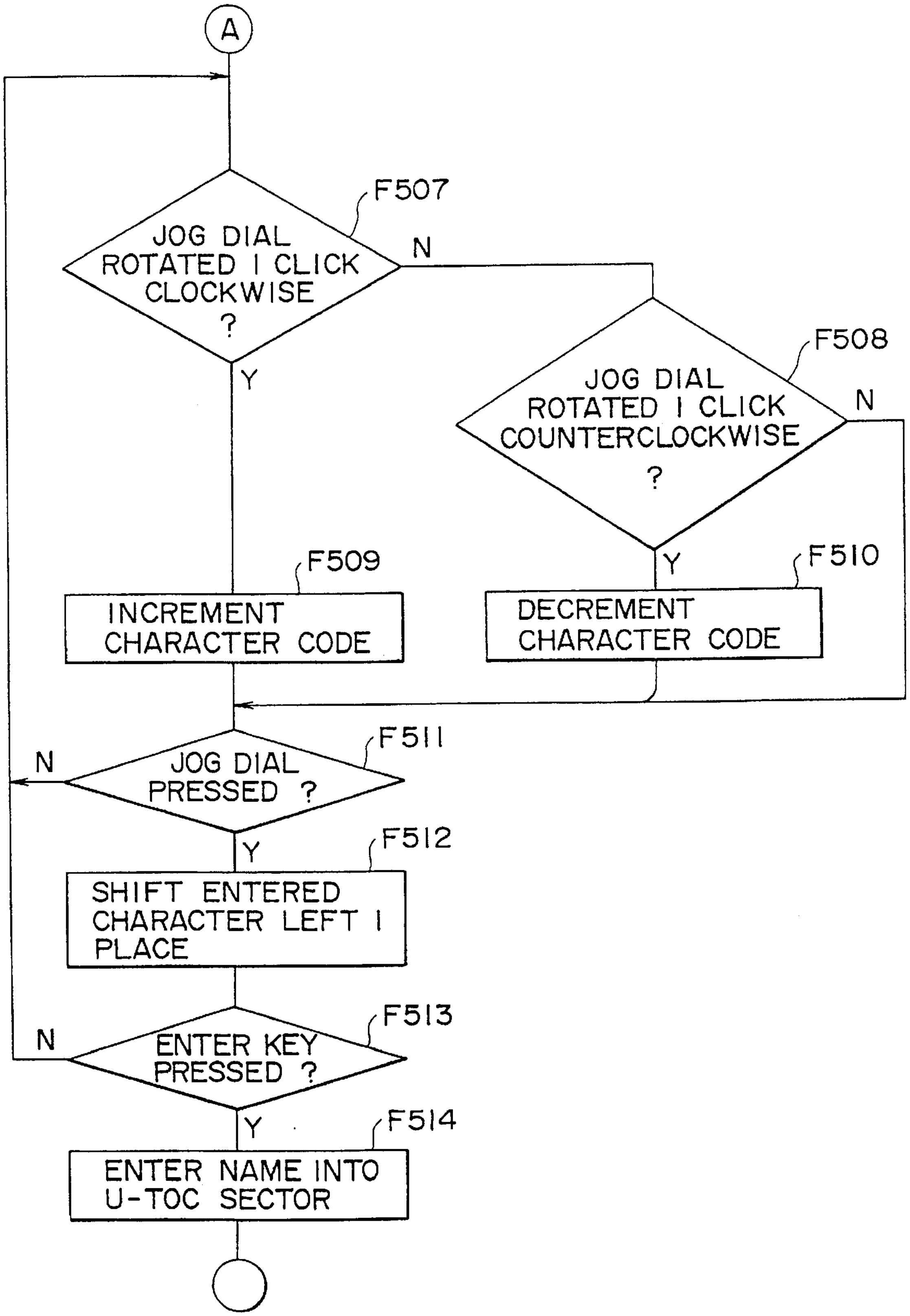
FIGS. 21(*a*) and 21(*b*) comprise a flowchart of character input steps carried out when the jog dial of the embodiment is operated.
Figure 22A:
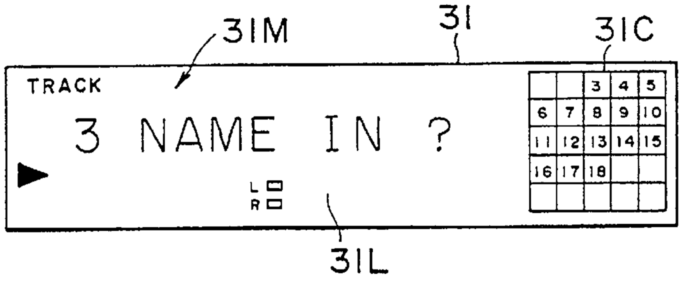
FIGS. 22 (*a*) to 22 (*f*) are views showing typical indications displayed during the character input steps carried out by use of the jog dial of the embodiment.
Figure 22B:
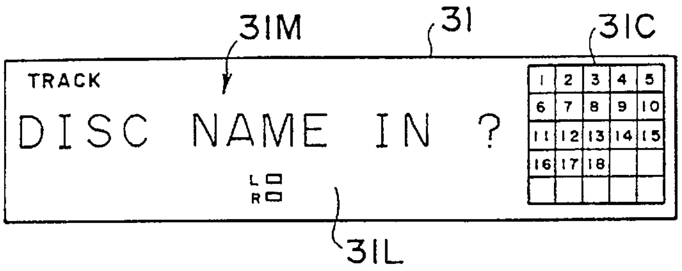
Figure 22C:
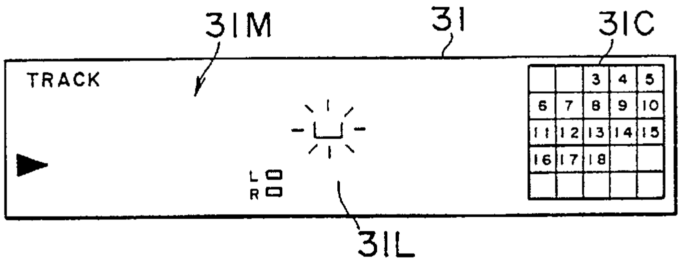
Figure 22D:
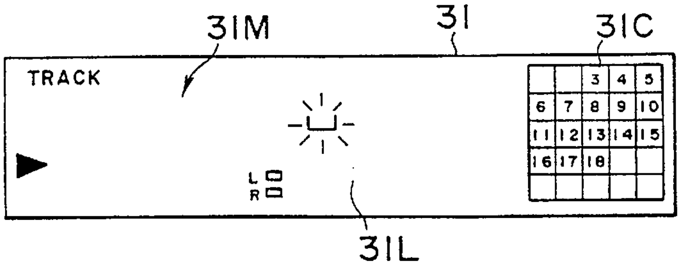
Figure 22E:
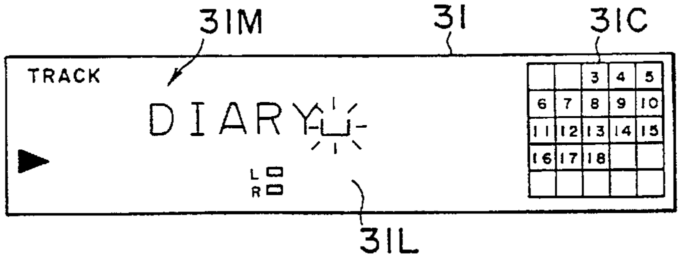
Figure 22F:
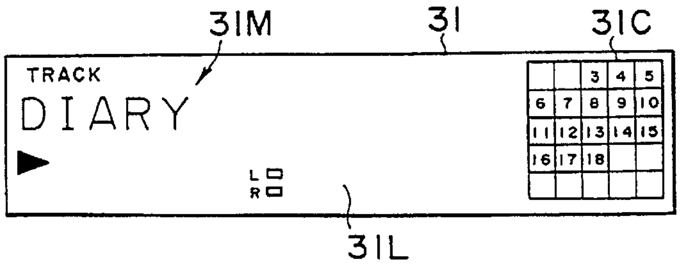

As described, the recording and reproducing apparatus of this invention may be used to write, in U-TOC sector 1 on the disc 1, desired characters constituting the names of pieces of music and the name of the disc. The input of such characters may be effected by operation of the jog dial 43 as well. How characters are input by use of the jog dial 43 will now be described with reference to FIG. 21 and FIGS. 22 (*a*) to 22 (*f*). FIG. 21 is a flowchart of character input steps carried out by the system controller 11 when the jog dial 43 is operated. FIGS. 22 (*a*) to 22 (*f*) are views showing typical indications displayed during the character input steps.

The processing of FIG. 21 is started when the user operates the edit key 40 to select name input mode in a stopped state, during reproduction or at pause (step F501). In name input mode, the system controller 11 checks to see if any specific track has already been selected in the manner described above (step F502). If reproduction is under way, the system controller 11 checks to see if the track number of the currently reproduced track is being selected. Where any track number is selected, the system controller 11 causes the display unit 31 to display "TRACK NAME IN?" for confirmation, as shown in FIG. 22 (*a*) (step 503), before entering track name input mode in which the currently selected track is given a name. The display of FIG. 22 (*a*) shows an example in which name input mode is selected while the third piece of music is being reproduced.

If name input mode is selected in the stopped state and if no track is selected, pressing the edit key 40 causes the system controller 11 to enter disc name input mode in which the currently loaded disc is given a title (i.e., name). At this point, the system controller 11 causes the display unit 31 to display "DISC NAME IN?" for confirmation, as depicted in FIG. 22 (*b*) (step F504).

The processing of track name input mode or disc name input mode is started if the user presses the enter (YES) key 41 in response to the confirmation display (step F505). The display unit 31 then gives a name input display such as is shown in FIG. 22 (*c*) (step F506). As illustrated, the cursor blinks in the digit position in which to input each of the characters constituting the desired name.

The system controller 11 checks to see if the jog dial 43 is rotated clockwise or counterclockwise (steps F507 and F508). The character code display is incremented or decremented in a predetermined order every time the jog dial 43 is rotated 1 click clockwise or counterclockwise, respectively (step F509 or F510). The character code used may illustratively be the ASCII code comprising alphabetic characters (upper and lower cases), numeric characters and various symbols, arranged in the predetermined order. The character display in the cursor position on the display unit 31 is incremented or decremented in the predetermined order of these characters and symbols.

Watching the display unit 31, the user turns the jog dial 43 to display the desired character in the cursor position, and presses the jog dial 43 to finalize the character (for digit shift). The pressing action enters the displayed character in step F511. Step F511 is followed by step F512 in which the entered character is shifted left one place to vacate the cursor position. Steps F507 through F512 are repeated until the enter key 41 is pressed. During these steps, the user operates the jog dial 43 to input the necessary characters into their respective places.

Suppose that the user presses the enter key 41 after inputting five characters "DIARY" as shown in FIG. 22 (*e*). With the enter key 41 pressed, step F513 is followed by step F514. The input character string is thus finalized and displayed as shown in FIG. 22 (*f*). The entered character string is written to U-TOC sector 1. If the current mode is track name input mode regarding the third piece of music, the characters "DIARY" are written in ASCII code to the part table pointed to by the table pointer P-TNA3 in U-TOC sector 1.

The characters written in the above manner are displayed on the display unit 31 illustratively while the third piece of music is being reproduced. As described, the entry of characters is readily accomplished by use of the jog dial 43.

11. PROGRAMMED INPUT EFFECTED WITH JOG DIAL

Figure 23A:
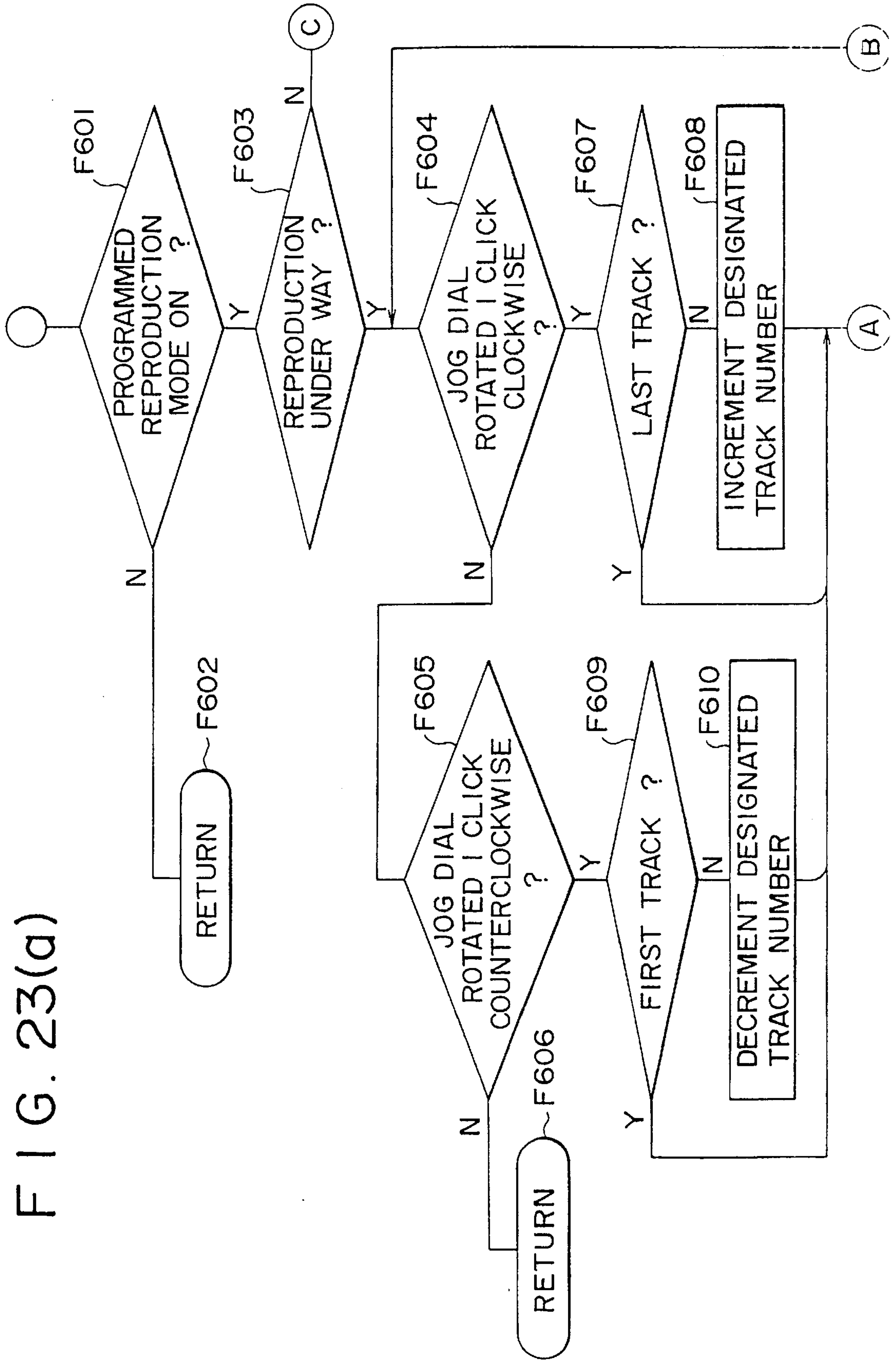
FIGS. 23(*a*) through 23(*d*) comprise a flowchart of steps for programmed music selection effected by use of the jog dial of the embodiment.
Figure 23B:
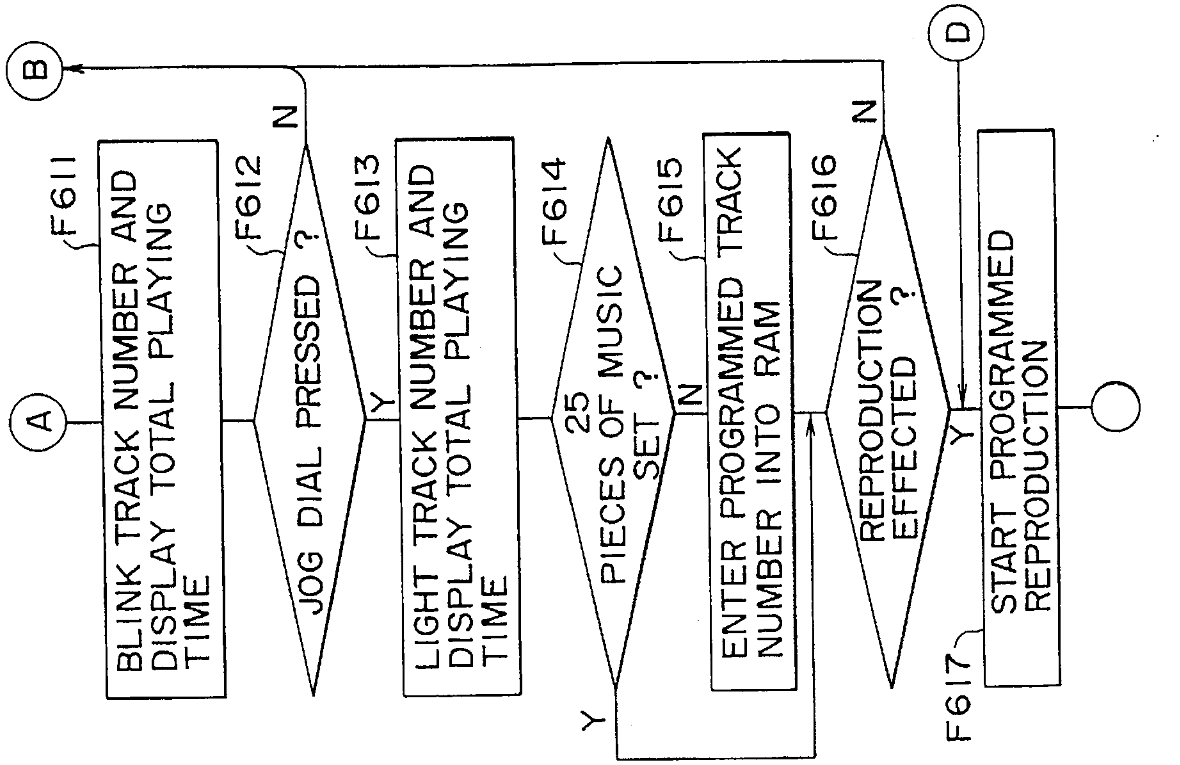
Figure 23:
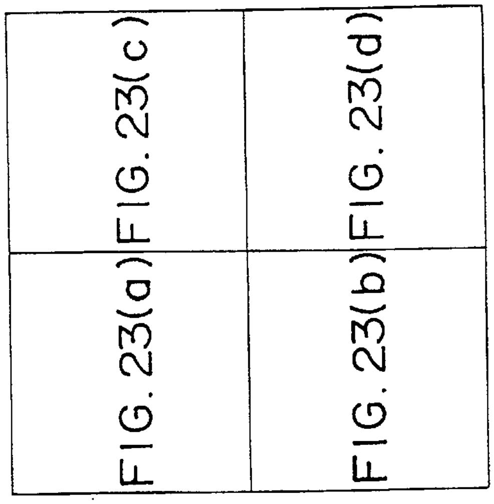
Figure 23C:
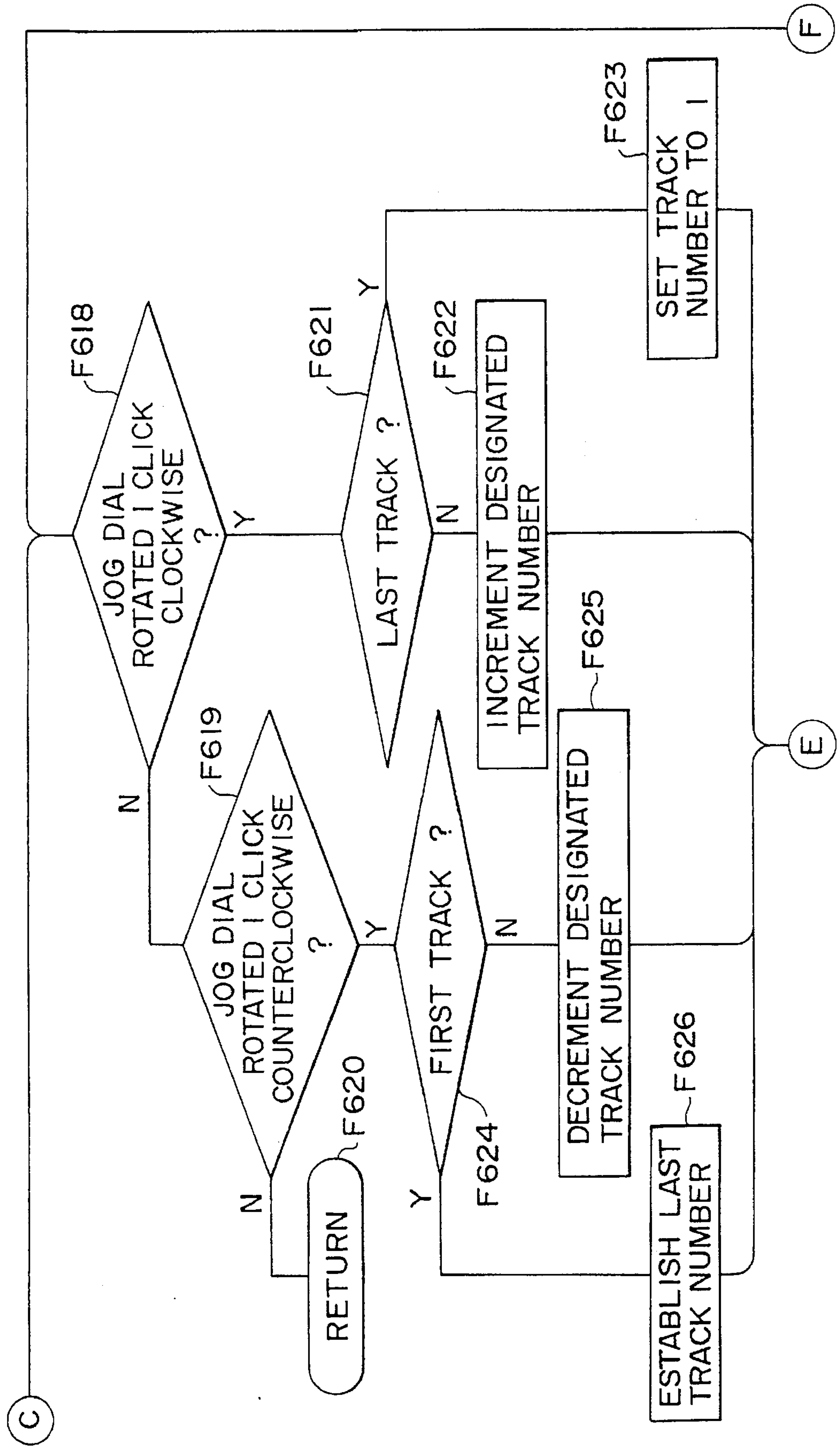
Figure 23D:
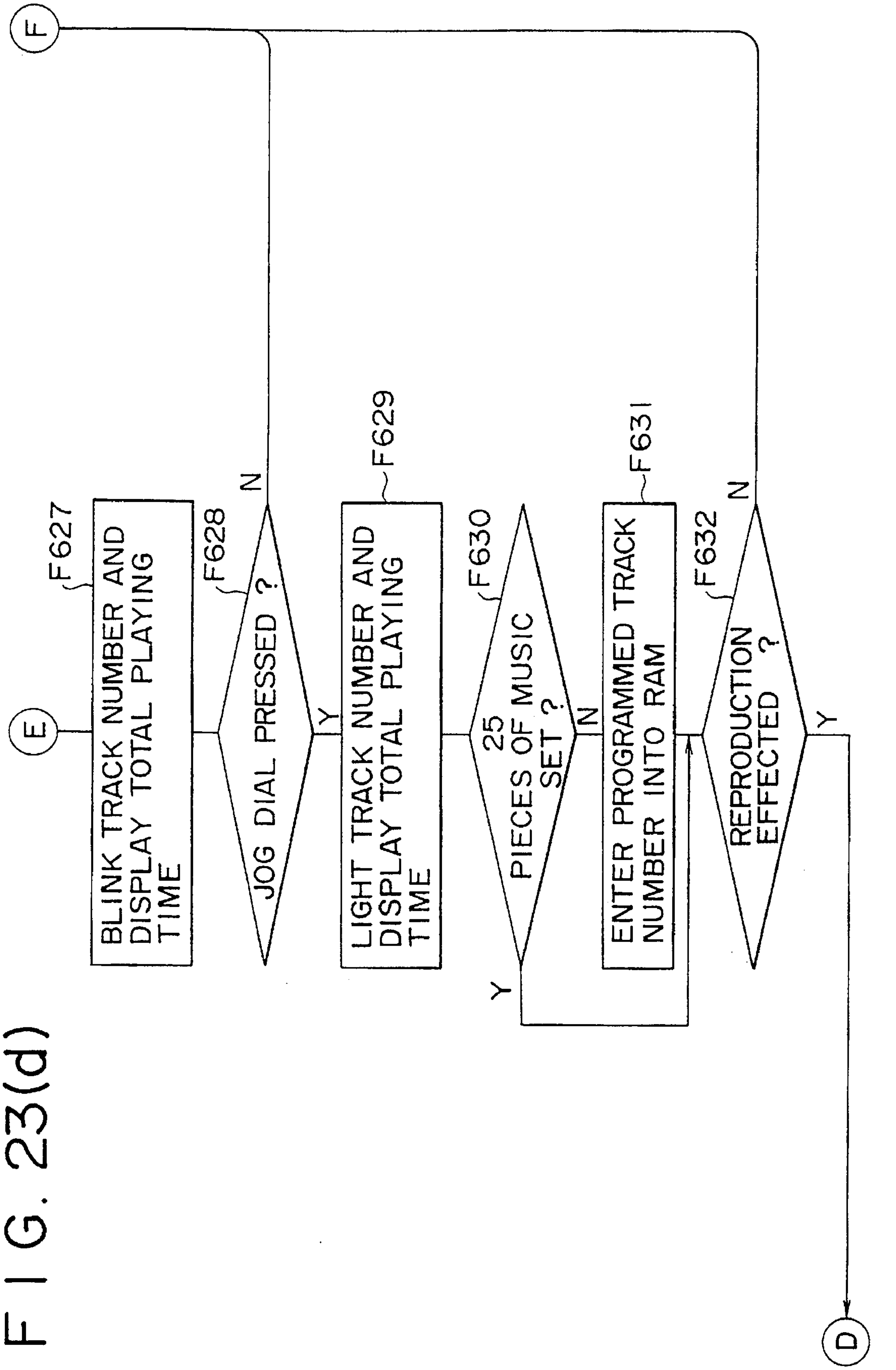
Figure 24A:
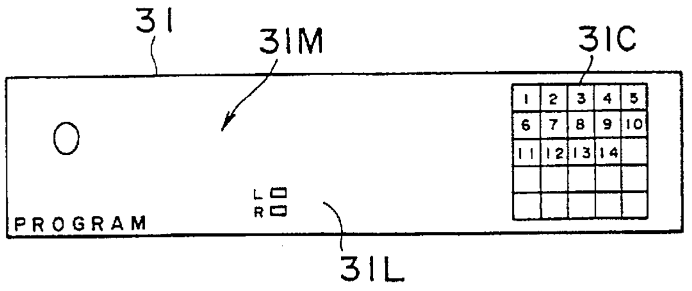
FIGS. 24 (*a*) through 24 (*d*) are views giving typical indications displayed during the steps for programmed music selection performed by use of the jog dial of the embodiment.
Figure 24B:
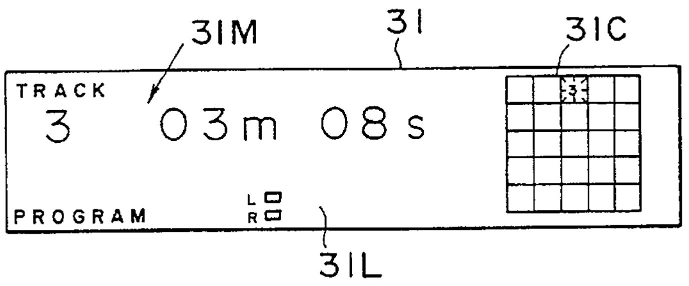
Figure 24C:
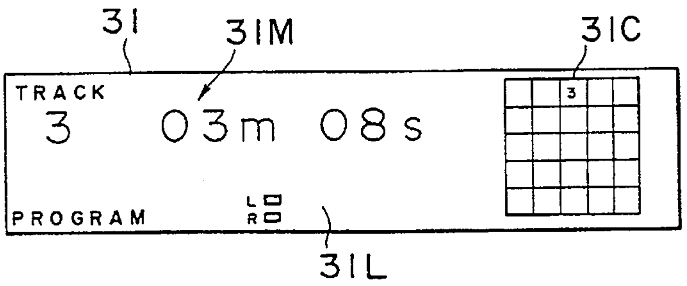
Figure 24D:
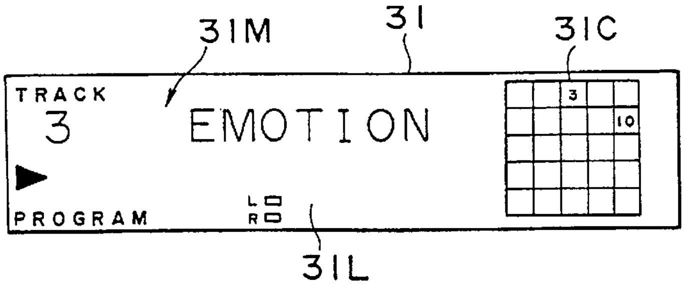

How programmed music selection is performed by use of the jog dial 43 for subsequent programmed reproduction will now be described with reference to FIG. 23 and FIGS. 24 (*a*) to 24 (*d*). FIG. 23 is a flowchart of steps carried out by the system controller 11 for programmed music selection when the jog dial 43 is operated. FIGS. 24 (*a*) through 24 (*d*) are views giving typical indications displayed during the steps for programmed music selection.

The user first operates the play mode key 39 to select programmed reproduction mode. This key operation replaces a loop of steps F601 and F602 with the subsequent series of steps in FIG. 23 for programmed music selection (from step F601 to step F603). In step F603, the system controller 11 checks to see if reproduction is currently under way (including pause state).

If the stopped state is found to be in effect, step F618 is reached. Where programmed reproduction mode is selected in the stopped state, the display unit 31 illustratively gives a display such as is shown in FIG. 24 (*a*). The current mode is identified by an indication "PROGRAM" on the display unit 31. If the currently loaded disc has, say, 14 pieces of music recorded thereon, the music calendar displays track numbers 1 through 14.

The system controller 11 checks to see if the jog dial 43 is rotated clockwise or counterclockwise (steps F618, F619 and F620). Step F621 is reached every time the jog dial 43 is rotated 1 click clockwise. In step F621, the system controller 11 checks to see if the currently designated track number is the last track number (14 in this example). If the currently designated track number is not the last track number, the current track number is incremented by 1 per click (step F622). If the last track number is currently designated and if the jog dial 43 is rotated another 1 click clockwise, the track number is set to 1 (step F623).

Step F624 is reached every time the jog dial 43 is rotated 1 click counterclockwise. In step F624, the system controller 11 checks to see if the currently designated track number is the first track number (1 in this example). If the currently designated track number is not the first track number, the current track number is decremented by 1 per click (step F625). If the first track number 1 is currently designated and if the jog dial 43 is rotated another 1 click counterclockwise, the track number is set to 14 (step F626).

Every time the jog dial 43 is rotated 1 click in either direction, the incremented or decremented track number is shown on the display unit 31 in step F627. For example, if the designated track number is 3, the indication "3" blinks in the music calendar of the display unit 31 as shown in FIG. 24 (*b*). After track number selection has been started (i.e., by rotation of the jog dial 43), all track numbers except the one being selected are erased from the music calendar. Along with the blinking track number, the playing time up to that track and the total playing time of the programmed piece of music are also displayed.

When the jog dial 43 is pressed after its rotation for track selection, the currently selected track number is entered. The track number that was blinking in the music calendar of the display unit 31 now remains lit, as shown in FIG. 24 (*c*) (from step F628 to step F629). If the recording and reproducing apparatus is capable of having up to, say, 25 pieces of music programmed for subsequent reproduction, the system controller 11 checks to see if 25 pieces of music have already been set (step F630). If the 25-piece limit is not exceeded, the track number just entered is stored as a programmed track into memory (e.g., internal RAM of the system controller 11).

If the jog dial 43 is again rotated without the dial getting pressed or without the play key 35 being operated, another piece of music starts to be selected (from step F632 to step F618). Programmed music selection is again performed by rotation and pressing of the jog dial 43. For example, if track number 10 is desired to be programmed next, the jog dial 43 is rotated until the indication "10" appears blinking in the music calendar beside the track number 3 staying lit. Pressing the jog dial 43 enters track number 10. The total playing time indicated this time is the sum of the playing times of the third and the tenth piece of music.

If reproduction is designated after track number 10 has been programmed following track number 3, the system controller 11 goes from step F632 to step F617 to start programmed reproduction. In this case, the display unit 31 gives a display such as is shown in FIG. 24 (*d*), with the music calendar indicating programmed track numbers 3 and 10. The third piece of music is reproduced first. An indication appears on the display unit 31 announcing the ongoing reproduction of the third piece of music, along with the indication of the name of the music and/or the elapsed time of reproduction.

If programmed reproduction mode is selected, steps F604 through F616 are carried out. In this case, too, the system controller 11 checks to see if the jog dial 43 is rotated clockwise or counterclockwise (steps F604, F605 and F606). Step F607 is reached every time the jog dial 43 is rotated 1 click clockwise. In step F607, the system controller 11 checks to see if the currently designated track number is the last track number (14 in this example). If the current track number is not the last track number, the current track number is incremented by 1 per click (step F608).

If the last track number is currently designated and if the jog dial 43 is rotated another 1 click clockwise, the track number is not incremented any further. That is, the last track number 14 remains unchanged no matter how many clockwise turns the jog dial 43 is given.

Step F609 is reached every time the jog dial 43 is rotated 1 click counterclockwise. In step F609, the system controller 11 checks to see if the currently designated track number is the first track number (1 in this example). If the currently designated track number is not the first track number, the current track number is decremented by 1 per click (step F610). If the first track number 1 is currently designated and if the jog dial 43 is rotated another 1 click counterclockwise, the first track number 1 remains unchanged.

Every time the jog dial 43 is rotated 1 click in either direction, the incremented or decremented track number is shown on the display unit 31 in step F611. The playing time up to the designated track and the total playing time of the programmed piece of music are also displayed.

When the jog dial 43 is pressed after its rotation for track selection, the currently selected track number is entered. The track number that was blinking in the music calendar of the display unit 31 now remains lit (from step F612 to step F613). The system controller 11 then checks to see if 25 pieces of music have already been set (step F614). If the 25-piece limit is not exceeded, the track number just entered is stored as a programmed track into the above-mentioned memory of the system controller 11 (step F615).

If the jog dial 43 is again rotated without the dial getting pressed or without the play key 35 being operated, another piece of music is ready to be selected (from step F616 to step F604). Programmed music selection is again performed by rotation and pressing of the jog dial 43. If reproduction is designated after the programmed pieces of music have been entered, the system controller 11 goes from step F616 to step F617. In step F617, the programmed pieces of music start to be reproduced in the order of their track numbers entered.

As described, programmed music selection is carried out with ease by use of the jog dial 43. In particular, a track number appreciably higher or lower than the currently designated number may be selected rapidly when the jog dial 43 is used. In the example above, the user may select a desired track number from the track number display that is changed in a rotary manner by rotation of the jog dial 43. That is, when the jog dial 43 is rotated continuously clockwise, the display of the last track is followed by that of the first track 1 at the next click; when the jog dial 43 is rotated continuously counterclockwise, the display of the first track 1 is followed by that of the last track. The apparatus is thus much easier to operate than before. Needless to say, this selection method may also be used to take the place of steps F607 through F610 for the programmed input during reproduction.

12. DIVIDE MODE STEPS PERFORMED WITH JOG DIAL

Figure 25:
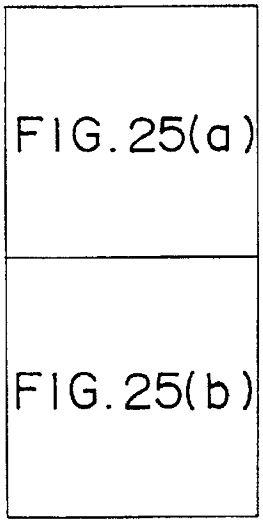
FIGS. 25(*a*) and 25(*b*) comprise a flowchart of divide mode steps carried out when the jog dial of the embodiment is operated.
Figure 26A:
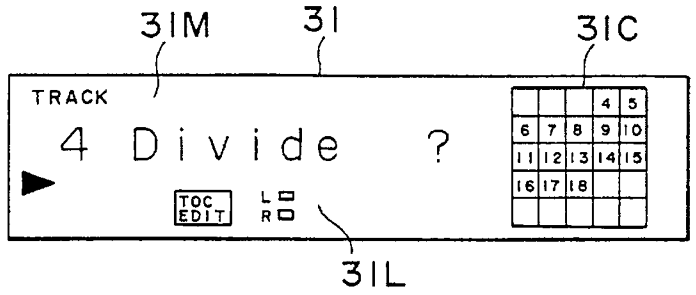
FIGS. 26 (*a*) through 26 (*g*) are views presenting typical indications displayed during the divide mode steps performed by use of the jog dial of the embodiment.
Figure 26B:
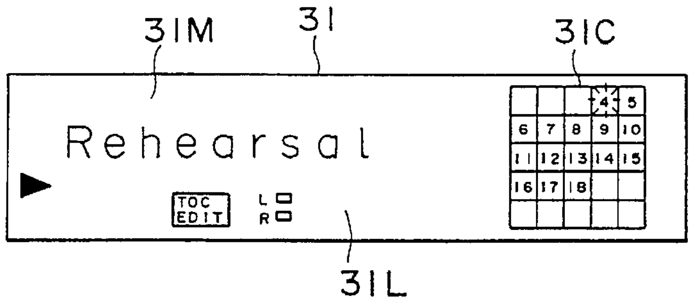
Figure 26C:
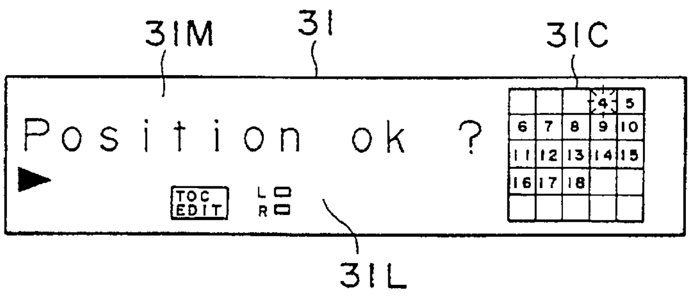
Figure 26D:
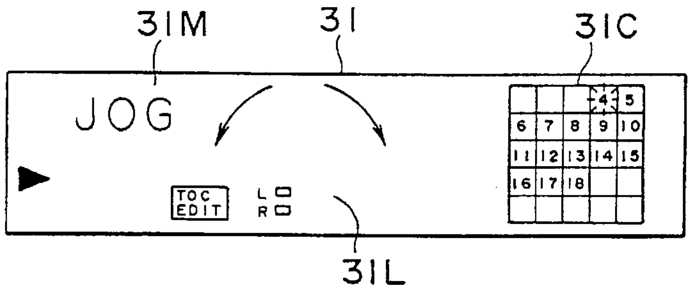
Figure 26E:
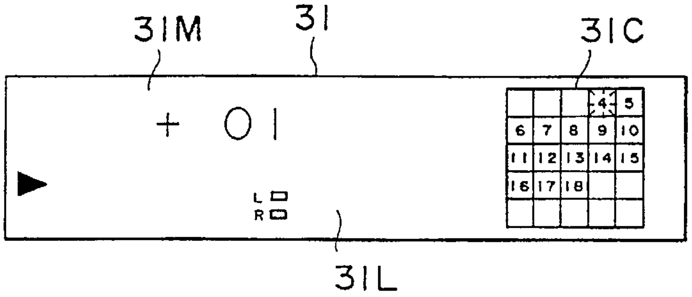
Figure 26F:
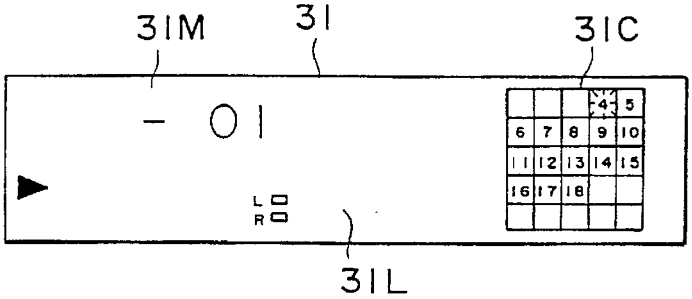
Figure 26G:
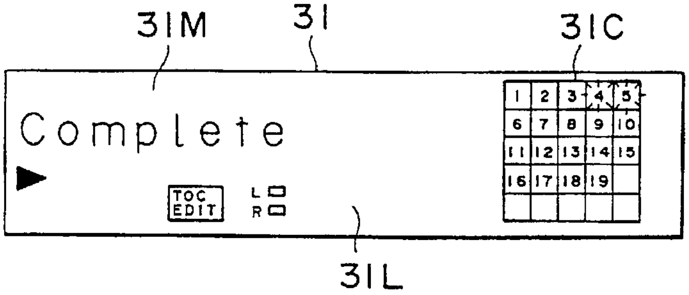
Figure 27:
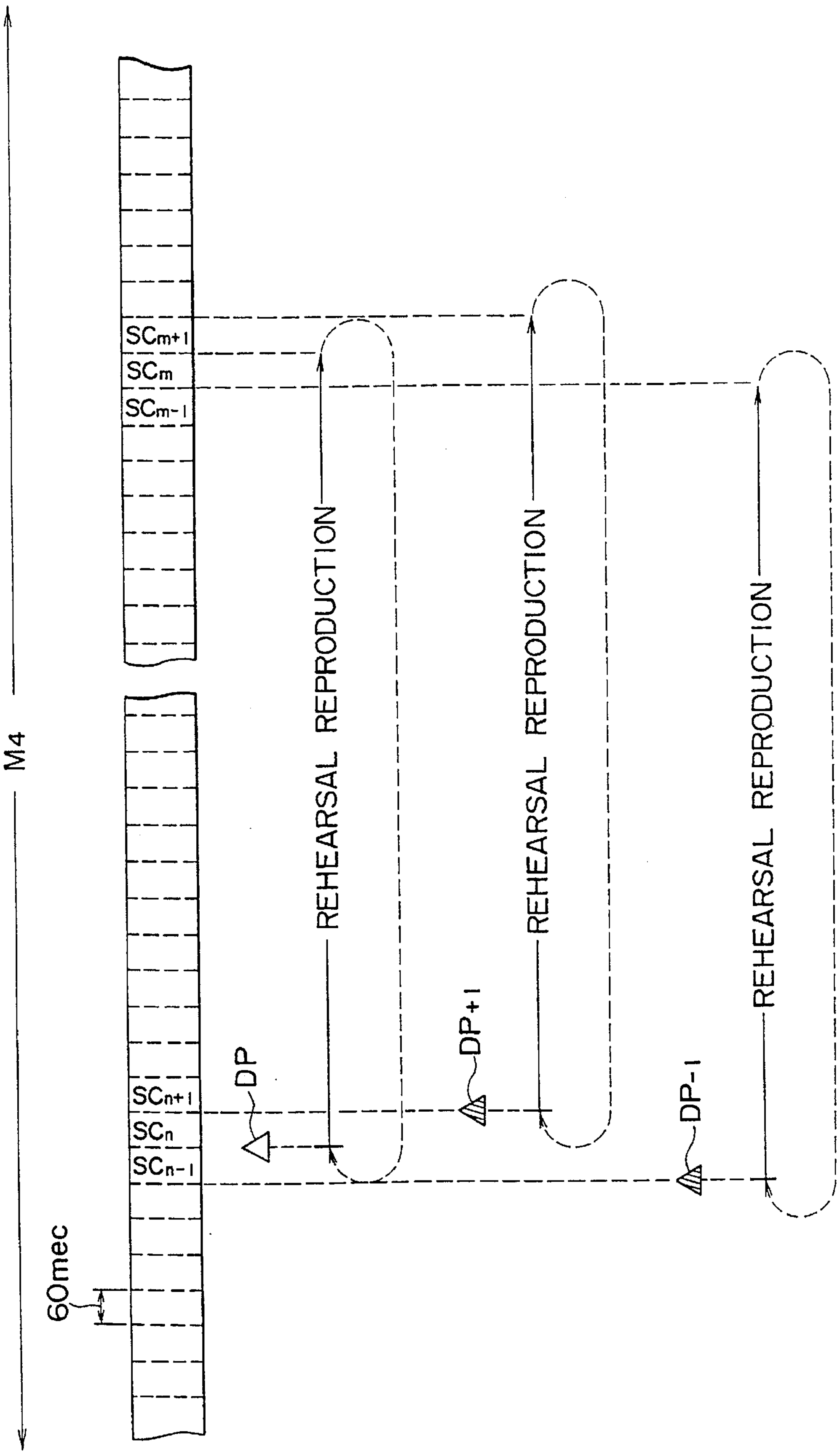
FIG. 27 is a view explaining how rehearsal reproduction is carried out by the embodiment in divide mode.

How divide mode steps are performed by use of the jog dial 43 will now be described by referring to FIG. 25, FIGS. 26 (*a*) to 26 (*g*) and FIG. 27. FIG. 25 is a flowchart of divide mode steps carried out by the system controller 11 when the jog dial 43 is operated. FIGS. 26 (*a*) through 26 (*g*) are views presenting typical indications displayed during the divide mode steps. FIG. 27 is a view explaining how rehearsal reproduction is carried out in divide mode.

The user first operates the edit key 40 to select divide mode. This key operation starts the processing of FIG. 25 (step F701). For this embodiment of the invention, it is assumed that divide mode is available only during reproduction (including pause state). Although relevant description is not included herein, divide mode may also be made available during recording or in the stopped state if so desired.

When divide mode is selected, the system controller 11 checks to see if any track is being reproduced (or in pause state during reproduction) (step F702). If reproduction is not under way, no divide mode steps are carried out. If reproduction is found to be under way, the system controller 11 causes the display unit 31 to give a suitable display asking the user to confirm his intention of proceeding with the divide mode steps. If, say, the fourth piece of music is being reproduced, the display unit 31 gives the display for confirmation such as is shown in FIG. 26 (*a*) (step F703).

In response to the display for confirmation, the user presses the enter (YES) key 41. The pressing action starts the subsequent series of divide mode steps (step F704). In this case, the reproducing position determined when the enter key 41 is pressed within the currently reproduced piece of music is regarded as the dividing position. The system controller 11 then starts executing rehearsal reproduction, prompting the user to verify that the dividing position in question is indeed the desired position from which to divide the currently reproduced piece of music (i.e., track) (step F705).

Rehearsal reproduction involves performing reproduction from the dividing position for a predetermined period of time, with the reproduced sound allowing the user to verify that position and, if necessary, modify it. For example, rehearsal reproduction is carried out with respect to the segment of, say, track 4, as shown in FIG. 27. Within the segment of track 4, each unit flanked by two broken lines represents one sector. In step F704, the user operates the enter key 41 illustratively in sector $SC_n$ marked as DP (which stands for a dividing position) in FIG. 27. When rehearsal reproduction is started, recorded data is reproduced starting from sector $SC_n$ over a predetermined period of time. Illustratively, the sectors ranging from $SC_n$ to $SC_m$ are reproduced repeatedly.

While rehearsal reproduction is under way, the display unit 31 displays a character string "Rehearsal" indicating what is currently happening, and blinks the track number of the track to be divided inside the music calendar (step F706).

The system controller 1 then causes the display unit 31 to display an indication "Position OK?" asking the user if it is indeed acceptable to divide the current piece of music from the dividing position verified in rehearsal reproduction, as shown in FIG. 26 (*c*) (step F707). In this case, it is preferable to give a display such as is shown in FIG. 26 (*d*) in order to prompt the user to rotate the jog dial 43.

The loop composed of steps F706, F707, F708, F709, F714 and F706 is executed in that order during rehearsal reproduction. Thus the display of FIG. 26 (*b*) alternates with that of FIG. 26 (*c*) and/or FIG. 26 (*d*), while the system controller 11 checks continuously to see if the jog dial 43 is rotated or pressed.

If the user judges that it is acceptable to divide the current piece of music divided from the position verified through rehearsal reproduction starting from sector $SC_n$, the user presses the jog dial 43 to designate the divide operation. The system controller 11 then goes to step F715 in which the dividing position is entered and the U-TOC data held in the buffer memory 13 is updated accordingly. As a result, the piece of music $M_4$ is divided into two tracks, one leading up to sector $SC_{n-1}$, the other starting from sector $SC_n$. The contents of the U-TOC to be updated have already been described earlier.

When the U-TOC is updated, the display unit 31 gives a display "Complete" (FIG. 26 (*g*)) indicating that the divide operation has been completed (step F716). Now that the piece of music $M_4$ is divided into $M_4$ and $M_5$, track numbers 4 and 5 are allowed to blink in the music calendar. With the divide mode steps completed, the system controller 11 leaves divide mode.

If the user wishes to modify the dividing position in response to the confirmation display during rehearsal reproduction, the user rotates the jog dial 43.

Step F710 is reached every time the jog dial 43 is rotated 1 click clockwise during rehearsal reproduction. In step F710, the dividing position is moved up by 1 sector. In keeping with the modification thus carried out, the display unit 31 gives illustratively a dividing position change display of "+01" as shown in FIG. 26 (*e*) (step F711). For example, suppose that the dividing position is moved up by 1 sector to coincide with the position $DP_{+1}$ in FIG. 27. In that case, rehearsal reproduction is repeated between sector $SC_{n+1}$ and sector $SC_{m+1}$. While rehearsal reproduction is under way, the system controller 11 goes through steps F706 and F707 asking the user if the selected dividing position is acceptable (as shown in FIGS. 26 (*b*), 26 (*c*) and 26 (*d*)).

Step F712 is reached every time the jog dial 43 is rotated 1 click counterclockwise during rehearsal reproduction. In step F712, the dividing position is moved down by 1 sector. In keeping with the modification thus performed, the display unit 31 gives illustratively a dividing position change display of "–01" as shown in FIG. 26 (*f*) (step F713). For example, suppose that the dividing position is moved down by 1 sector to coincide with the position $DP_{-1}$ in FIG. 27. In that case, rehearsal reproduction is repeated between sector $SC_{n-1}$ and sector $SC_{m-1}$. While rehearsal reproduction is under way, the system controller 11 goes through steps F706 and F707 asking the user if the newly selected dividing position is acceptable (as shown in FIGS. 26 (*b*), 26 (*c*) and 26 (*d*)).

As described, the user rotates the jog dial 43 to adjust the dividing position as needed. Once the currently selected dividing position is judged to be acceptable, the user presses the jog dial 43 to enter the position.

The dividing position is adjusted easily by rotating the jog dial 43. Even where the dividing position needs to be changed considerably, simply turning the jog dial 43 allows the target position to be reached with ease. Because the amount of jog dial rotation is proportional to the up/down change in the dividing position, it is easy for the user to get a rule-of-thumb feel of how much to turn the jog dial 43 before reaching the target position. The entry of the dividing position is effected by simply pressing the jog dial 43; no other key needs to be operated. The dividing position increment per click on the jog dial 43 may alternatively be keyed to 2 or more sectors (1 sector corresponding to about 60 msec. of reproduced sound).

13. MOVE MODE STEPS PERFORMED WITH JOG DIAL

Figure 28A:
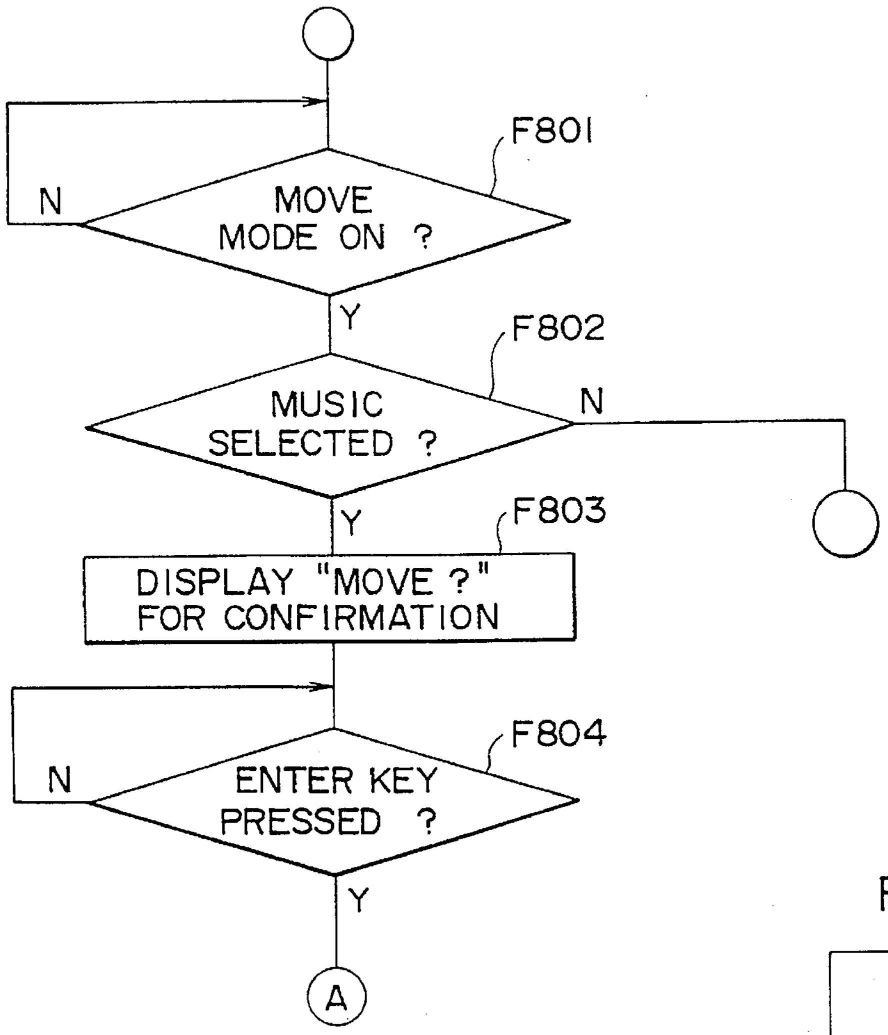
FIGS. 28(*a*) and 28(*b*) comprise a flowchart of move mode steps carried out when the jog dial of the embodiment is operated.
Figure 28:
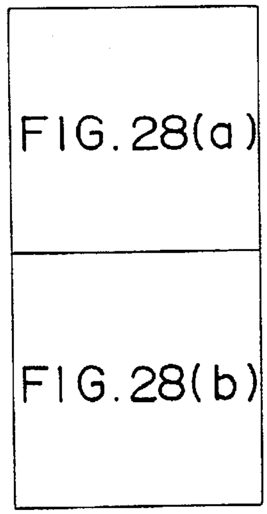
Figure 28B:
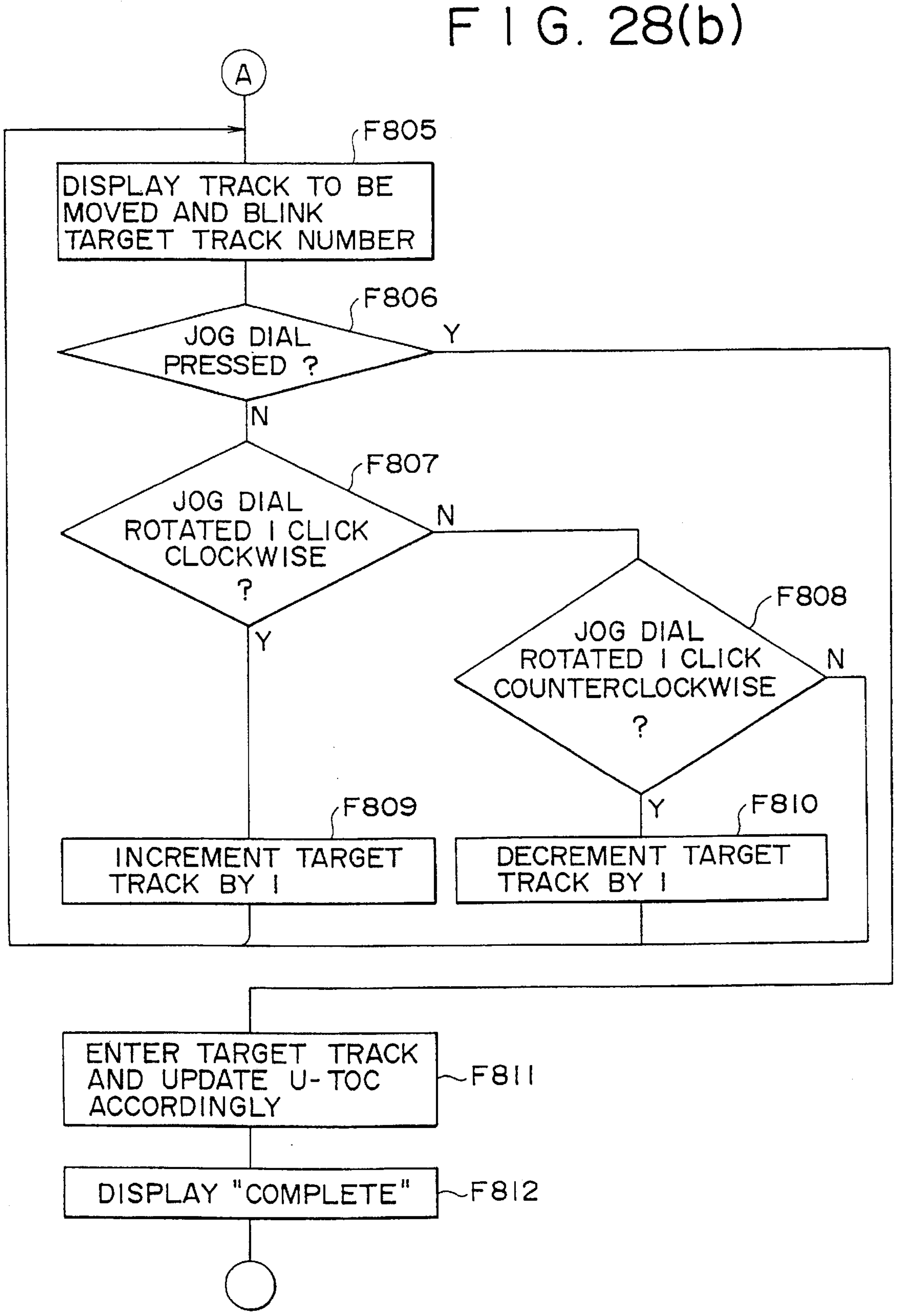
Figure 29A:
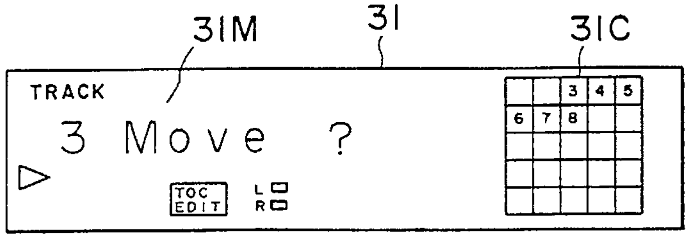
FIGS. 29 (*a*) through 29 (*d*) are views illustrating typical indications displayed during the move mode steps performed by use of the jog dial of the embodiment.
Figure 29B:
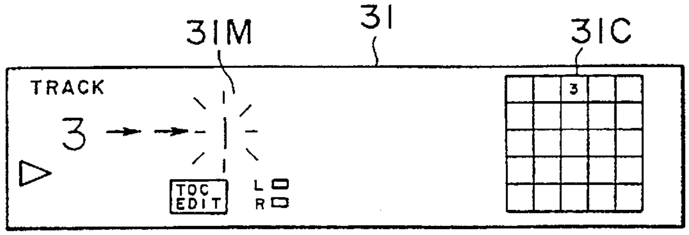
Figure 29C:
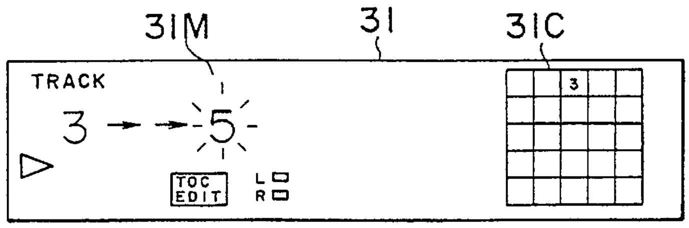
Figure 29D:
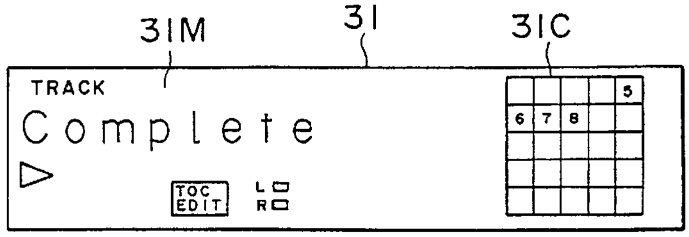

How move mode steps are performed by use of the jog dial 43 will now be described with reference to FIG. 28 and FIGS. 29 (*a*) to 29 (*d*). FIG. 28 is a flowchart of move mode steps carried out by the system controller 11 when the jog dial 43 is operated. FIGS. 29 (*a*) through 29 (*d*) are views illustrating typical indications displayed during the move mode steps.

The user first operates the edit key 40 to select move mode. This starts the processing of FIG. 28 (step F801). When move mode is selected, the system controller 11 checks (step F802) to see if any track is being reproduced or in the pause state during reproduction. If the embodiment has been in the stopped state, the system controller 11 checks (step F802) to see if any specific track has already been selected by operation of the jog dial 43 as described, i.e., if any track has been designated to be moved. If no track is found to be selected, the move mode steps will not be carried out.

If a track is found to be selected, the system controller 11 asks the user to verify his intention of moving that track. For example, if move mode is selected during reproduction of the third piece of music, the system controller 11 causes the display part 31 to give a display such as is shown in FIG. 29 (*a*) for confirmation (step F803).

When the user presses the enter (YES) key 41 in response to the above display for confirmation, the system controller 11 starts the subsequent series of move mode steps (step F804). The system controller 11 then causes the display unit 31 to display the track number of the target track to be moved and to blink the track number that is the destination of the movement (step F805).

In the above state, the system controller 11 checks to see if the jog dial 43 is rotated or pressed (steps F806, F807 and F808). The user selects the destination track number by rotating the jog dial 43. Specifically, step F809 is reached every time the jog dial 43 is rotated 1 click clockwise; the destination track number is incremented by 1 in step F809. Step F810 is reached every time the jog dial 43 is rotated 1 click counterclockwise; the destination track number is decremented by 1 in step F810. In step F805, the destination track number so selected is made to blink as shown in FIG. 29 (*c*).

For example, if track number 3 is desired to be moved up to track 5, the user selects the destination track number 5 and presses the jog dial 43. This causes the system controller 11 to go from step F806 to step F811. In step F811, the system controller 11 finalizes the destination of the track number movement and updates accordingly the U-TOC data held in the buffer memory 13. The contents of the U-TOC to be updated have already been described earlier.

When the track number movement is executed and the U-TOC is updated, the system controller 11 causes the display unit 31 to give an indication "Complete" as shown in FIG. 29 (*d*) (step F812). In the displayed example above in which the move mode steps have been carried out during reproduction of the third piece of music, the third piece of music now becomes the fifth. The music calendar thus displays track number 5 and the subsequent track numbers. With the track number movement completed, the system controller 11 leaves move mode.

As described, the user selects move mode, rotates the jog dial 43 to select the desired destination track number, and presses the dial to execute the track number movement. A track number appreciably higher or lower than the currently designated number may be selected with ease when the jog dial 43 is used. The movement is executed by simply pressing the jog dial 43 alone; no other key needs to be operated.

Although the description above contains many specificities, these should not be construed as limiting the scope of the invention but as merely providing illustrations of the presently preferred embodiment of this invention. For example, the use of the jog dial may be expanded to operations other than those described above. The recording and reproducing apparatus employed in the description above is not limitative of the invention; the invention may be applied advantageously to reproducing-only apparatuses as well. Furthermore, the scope of the invention is not limited by the above-described recording and reproducing apparatus using the magneto-optical disc. The invention may also be applied to reproducing apparatuses of other audio disc systems, video disc systems, and tape-based systems utilizing magnetic and optical tapes as their recording medium.

Thus the scope of the invention should be determined by the appended claims and their legal equivalents, rather than by the examples given.

What is claimed is:

1. A reproducing apparatus for reproducing data at least in units of tracks from a recording medium, said reproducing apparatus comprising:

input means for permitting rotating and pressing operations;

reproducing means for reproducing data from the recording medium;

display means for displaying at least any one of track numbers which are recorded on said recording medium and which identify tracks thereon; and control means for receiving output signals from said input means and for supplying control signals to said display means and the reproducing means; said control means allowing, in a reproduction mode, said input means to select through a rotating operation any one of a plurality of track numbers recorded on said recording medium and to control the status of reproducing data from the selected track through a pressing operation; said control means further allowing, in a mode other than the reproduction mode, said input means to perform track number selection through a rotating operation and to finalize and enter the selection through a pressing operation, and wherein said control means causes said display means to display each track number selected by a rotating operation of said input means and allows said input means to enter and program the currently selected track number through a pressing operation, and wherein said reproducing means reproduces from said recording medium the tracks identified by the entered track numbers in the order programmed.

2. A reproducing apparatus according to claim 1, further comprising recording and reproducing means, wherein said control means causes said display means to display one at a time various characters selected by a rotating operation of said input means and allows said input means to finalize the entry of each currently selected character through a pressing operation, and wherein said recording and reproducing means writes to said recording medium a string of the characters entered in conjunction with a desired track.

3. A reproducing apparatus according to claim 1, further comprising clock means for causing said display means to display time information, wherein said control means causes said display means to display each number selected by a rotating operation of said input means and allows said input means to enter the selected number as a time-of-day indication through a pressing operation.

4. A reproducing apparatus according to claim 1, wherein said control means in track dividing mode allows at least one position to be designated on a given track so that the track will be divided thereby at least in two, and wherein said control means in track dividing mode allows the dividing position to be varied selectively by a rotating operation of said input means and causes said input means to accept the currently selected dividing position as the designated dividing position through a pressing operation.

5. A reproducing apparatus according to claim 1, wherein said control means in track number moving mode causes said display means to display a new track number selected by a rotating operation of said input means, and allows said input means to substitute the currently selected track number for the track number of a desired track through a pressing operation.

6. A reproducing apparatus for reproducing data from a recording medium accommodating a plurality of data tracks and storing the track numbers identifying said data tracks, said reproducing apparatus comprising:

reproducing means for reproducing data from said recording medium;

input means for permitting rotating and pressing operations;

display means for displaying at least any one of said track numbers identifying said data tracks on said recording medium; and control means for receiving output signals from said input means and for supplying control signals to said display means; said control means causing, in a stopped state during reproduction, said display means to display the track number selected by a rotating operation of said input means, the selected track number being displayed in a manner distinct from other track numbers also displayed; said control means further causing said reproducing means to start reproducing data from the beginning of the track identified by the track number selected by said input means; said control means further allowing, while reproduction is under way, said display means to display selectively a track number which either precedes or follows the track number of the track currently under reproduction, the displayed track number being selected by a rotating operation in a specific direction of said input means; said control means further causing said reproducing means to start reproducing data from the beginning of the selected track upon completion of the selecting operation by said input means.

7. A reproducing apparatus according to claim 6, wherein said input means comprises a selective input part to be rotated and a pressing input part located in the center of rotation of said selective input part.

8. A reproducing apparatus for reproducing data from a recording medium accommodating a plurality of data tracks and storing the track numbers identifying said data tracks, said reproducing apparatus comprising:

reproducing means for reproducing data from said recording medium;

input means for permitting rotating and pressing operations, the input means including a selective input part to be rotated and a pressing input part located in the center of rotation of said selective input part;

display means for displaying at least any one of said track numbers identifying said data tracks on said recording medium; and control means for receiving output signals from said input means and for supplying control signals to said display means; said control means causing, in a stopped state during reproduction, said display means to display the track number selected by a rotating operation of said input means, the selected track number being displayed in a manner distinct from other track numbers also displayed; said control means further causing said reproducing means to start reproducing data from the beginning of the track identified by the track number selected by said input means; said control means further allowing, while reproduction is under way, said display means to display selectively a track number which either precedes or follows the track number of the track currently under reproduction, the displayed track number being selected by a rotating operation in a specific direction of said input means; said control means further causing said reproducing means to start reproducing data from the beginning of the selected track upon completion of the selecting operation by said input means, wherein said control means further includes detection means for detecting the direction and the amount of rotation by said selective input part of said input means, and wherein said control means supplies said display means with control signals generated in accordance with detection signals coming from said detection means.

9. A reproducing apparatus for reproducing data from a recording medium accommodating a plurality of data tracks and storing the track numbers identifying said data tracks, said reproducing apparatus comprising:

reproducing means for reproducing data from said recording medium;

input means for permitting rotating and pressing operations, the input means including a selective input part to be rotated and a pressing input part located in the center of rotation of said selective input part and wherein said input means outputs pulses having two phase differences;

display means for displaying at least any one of said track numbers identifying said data tracks on said recording medium; and control means for receiving output signals from said input means and for supplying control signals to said display means; said control means causing, in a stopped state during reproduction, said display means to display the track number selected by a rotating operation of said input means, the selected track number being displayed in a manner distinct from other track numbers also displayed; said control means further causing said reproducing means to start reproducing data from the beginning of the track identified by the track number selected by said input means; said control means further allowing, while reproduction is under way, said display means to display selectively a track number which either precedes or follows the track number of the track currently under reproduction, the displayed track number being selected by a rotating operation in a specific direction of said input means; said control means further causing said reproducing means to start reproducing data from the beginning of the selected track upon completion of the selecting operation by said input means; wherein said control means determines the direction and the amount of rotation by said selective input part in accordance with the pulses with the two phase differences coming from said input means.

10. A reproducing apparatus according to claim 6, wherein said control means continues to reproduce data from the track currently under reproduction until the selecting operation by said input means is completed.

11. A reproducing apparatus according to claim 6, wherein said display means comprises a first display part for displaying a track number and a second display part for displaying time information, said first display part displaying in matrix form numbers corresponding to a plurality of tracks held on said recording medium.

12. A reproducing method for use with a recording medium accommodating a plurality of data tracks and storing table-of-contents information including data about the track numbers identifying said data tracks, said reproducing method comprising the steps of:

reading said table-of-contents information from the loaded recording medium for display onto display means;

causing, in a stopped state during reproduction, said display means to display the track number selected by a rotating operation of input means, the selected track number being displayed in a manner distinct from other track numbers also displayed;

causing reproducing means to start reproducing data from the beginning of the track identified by the track number selected by said input means;

allowing, while reproduction is under way, said display means to display selectively a track number which either precedes or follows the track number of the track currently under reproduction, the displayed track number being selected by a rotating operation in a specific direction of said input means; and causing said reproducing means to start reproducing data from the beginning of the selected track upon completion of the selecting operation by said input means.

13. A reproducing method according to claim 12, further comprising the step of continuously reproducing data from the track currently under reproduction until the selecting operation by said input means is completed.

14. A reproducing method according to claim 12, further comprising the step of starting to reproduce data from the track identified by the first track number recorded on said recording medium if, after loading of said recording medium, a pressing operation of said input means is effected without any rotating operation of said input means.

15. A reproducing apparatus for reproducing data at least in units of tracks from a recording medium, the reproducing apparatus comprising:

a rotatable and reciprocatible jog dial for permitting manual rotating and pressing operations by a user of the reproducing apparatus to make selection input commands;

reproducing means for reproducing data from the recording medium;

display means for displaying at least any one of a plurality of track numbers which are recorded on the recording medium and which identify tracks thereon; and control means for receiving output signals from the jog dial and for supplying control signals to the display means and the reproducing means; the control means allowing the apparatus user during a reproduction mode, by rotating the jog dial, to select any one of a plurality of track numbers recorded on the recording medium and to control the status of reproducing data from the selected track by pressing the jog dial; the control means further allowing the apparatus user during a mode other than the reproduction mode, to perform track number selection by rotating the jog dial and to finalize and enter the selection by pressing the jog dial, wherein the control means causes the display means to display each track number selected by rotating the jog dial and allows the jog dial to enter and program the currently selected track number by being pressed, and wherein the recording and reproducing means reproduces from the recording medium the tracks identified by the entered track numbers in the order programmed.

16. A reproducing apparatus according to claim 15, further comprising recording and reproducing means, wherein the control means causes the display means to display one at a time various characters selected by rotating the jog dial and allows the jog dial to finalize the entry of each currently selected character by being pressed, and wherein the recording and reproducing means writes to the recording medium a string of the characters entered in conjunction with a desired track.

17. A reproducing apparatus according to claim 15, further comprising clock means for causing the display means to display time information, wherein the control means causes the display means to display each number selected by rotating the jog dial and allows the jog dial to enter the selected number as a time-of-day indication by being pressed.

18. A reproducing apparatus according to claim 15, wherein the control means in track dividing mode allows at least one position to be designated on a given track so that the track will be divided thereby at least in two, and wherein the control means in track dividing mode allows the dividing position to be varied selectively by rotating the jog dial and causes the jog dial to accept the currently selected dividing position as the designated dividing position by being pressed.

19. A reproducing apparatus according to claim 15, wherein the control means in track number moving mode causes the display means to display a new track number selected by rotating the jog dial, and allows the jog dial to substitute the currently selected track number for the track number of a desired track by being pressed.

20. A reproducing apparatus for reproducing data from a recording medium accommodating a plurality of data tracks and storing the track numbers identifying the data tracks, the reproducing apparatus comprising:

reproducing means for reproducing data from the recording medium;

a rotatable and reciprocatible jog dial for permitting manual rotating and pressing operations by a user of the reproducing apparatus to make selection input commands;

display means for displaying at least any one of the track numbers identifying the data tracks on the recording medium; and control means for receiving output signals from the jog dial and for supplying control signals to the display means; the control means causing, in a stopped state during reproduction, the display means to display the track number selected by rotating the jog dial, the selected track number being displayed in a manner distinct from other track numbers also displayed; the control means further causing the reproducing means to start reproducing data from the beginning of the track identified by the track number selected by the jog dial; the control means further allowing, while reproduction is under way, the display means to display selectively a track number which either precedes or follows the track number of the track currently under reproduction, the displayed track number being selected by rotating in a specific direction of the jog dial; the control means further causing the reproducing means to start reproducing data from the beginning of the selected track upon completion of the selecting operation by the jog dial.

21. A reproducing apparatus according to claim 20, wherein the jog dial comprises a selective input part to be rotated and a pressing input part located in the center of rotation of the selective input part.

22. A reproducing apparatus for reproducing data from a recording medium accommodating a plurality of data tracks and storing the track numbers identifying the data tracks, the reproducing apparatus comprising:

reproducing means for reproducing data from the recording medium;

a rotatable and reciprocatible jog dial for permitting manual rotating and pressing operations by a user of the reproducing apparatus to make selection input commands, the jog dial including a selective input part to be rotated and a pressing input part located in the center of rotation of the selective input part;

display means for displaying at least any one of the track numbers identifying the data tracks on the recording medium; and control means for receiving output signals from the jog dial and for supplying control signals to the display means; the control means causing, in a stopped state during reproduction, the display means to display the track number selected by rotating the jog dial, the selected track number being displayed in a manner distinct from other track numbers also displayed; the control means further causing the reproducing means to start reproducing data from the beginning of the track identified by the track number selected by the jog dial; the control means further allowing, while reproduction is under way, the display means to display selectively a track number which either precedes or follows the track number of the track currently under reproduction, the displayed track number being selected by rotating in a specific direction of the jog dial; the control means further causing the reproducing means to start reproducing data from the beginning of the selected track upon completion of the selecting operation by the jog dial; and wherein the control means comprises detection means for detecting the direction and the amount of rotation by the selective input part of the jog dial, and wherein the control means supplies the display means with control signals generated in accordance with detection signals coming from the detection means.

23. A reproducing apparatus for reproducing data from a recording medium accommodating a plurality of data tracks and storing the track numbers identifying the data tracks, the reproducing apparatus comprising:

reproducing means for reproducing data from the recording medium;

a rotatable and reciprocatible jog dial for permitting manual rotating and pressing operations by a user of the reproducing apparatus to make selection input commands, the jog dial including a selective input part to be rotated and a pressing input part located in the center of rotation of the selective input part, wherein the jog dial outputs pulses having two phase differences;

display means for displaying at least any one of the track numbers identifying the data tracks on the recording medium; and control means for receiving output signals from the jog dial and for supplying control signals to the display means; the control means causing, in a stopped state during reproduction, the display means to display the track number selected by rotating the jog dial, the selected track number being displayed in a manner distinct from other track numbers also displayed; the control means further causing the reproducing means to start reproducing data from the beginning of the track identified by the track number selected by the jog dial; the control means further allowing, while reproduction is under way, the display means to display selectively a track number which either precedes or follows the track number of the track currently under reproduction, the displayed track number being selected by rotating in a specific direction of the jog dial; the control means further causing the reproducing means to start reproducing data from the beginning of the selected track upon completion of the selecting operation by the jog dial; and wherein the control means determines the direction and the amount of rotation by the selective input part in accordance with the pulses with the two phase differences coming from the jog dial.

24. A reproducing apparatus according to claim 20, wherein the control means continues to reproduce data from the track currently under reproduction until the selecting operation by the jog dial is completed.

25. A reproducing apparatus according to claim 20, wherein the display means comprises a first display part for displaying a track number and a second display part for displaying time information, the first display part displaying in matrix form numbers corresponding to a plurality of tracks held on the recording medium.

26. A reproducing apparatus for reproducing data at least in units of programs from a recording medium during a reproducing operation, the recording medium including a program area which the units of programs are recorded and a management area in which management data is recorded, the reproducing apparatus comprising:

input means for permitting rotating and pressing operations;

display means for displaying at least any one of program numbers which are recorded on the recording medium and which identify programs thereon in accordance with the management data; and control means for receiving output signals from the input means and for supplying control signals to a reproducing means and the display means, wherein, while the reproducing operation is stopped, the control means controls the display means so as to increase or decrease a displayed program number in accordance with a rotation of the input means and if a user presses the input means, the control means controls the reproducing means so as to retrieve the displayed program number, and further wherein, while the reproducing operation is under way, the control means controls the display means so as to increase or decrease a displayed program number in accordance with the rotation input means and to control the reproducing means to retrieve the displayed program number.

27. A reproducing apparatus for reproducing data at least in units of programs from a recording medium which includes a program area in which the units of programs are recorded and a management area in which management data is recorded, the reproducing apparatus comprising:

a rotatable and reciprocatible jog dial for permitting manual rotating and pressing operations by a user of the reproducing apparatus to make selection input commands;

display means for displaying at least any one of a plurality of program numbers which are recorded on the recording medium and which identify programs thereon in accordance with the management data; and control means for receiving output signals from the jog dial and for supplying control signals to a reproducing means and the display means;

wherein, while the reproducing operation is stopped, the control means controls the display means so as to increase or decrease a displayed program number in accordance with a rotation of the jog dial and if a user presses the jog dial, the control means controls the reproducing means so as to retrieve the displayed program number, and further wherein, while the reproducing operation is under way, the control means controls the display means so as to increase or decrease a displayed program number in accordance with the rotation jog dial and to control the reproducing means to retrieve the displayed program number.

* * * * *